(12) United States Patent
Ghosh et al.

(10) Patent No.: US 9,773,432 B2
(45) Date of Patent: Sep. 26, 2017

(54) LIGHTWEIGHT CRYPTOGRAPHIC ENGINE

(71) Applicant: Intel Corporation, Santa Clara, CA (US)

(72) Inventors: Santosh Ghosh, Hillsboro, OR (US); Li Zhao, Beaverton, OR (US); Manoj R. Sastry, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 195 days.

(21) Appl. No.: 14/752,873

(22) Filed: Jun. 27, 2015

(65) Prior Publication Data

US 2017/0061832 A1    Mar. 2, 2017

(51) Int. Cl.
*H04L 9/00* (2006.01)
*G09C 1/00* (2006.01)
*H04L 9/06* (2006.01)

(52) U.S. Cl.
CPC .............. *G09C 1/00* (2013.01); *H04L 9/0631* (2013.01); *H04L 2209/122* (2013.01)

(58) Field of Classification Search
CPC .... H04L 9/0631; H04L 2209/122; G09C 1/00
USPC ......................................................... 380/28
See application file for complete search history.

(56) References Cited

U.S. PATENT DOCUMENTS

| | | | |
|---|---|---|---|
| 7,221,763 B2 | 5/2007 | Verbauwhede | |
| 7,295,671 B2 | 11/2007 | Snell | |
| 7,949,130 B2 | 5/2011 | Gueron et al. | |
| 8,194,854 B2 | 6/2012 | Gueron et al. | |
| 8,280,040 B2 | 10/2012 | Frank | |
| 8,346,839 B2 | 1/2013 | Ozturk et al. | |
| 8,379,841 B2* | 2/2013 | Taylor | H04L 9/0662 380/28 |
| 8,391,475 B2 | 3/2013 | Gopal et al. | |
| 8,538,015 B2 | 9/2013 | Gueron et al. | |
| 2009/0147946 A1* | 6/2009 | Ryu | H04L 9/065 380/28 |
| 2011/0243324 A1* | 10/2011 | Lima | H04L 1/1812 380/212 |
| 2013/0108039 A1 | 5/2013 | Gong et al. | |
| 2014/0380037 A1* | 12/2014 | Matsuda | H04L 9/0618 713/150 |
| 2015/0039904 A1 | 2/2015 | Matsuda et al. | |
| 2015/0074159 A1* | 3/2015 | Poschmann | G09C 1/00 708/270 |

FOREIGN PATENT DOCUMENTS

WO    2012154129 A1    11/2012

OTHER PUBLICATIONS

Axel York, Poschmann, "LightWeight Crypgtography" Dissertation, Ruhr-University, Bochum, Germany, Feb. 2009.*
Federal Information Processing Standards Publication 197, "Specification for the Advanced Encryption Standard (AES)", Nov. 26, 2001, 47 pages.

(Continued)

*Primary Examiner* — Samson Lemma
(74) *Attorney, Agent, or Firm* — Grossman, Tucker, Perreault & Pfleger, PLLC

(57) ABSTRACT

One embodiment provides an apparatus. The apparatus includes a lightweight cryptographic engine (LCE), the LCE is optimized and has an associated throughput greater than or equal to a target throughput.

24 Claims, 12 Drawing Sheets

(56) References Cited

OTHER PUBLICATIONS

Federal Information Processing Standards Publication 180-4, "Secure Hash Standard (SHS)", Information Technology Laboratory, National Institute of Standards and Technology, Mar. 2012, 37 pages.
IEEE Std. 802.11TM-2012, IEEE Standard for Information technology—Telecommunications and information exchange between systems Local and metropolitan area networks—Specific requirements, Part 11: Wireless LAN Medium Access Control (MAC) and Physical Layer (PHY) Specifications, Mar. 29, 2012, 2,793 pages.
IEEE Std. 802.11acTM-2013, IEEE Standard for Information technology—Telecommunications and information exchange between systems Local and metropolitan area networks—Specific requirements, "Part 11: Wireless LAN Medium Access Control and Physical Layer (PHY) Specifications, Amendment 4: Enhancements for Very High Throughput for Operation in Bands below 6 GHz", Dec. 2013, 425 pages.
Feller, Thomas et al.: "TinyTPM: A lightweight module aimed to IP protection and trusted embedded platforms", 2011 IEEE International Symposium on Hardware-Oriented Security and Trust (HOST), Jul. 14, 2011, 7 pages.
Bogdanov, Andrey et al.: "ALE: AES-Based Lightweight Authenticated Encryption", vol. 8424 of the series Lecture Notes in Computer Science, Jul. 8, 2014, 21 pages.
International Search Report and Written Opinion issued in PCT Application No. PCT/US2016/034754, dated Mar. 14, 2017, 14 pages.

\* cited by examiner

LIGHTWEIGHT CRYPTOGRAPHIC ENGINE

FIELD

The present disclosure relates to cryptographic engines, in particular to, a lightweight cryptographic engine.

BACKGROUND

The Internet of Things (IoT) may include various networked devices configured for sensing, communication, control, automation, etc. Devices may include sensors (e.g., environmental, position, motion, etc.), actuators, audio and/or video capture devices, controllers, etc. The devices may be configured to capture data, transmit data and/or to transmit and/or receive commands from other devices and/or management systems. Such devices may be constrained in size and/or power consumption. Wearable devices, such as "smart" watches, smart glasses, smart clothing, etc., may be similarly networked and similarly constrained in size and/or power consumption.

In some situations, it may be desirable to protect the data from unauthorized access at the device and/or during transmission. Encryption is one technique that may be utilized to protect data. Generally, encrypting and decrypting are relatively computationally intensive operations and thus, may consume significant resources of a networked device.

BRIEF DESCRIPTION OF DRAWINGS

Features and advantages of the claimed subject matter will be apparent from the following detailed description of embodiments consistent therewith, which description should be considered with reference to the accompanying drawings, wherein:

Figure 1:
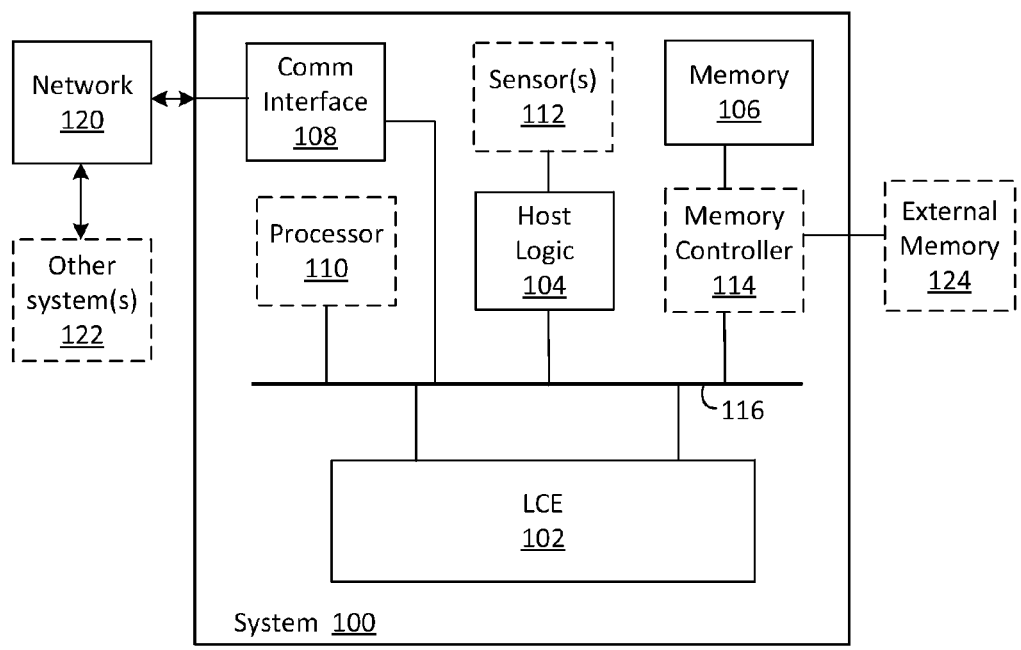
FIG. 1 illustrates a functional block diagram of a system including a lightweight cryptographic engine (LCE) consistent with several embodiments of the present disclosure.

Although the following Detailed Description will proceed with reference being made to illustrative embodiments, many alternatives, modifications, and variations thereof will be apparent to those skilled in the art.

DETAILED DESCRIPTION

Generally, this disclosure relates to a lightweight cryptographic engine (LCE). An LCE, consistent with the present disclosure, is configured to implement one or more cryptographic primitives (i.e., crypto primitives) to provide confidentiality and/or integrity of data at a device and/or during transmission from or to the device. Confidentiality refers to protecting the data from unauthorized access. Integrity refers to maintaining and assuring accuracy of the data. In other words, integrity is related to checking whether received data corresponds to transmitted data. The LCE is configured to offload cryptographic functions from a host system and to implement the cryptographic primitive(s) within a constrained size (e.g., die area) and within a constrained power budget. The constraints are related to a system that includes, e.g., contains, the LCE. For example, the system may correspond to a device included in the Internet of Things (IoT).

The cryptographic primitives may include one or more of an Advanced Encryption Standard (AES) engine, an SHS (Secure Hash Standard) engine, a random number generator (RNG) and/or a memory wiper. The AES engine may be configured to support one or more AES mode(s), as described herein. The SHS engine may be configured to implement one or more Secure Hash Algorithms (SHAs), as described herein. The RNG may be nondeterministic and/or may utilize an entropy source, as described herein. The RNG is configured to provide random number(s) to a host system and/or to one or more other cryptographic engine(s), included in the LCE. The memory wiper is configured to erase a block of memory that may include one or more bytes.

An LCE consistent with the present disclosure is optimized. As used herein, "lightweight" means optimized. As used herein, "optimized" means reducing and/or minimizing size and/or power consumption while maintaining or achieving an associated throughput that is greater than or equal to a target throughput. A target throughput corresponds to a target latency. Thus, an associated latency is configured to be less than or equal to the target latency. The target throughput may be greater than or equal to a minimum throughput that may be set by a protocol, specification and/or standard. The protocol, specification and/or standard may be related to an interconnect within a host system and/or communication to/from the host system. For example, the target throughput for an LCE, consistent with the present disclosure, is in the range of 100 kilobits per second (kbps) to 200 Megabits per second (Mbps). In some embodiments, a cryptographic engine (e.g., AES engine, SHS engine) may have an associated throughput of greater than 200 Mbps. For example, an AES engine operating at 108 Megahertz (MHz) may have an associated throughput of about 345 Mbps. In another example, an SHS engine operating at 108 MHz may have an associated throughput of about 864 Mbps. As used herein, "about" corresponds to a tolerance of ±20%.

As used herein, size corresponds to die area occupied by the LCE. As used herein, power consumption includes power consumption of the LCE and/or power consumption of a system that includes the LCE. The throughput associated with the operations of the cryptographic engines may be decreased as a result of reducing the size and/or power consumption. The optimization(s) include maintaining the resulting throughput within an allowable throughput. For example, the allowable throughput may be provided by a communication protocol, as described herein. In another example, the allowable throughput may be provided by an interface (i.e., interconnect) protocol, as described herein.

The LCE may be optimized by implementing one or more architectural optimizations and/or one or more operational optimizations. Architectural optimizations include, but are not limited to, reducing and/or minimizing a number of registers, reducing and/or minimizing associated combinatorial logic, relating a number of buffers to anticipated message characteristics, implementing cryptographic primitive-specific architectural optimizations, etc. Message characteristics may include, but are not limited to, data type (e.g., streaming, static, message length known in advance, message length not known in advance, etc.), associated cryptographic operation (confidentiality (encryption, decryption), integrity (hash, message digest, digital signature, and/or message authentication code)), etc. Operational optimizations include, but are not limited to, reducing and/or minimizing a number of register updates, data forwarding (e.g., rather than storing), adjusting order of operations, on-the-fly operations, offloading functionality from the host, pipelining, etc.

The LCE may be configurable (e.g., scalable). For example, architectural optimizations may include implementing fewer than all (i.e., a subset) of the possible cryptographic primitive(s). Architectural optimizations may thus include providing selected cryptographic functionality.

Architectural optimizations may further include implementing a minimized (e.g., area and/or power consumption) cryptographic primitive, e.g., AES engine. Such a minimized cryptographic primitive may include fewer options (e.g., AES modes) and/or may have a decreased throughput relative to a non-minimized cryptographic primitive.

For example, architectural optimizations may include reducing and/or minimizing a number of registers utilized for storing state variables and a number of register updates during cryptographic operations. In another example, for systems that include processors, the system may be configured to offload some operations related to cryptographic operations (e.g., SHS preprocessing) to the LCE in addition to offloading the cryptographic operations themselves. Offloading of operations related to cryptographic operations may allow the processor to sleep (i.e., transition to a low power state) and thus reduce the overall power consumption of the system that includes the LCE.

An AES engine consistent with the present disclosure may comply and/or be compatible with Federal Information Processing Standards (FIPS) Publication 197, titled: "Advanced Encryption Standard (AES) (FIPS PUB 197)", published by the National Institute of Standards and Technology (NIST) in November 2001, and/or later and/or related versions of this standard.

AES FIPS PUB 197 (hereinafter "AES standard") specifies a symmetric block cipher configured to process 128-bit blocks of data, using cipher keys of key length 128, 192 or 256 bits. In a symmetric block cipher, a same or related secret cryptographic key (i.e., cipher key) is used for both encryption and decryption. A cipher includes a series of transformations that converts plaintext (i.e., unencrypted data) to ciphertext (i.e., encrypted data) using a cipher key. An inverse cipher includes a series of transformations that converts ciphertext to plaintext (i.e., decrypted data) using the cipher key. In the AES standard, the cipher key is used to generate a set of round keys using a key expansion routine. Round keys are then applied to a state in transformations associated with the cipher and/or inverse cipher, as described herein.

Each 128-bit block of data may be split into four 32-bit words where each 32-bit word includes four 8-bit bytes. Operations associated with the block cipher are performed on an array of bytes called a state array. The state array may be configured as a two-dimensional array that includes a four by four array of bytes for a total of sixteen bytes (i.e., 128 bits). Each column of the two-dimensional state array corresponds to a word (i.e., 32 bits). The state array may be configured as a vector (a one-dimensional array) that includes the 128 bits as concatenated words (i.e., concatenated columns of the two-dimensional state array). A "state" of the state array may thus correspond to an intermediate cipher result.

For both cipher and inverse cipher, a round function is applied to the state array. The round function includes a sequence of byte-oriented transformations: byte substitution ("SubBytes( )") using a nonlinear substitution table ("S-box"), row shifting ("ShiftRows( )") of the state array by different offsets, mixing the data ("MixColumns( )") within each column of the state array and adding a round key ("AddRoundKey( )") to the state (i.e., 128 bits). Thus, the round function includes a sequence of four transformations. A number of rounds is related to the cipher key length. For example, for a 128-bit cipher key, the number of rounds is ten.

In operation, input data, i.e., a 128-bit block of data to be encrypted, is copied to a state array, an initial Round Key addition is performed and the state array is transformed by implementing the round function on the state array the appropriate number of times (e.g., ten). The final round differs slightly from the non-final rounds in that the final round does not include the MixColumns( ) transformation. The state array may then hold a 128-bit block of encrypted data that corresponds to the input data. An inverse cipher is implemented similarly using an appropriate sequence of inverse transformations to decrypt a 128-bit block of encrypted data to yield decrypted data, i.e. plaintext.

It should be noted that the SubBytes( ) and ShiftRows( ) transformations commute. Thus, the sequence of transformations may be modified while maintaining conformance with the AES standard. In particular, rather than the transformation order for each non-final round of SubBytes( ) followed by ShiftRows( ) followed by MixColumns( ) followed by AddRoundKey( ), the transformation order may be ShiftRows( ) followed by SubBytes( ) followed by MixColumns( ) followed by AddRoundKey( ). Similarly, InvSubBytes( ) and InvShiftRows( ) transformations also commute.

Thus, a 128-bit block of data and a cryptographic key may be provided to an AES engine. The block of data may then be encrypted or decrypted in conformance with the AES standard by an AES engine, as described herein.

A SHS engine and/or SHS wrapper may comply and/or be compatible with FIPS Publication 180-4, titled: "Secure Hash Standard (SHS)", published by NIST in March 2012, and/or later and/or related versions of this standard.

SHS FIPS PUB 180-4 (hereinafter "SHS standard") specifies a plurality of secure hash algorithms (SHAs) for computing a condensed representation ("message digest") of electronic data (e.g., a message). The message digest may be used, for example, to confirm integrity of the data. SHAs are iterative, one-way hash functions configured to process a message to produce the message digest. Any change to the message should, with relatively high probability, result in a different message digest. This characteristic is useful in the generation and verification of digital signatures and message authentication codes (MACs), and in the generation of random numbers and/or random bits.

SHAs include two stages: preprocessing and hash computation. Preprocessing may include padding a message, parsing the padded message into m-bit blocks and/or setting initialization values to be used in the hash computation. The hash computation is configured to generate a message schedule based, at least in part, on the padded message. The hash computation is further configured to use the message schedule and, in addition, functions, constants and word operations to iteratively generate a series of hash values. A final hash value generated by the hash computation may then correspond to the message digest.

The SHS standard specifies a plurality of SHAs that may be characterized by message size, SHA block size, word size and/or message digest size. Message size may be less than $2^{64}$ or less than $2^{128}$ bits, depending on the particular SHA. Similarly, the message digest size ranges from 160 bits to 512 bits. For example, SHA-256 corresponds to a message size of less than $2^{64}$ bits, an SHA block size of 512 bits (i.e., 64 bytes), a word size of 32 bits and a message digest size of 256 bits. In another example, SHA-224 is similar to SHA-256 except for an initial hash value and a 224-bit message digest that includes truncating a final hash value to its left-most 224 bits. In another example, SHA-512 corresponds to a message size of less than $2^{128}$ bits, a block size of 80 bytes, a word size of 64 bits and a message digest of 512 bits. Thus, "SHA2", as used herein, corresponds to one or more of the SHAs.

For example, preprocessing for a SHA2 (e.g., SHA-256) may include padding a message so that the resulting padded message length is a whole number multiple of 512 bits. Padding may be inserted prior to initiation of a hash computation and/or during the hash computation prior to processing the SHA block(s) that are to include the padding. Preprocessing may further include parsing the message (and, its padding, if any) into N 512-bit SHA blocks, $M^{(n)}$, n=N. Each 512-bit block may then be expressed as sixteen 32-bit words $M_i^{(n)}$, i=0, . . . , 15. Preprocessing further includes setting an initial hash value H" prior to initiating the hash computation. The initial value for SHA-256 includes eight 32-bit words $H_j^{(0)}$, j=0, . . . , 7, that are related to the square roots of the first eight prime numbers. In other words, the initial hash value $H^{(0)}$ that includes the eight 32-bit words is known a priori.

SHA-256 may be used to hash a message, M, having length of L bits, where $0 \leq L \leq 2^{64}$. The hash computation may use a message schedule of sixty four 32-bit words, $W_j$, j=0, . . . , 63, eight 32-bit working variables (a, b, . . . , h), a sequence of sixty four 32-bit constants, $K_j$, j=0, . . . , 63, and a hash value $H^{(i)}$ of eight 32-bit words $H_j^{(i)}$, j=0, . . . , 7. The constants, $K_j$, represent the first 32 bits of the fractional parts of the cube roots of the first 64 prime numbers. The words of the hash value $H_j^{(i)}$ initially hold the words of the initial hash value $H_j^{(0)}$, are replaced by a successive intermediate hash value (after each message block is processed) $H_j^{(i)}$, and end with a final hash value $H_j^{(N)}$. SHA-256 also uses two temporary words, $T_1$ and $T_2$. The corresponding final result, i.e., message digest, is configured to have a length of 256 bits.

In operation, preprocessing includes setting the initial hash value, $H^{(0)}$, padding (if necessary) and parsing the message. Each SHA block, $M^{(n)}$, may then be processed in order. The processing operations include preparing the message schedule $W_j$, initializing the working variables with an appropriate (i−1) hash value, determining the temporary word values, updating the working variables and computing the $i^{th}$ intermediate hash value $H^{(i)}$. The processing operations may be repeated N times to process all N SHA 512-bit blocks of the message M. The resulting message digest $H^{(N)}$ then $H_0^{(N)} \| H_1^{(N)} \| H_2^{(N)} \| H_3^{(N)} \| H_4^{(N)} \| H_5^{(N)} \| H_6^{(N)} \| H_7^{(N)}$, the final hash value, where ∥ corresponds to concatenation.

Thus, a message of arbitrary length may be provided to an SHS wrapper and thus, to an SHS engine. A message digest of the message may then be determined in conformance with the SHS standard by the SHS wrapper and SHS engine, as described herein.

A message digest may be further processed to generate a hash based message authentication code (HMAC). An HMAC includes a cryptographic key and is configured to prevent a "man-in-the-middle" attack on an associated message. An HMAC of a message, m, using a cryptographic key, K, may be generated as:

$$HMAC(K,m)=H((K \text{ XOR opad})\|H((K \text{ XOR ipad})\|m)),$$

where H is a secure hash algorithm, e.g., SHA2, XOR is bitwise exclusive-OR, opad and ipad are fixed parameters and ∥ is concatenation.

An LCE, consistent with the present disclosure may include one or more cryptographic engines, as described herein. An AES cryptographic engine may be configured to encrypt and/or decrypt a message in conformance with the AES standard. An SHS cryptographic engine may be configured to determine a cryptographic hash of a message in conformance with one or more SHA algorithms included in the SHS standard.

FIG. 1 illustrates a functional block diagram of a system 100 including a lightweight cryptographic engine (LCE) 102 consistent with several embodiments of the present disclosure. System 100, may include, but is not limited to, a mobile telephone including, but not limited to a smart phone, (e.g., iPhone®, Android®-based phone, Blackberry®, Symbian®-based phone, Palm®-based phone, etc.) and/or a feature phone; a wearable device (e.g., wearable computer, "smart" watches, smart glasses, smart clothing, etc.) and/or system; an Internet of Things (IoT) networked device including, but not limited to, a sensor system (e.g., environmental, position, motion, etc.) and/or a sensor network (wired and/or wireless), an actuator system, audio and/or video capture devices, controller system, etc. In an embodiment, system 100 may correspond to a system on a chip (SoC).

System 100 includes host logic 104, memory 106 and a communication (comm) interface 108. System 100 may include a processor 110, sensor(s) 112 and/or a memory controller 114. System 100 may include an interconnect 116. LCE 102 may be coupled to one or more of host logic 104, memory 106, comm interface 108, processor 110, sensor(s) 112 and/or memory controller 114 by interconnect 116. For example, interconnect 116 may include a bus, a network, a fabric, etc. System 100 may be coupled to an external memory 124 via, e.g., memory controller 114.

Processor 110 may include, but is not limited to, a microprocessor, a microcontroller, an application specific integrated circuit (ASIC), application specific instruction processor (ASIP), etc. In some embodiments, host logic 104, memory 106, memory controller 114 and/or comm interface 108 may be included in processor 110. Sensor(s) 112 may include environmental sensors, position sensors, motion sensors, biomedical sensors (e.g., heart rate, blood pressure, partial pressure of oxygen, etc.), pressure sensors, accelerometers, etc., audio capture devices, video capture devices, etc.

Memory controller 114 is configured to couple memory 106 to interconnect 116 and/or LCE 102. Memory controller 114 may be configured to facilitate direct memory access (DMA) to or from LCE 102, as described herein. In some embodiments, memory controller 114 may be included in memory 106. In some embodiments, memory controller 114 may be included in processor 110. Memory controller 114 may facilitate DMA from/to memory 106 and/or external memory 124.

Comm interface 108 is configured to connect system 100 to a network 120. Comm interface 108 may be configured to couple system 100 to one or more other system(s) 122 via network 120. Comm interface 108 may be configured to transmit and/or receive one or more message(s). Comm interface 108 may be configured to comply and/or be compatible with one or more communication protocol(s), as described herein. Message(s) may include commands, responses to commands, requests, responses to requests, data, etc. The data may include data captured by sensor(s) 112 and/or data captured by one or more of the other system(s) 122 and received by system 100. LCE 102 may be configured to provide confidentiality and/or integrity of message(s) to be transmitted. Message(s) to be transmitted may be encrypted by LCE 102 and/or may include an integrity check, e.g., a cryptographic hash, generated by LCE 102. LCE 102 may be configured to perform an integrity check on a received message. Received message(s) that are encrypted may be decrypted by LCE 102. LCE 102 may be configured to perform integrity checks on received messages by determining associated message digests and comparing the determined message digest with a received message digest.

Memory 106 may be configured to store data captured by sensor(s) 112, encrypted data, encrypted message(s) prior to transmission, received encrypted message(s) prior to decryption, decrypted or unencrypted messages, application(s) related to operation of system 100, etc.

Host logic 104 is configured to manage request(s) for cryptographic service(s), i.e., transactions, between elements of system 100 and LCE 102. For example, host logic 104 may be configured to determine whether a selected cryptographic primitive is available for performing cryptographic operations. In another example, host logic 104 may be configured to set and/or determine policy for access to LCE 102 by one or more elements of system 100, as described herein. LCE 102 may be accessed by host logic 104, processor 110 and/or memory controller 114.

Thus, host system 100 may include an LCE 102 configured to provide cryptographic services as described herein.

Figure 2:
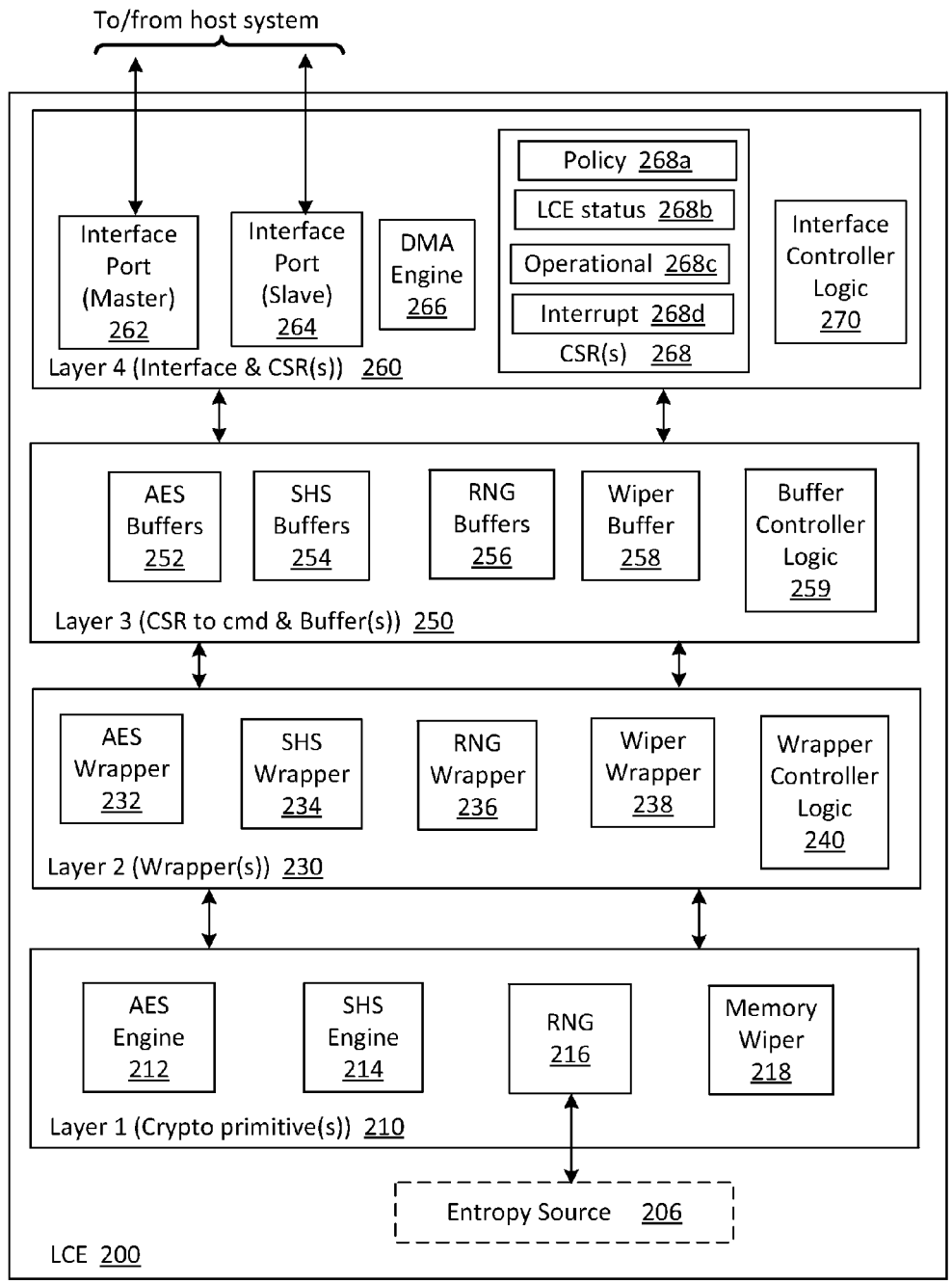
FIG. 2 illustrates a functional block diagram of an LCE consistent with various embodiments of the present disclosure.

FIG. 2 illustrates a functional block diagram of an LCE 200, consistent with various embodiments of the present disclosure. FIG. 2 may best be understood when considered in combination with FIG. 1. LCE 200 is one example of LCE 102 of FIG. 1 and may thus provide cryptographic functionality to a system, e.g., system 100 of FIG. 1. LCE 200 may be considered as a plurality of functional layers. Each layer corresponds to a functional grouping. In other words, the layer structure relates to functional characteristics that may or may not correspond to a specific physical configuration.

A first layer (Crypto primitive(s)) 210 includes one or more cryptographic primitive(s). The cryptographic primitive(s) may include an AES engine 212, a SHS engine 214, a random number generator (RNG) 216 and/or a memory wiper 218. The RNG 216 may be coupled to an entropy source (ES) 206. A second layer (Wrapper(s)) 230 includes one or more wrapper(s) related to the cryptographic primitive(s) of the first layer 210. Thus, the second layer 230 may include an AES wrapper 232, a SHS wrapper 234, an RNG wrapper 236 and/or a wiper wrapper 238. The second layer 230 may include wrapper controller logic 240. The wrapper controller logic 240 may be included in one or more of the wrapper layer elements 232, 234, 236, 238. The wrapper layer elements 232, 234, 236, 238 are configured to support the first layer cryptographic primitives. For example, one or more of the wrapper layer elements 232, 234, 236 and/or 238 are configured to add padding, execute different cipher modes, compute a length of the whole message for Hash operations, maintain a record of source and destination addresses, maintain a record of block length, control random number generation flow, etc.

Whether the second layer 230 includes a specific wrapper element 232, 234, 236 and/or 238 is based, at least in part, on the cryptographic primitive(s) included in the first layer 210. For example, if the first layer includes only the AES engine 212, then the second layer 230 may not include the SHS wrapper 234, the RNG wrapper 236 nor the wiper wrapper 238. Selection of fewer than all of the cryptographic primitives and their associated wrappers is configured to facilitate optimization of the LCE 200. For example, a system 100 that corresponds to a sensor system may be configured to operate for an extended period of time at relatively low power. In this example, it may then be desirable to minimize the power consumption of both system 100, in general, and LCE 102, in particular. Thus, the first layer 210 may be configured to include the AES engine 212 and the second layer may be configured to include the AES wrapper 232. The AES engine 212 may then be configured to provide both confidentiality and integrity for system 100. Power consumption and physical size may then be reduced.

A third layer (CSR (control and status register) to command (cmd) & Buffer(s)) 250 includes one or more buffers configured to store commands, data and/or cryptographic keys. The CSR to cmd & Buffer(s) 250 may include one or more of AES buffers 252, SHS buffers 254, RNG buffers 256 and/or a wiper buffer 258. For example, each buffer in buffers 252, 254, 256, 258 may be configured to store 128 bits. Similar to the wrapper(s) 230, whether the CSR to cmd & Buffer(s) layer 250 includes AES buffers 252, SHS buffers 254, RNG buffers 256 and/or wiper buffer 258 is based, at least in part, on the cryptographic primitive(s) 212, 214, 216 and/or 218 that may be present in crypto primitives layer 210. In other words, if a selected primitive is not present, then the associated buffer(s) may not be included in the third layer 250, thus, further reducing die area for LCE 200.

The third layer 250 may further include buffer controller logic 259. Buffer controller logic 259 is configured to manage writing to and/or reading from buffers 252, 254, 256, 258. Buffer controller logic 259 is configured to handle exceptions and generate appropriate interrupts related to writing to and reading from the buffers 252, 254, 256, 258. Buffer controller logic 259 is configured to maintain data input buffer(s) and/or data output buffer(s). In other words, buffer controller logic 259 is configured to provide control inputs to buffers 252, 254, 256, 258.

A fourth layer (Interface and CSR(s)) 260 includes a first (Master) interface port 262, a second (Slave) interface port 264, a DMA engine 266, one or more CSR(s) 268 and/or interface controller logic 270. The Interface and CSR(s) layer 260 is configured to couple the LCE 102, 200 to element(s) of system 100 including, e.g., interconnect 116. The Interface and CSR(s) layer 260 is configured to receive transaction(s) from one or more element(s) of system 100, e.g., host logic 104, and to provide results to one or more element(s) of system 100, e.g., memory 106. For example, write transactions received from system 100 via the second interface port 264 may be processed and stored in respective CSR(s). In another example, transaction data received from system 100 via the first interface port 262, e.g., as 32-bit words, may be combined into, for example, 128-bit operand and stored in buffer(s) 252, 254, 256 and/or 258 for input into one or more cryptographic primitive(s). In another example, processed data (e.g., 128 bits) may be split into, e.g., 32-bit words for writing to system 100.

The master interface port 262 is configured to be utilized by LCE 200 to write data to and/or read data from system 100. For example, DMA engine 266 may be configured to write data to and/or to read data from memory 106 via master interface port 262. LCE 200 may utilize the master interface port 262 to provide transaction information to system 100. Slave interface port 264 is configured to be utilized by element(s) of system 100, e.g., host logic 104, memory controller 114 and/or processor 110 to write transaction information to and/or read transaction information from LCE 200. Transaction information may include, but is not limited to, control information, status information, identifiers, data, etc. DMA engine 266 is configured to provide direct memory access functionality between LCE 200 and host system memory, e.g., memory 106 and/or external memory 124. The master interface port 262, slave interface port 264 and DMA engine 266 may be shared by AES engine 212 and SHS engine 214. Thus, DMA engine 266 may be configured to multiplex data to/from AES engine 212 and SHS engine 214.

CSR(s) 268 are configured to support operation of LCE 200 and to provide an interface between element(s) of system 100 that may request cryptographic service and LCE 200. CSR(s) 268 are configured to store control and/or status information related to LCE 200. Cryptographic service includes encryption, decryption, cryptographic hashing, providing random number(s) and/or memory wiping. Element(s) of system 100 that may access LCE 200 include host logic 104, processor 110 and/or memory controller 114. Memory 106 may be accessed by LCE 200, as described herein. LCE 200 may be accessed via interconnect 116.

CSR(s) 268 may include policy CSR(s) 268a, an LCE status CSR 268b, operational CSR(s) 268c and interrupt CSR(s) 268d, collectively 268. Operational and interrupt CSR(s) 268c, 268d are related to the cryptographic primitive(s) available in the first layer 210. The policy CSR(s) 268a are configured to implement policy related to access to LCE 200. Policy CSR(s) 268a may include a policy control CSR, a read policy CSR and/or a write policy CSR. Policy control CSR may be related to permission to access policy CSR(s) 268a. The read policy CSR is related to permission to read from LCE 200. The write policy CSR is related to permission to write to LCE 200. Thus, access, reading and/or writing by one or more element(s) of a system, e.g., system 100, may be allowed and/or denied based, at least in part, on contents of the policy CSR(s) 268a.

For example, each policy CSR may include a bit field that corresponds to a selected element of system 100 and a state of each respective bit (i.e., set or reset) may then indicate whether (or not) the selected element has permission. Default values of the bits included in policy control CSR may allow, for example, the processor 110 or the host logic 104 to access the policy CSR(s) 268a. The processor 110 and/or the host logic 104 may then be configured to grant, deny or modify LCE access permission(s) by adjusting selected bits in the policy control CSR.

A number of bits included in each of the policy CSR(s) 268a may be relatively small. A minimum of number of bits may correspond to a number of elements of system 100 that may be allowed access to LCE 200. For example, for system 100, each policy CSR may include bits that correspond to processor 110, host logic 104, memory 106 (e.g., related to DMA) and/or LCE 200. Additional bits may be included, e.g., reserved for future use. For example, the number of bits may correspond to one byte, i.e., eight bits. Of course, more or fewer bits may be included in each policy CSR.

CSR(s) 268 may include an LCE status CSR 268b related to a status of respective cryptographic elements of the LCE 200. Status indicators, as will be described in more detail below, may include indicator(s) related to whether a selected command and/or key buffer is full, whether random number buffer(s) are empty, whether the RNG is available and/or whether the memory wiper is ready or is busy.

CSR(s) 268 may further include operational CSR(s) 268c related to operation of the cryptographic primitive(s) (AES engine 212, SHS engine 214, RNG 216 (including entropy source 206) and/or memory wiper 218). Whether operational CSR(s) 268c related to AES engine 212, SHS engine 214, RNG 216 and/or memory wiper 218 are included in CSR(s) 268 depends, at least in part, on whether AES engine 212, SHS engine 214, RNG 216 and/or memory wiper 218, are included in LCE 200. In other words, die area associated with CSR(s) 268 may be reduced by selectively including a subset of operational CSR(s) 268c. The contents of the subset is based, at least in part, on the contents of the crypto primitives layer 210.

When AES engine 212 is included in LCE 200, operational CSR(s) 268c may include AES operational CSR(s). AES operational CSR(s) may include AES command CSR(s) that include one or more of a context identifier (ID), a block ID, a first block indicator, a last block indicator, mode indicator(s) (e.g., enhanced and/or AES mode) and/or an encryption or decryption indicator. AES command CSR(s) may further include a block length or, for a message that includes packets, packet length, header length and footer length. AES operational CSRs may further include a source address and a destination address. AES operational CSR(s) may further include one or more a key values. AES operational CSR(s) may further include one or more initialization vector(s) (IV(s)). The IV(s) may include IV value(s), nonce(s) (i.e., a value used, at most, once in a session) and/or a header length and a communication protocol indicator, as will be described in more detail below.

When SHS engine 214 is included in LCE 200, operational CSR(s) 268c may include SHA2 operational CSR(s). SHA2 operational CSR(s) may include SHA2 command CSR(s) that include a block ID, a mode indicator, a first block indicator, a last block indicator and/or a block length. The block ID in the SHA2 command CSR refers to a message block. Since a SHS engine is configured to determine a message digest, a message may be of arbitrary length. SHS operational CSR(s) may allow message lengths of, e.g., $2^{24}$ bits. Streaming data may have larger message lengths. Thus, using a context identifier to refer to the message, the message block ID may be used to identify a portion of the message. In other words, one context ID may be associated with a plurality of message block ID(s). Each message block may then include a plurality of SHA2 blocks. For example, the SHA2 blocks may have a length of 512 bits. A length of a message block associated with a block ID (e.g., 1) may be any value greater than 512 bits up to, for example, $2^{24}$ bits. A total length of a message associated with a context ID (e.g., 10) may be any value greater than 512 bits. SHA2 operational CSRs may further include a source address and a destination address.

When RNG 216 is included in LCE 200, operational CSR(s) 268c may include an RNG CSR. The RNG CSR is configured to store random data generated, for example, by RNG 216. The random data may be based, at least in part, on ES 206, as described herein. The RNG CSR may be read by an element of the host system 100 to retrieve a random number.

When memory wiper 218 is included in LCE 200, operational CSR(s) 268c may include a source address CSR and a block length CSR. The source address CSR is configured to indicate a starting address of a memory block to be erased. The block length CSR is configured to indicate a length, in bytes, of a block of memory to be erased. A minimum block size is one byte.

CSR(s) 268 may further include one or more interrupt CSR(s) 268d configured to provide handshaking between LCE 200 and host system 100. For example, the interrupt CSR(s) 268d may include an interrupt status CSR and a corresponding interrupt mask CSR. Together, the interrupt status CSR and interrupt mask CSR may manage triggering interrupt(s) in response to changes in status bits of the interrupt status CSR. The LCE 200, e.g., interface controller logic 270, may be configured to manage the interrupt status CSR and an element in the host system 100 may be configured to manage the interrupt mask CSR. For example, the status bits in the interrupt status CSR may be configured to indicate that an operation, e.g., memory wiping, has completed, that an error has occurred and/or that a selected buffer has become available. If a corresponding bit in the interrupt mask CSR is asserted (e.g., set) than an interrupt may be triggered. The host logic 104 and/or processor 110 may be configured to respond to the interrupt to, for example, attempt to initiate an encryption or decryption process, as described herein. The interrupt CSR(s) 268d may further include identifier CSR(s) configured to identify a context and/or block related to the interrupt. The identifier CSR(s) may be related to one or more of the cryptographic primitive(s), as described herein.

Generally, during operation, host logic 104, processor 110 and/or memory controller 114 may be configured to read the LCE status CSR 268b to determine a status of the LCE 200 and/or status of cryptographic primitive 212, 214, 216 and/or 218. If the status corresponds to available, then the host logic 104, processor 110 and/or memory controller 114 may write to selected CSR(s) via slave interface port 264. If the status corresponds to not available, then the host logic 104, processor 110 and/or memory controller 114 may set a bit in a selected interrupt mask CSR and wait for an interrupt that indicates that the status has changed to available. The LCE 200 is configured to generate the interrupt when the LCE 200, and/or selected cryptographic primitive 212, 214, 216 and/or 218 becomes available and the related bit(s) in the selected interrupt status CSR are set.

Turning now to CSR to cmd and buffer(s) layer 250, AES buffers 252 may include one or more AES command (cmd) buffer(s) and one or more AES key buffer(s). The AES cmd buffer(s) are configured to store AES command(s). The AES key buffer(s) are configured to store one or more cryptographic key(s) and/or one or more IV(s), related to AES operations. Interface controller logic 270 of layer 260 may be configured to generate an AES command based, at least in part, on information written to and read from AES operational CSR(s). For example, the AES command may include a context ID, a block ID, a source address, a destination address, a block length, a first block indicator, a last block indicator, an AES mode indicator and/or an encryption or decryption indicator. An AES command may have a bit length of 128 bits. AES commands with longer or shorter bit lengths may also be used. The generated AES command may then be stored in an AES cmd buffer included in AES buffers 252.

SHS buffers 254 may include one or more SHA2 cmd buffer(s) configured to store SHA2 command(s). Interface controller logic 270 may be configured to generate an SHA2 command based, at least in part, on information written to SHA2 operational CSR(s). For example, the SHA2 command may include a context ID, a message block ID, a source address, a destination address, a message block length, a first block indicator, a last block indicator and/or an SHA2 mode indicator. SHA2 modes may include SHS and HMAC. The generated SHA2 command may then be stored in an SHA2 cmd buffer.

The RNG buffers 256 are configured to store a plurality of random numbers. The random numbers may be generated by RNG 216 based, at least in part, on ES 206. The random numbers, when available, may then be read, i.e., consumed, by element(s) of host system 100. The wiper buffer 258 is configured to store a wiper command. For example, interface controller logic 270 may be configured to generate the wiper command based, at least in part, on information (e.g., address and block length) written to the wiper command CSR. The wiper command may thus include an indicator related to a starting address in memory 106 to be wiped and a length corresponding to a number of bytes to be erased.

Thus, the third layer 250 may include a plurality of buffers. The buffers are configured to store, inter alia, commands formed from information stored in CSR(s) 268.

Figure 3:
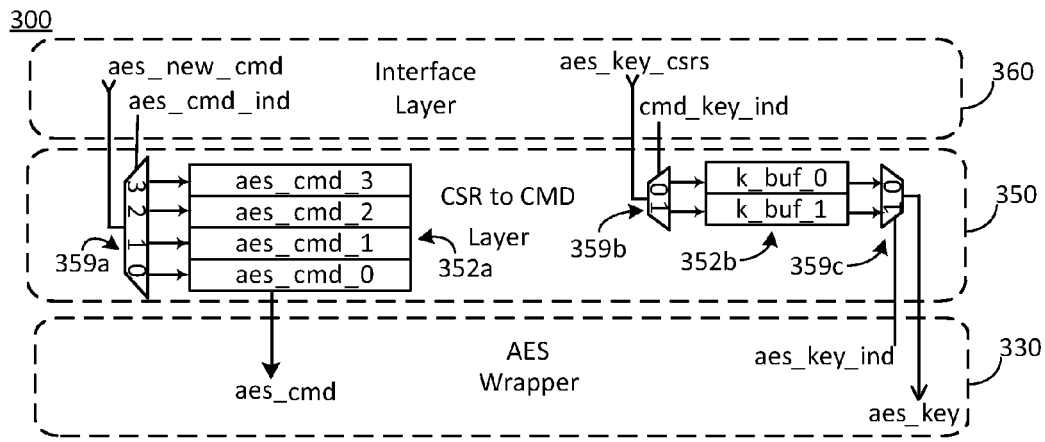
FIG. 3 illustrates one example Advanced Encryption Standard (AES) buffer configuration, consistent with various embodiments of the present disclosure.
Figure 4:
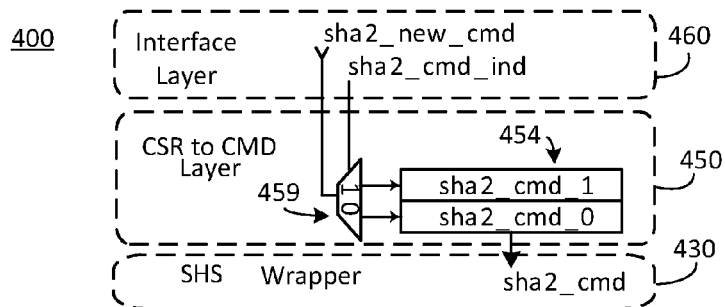
FIG. 4 illustrates one example Secure Hash Standard (SHS) buffer configuration, consistent with the present disclosure.
Figure 5:
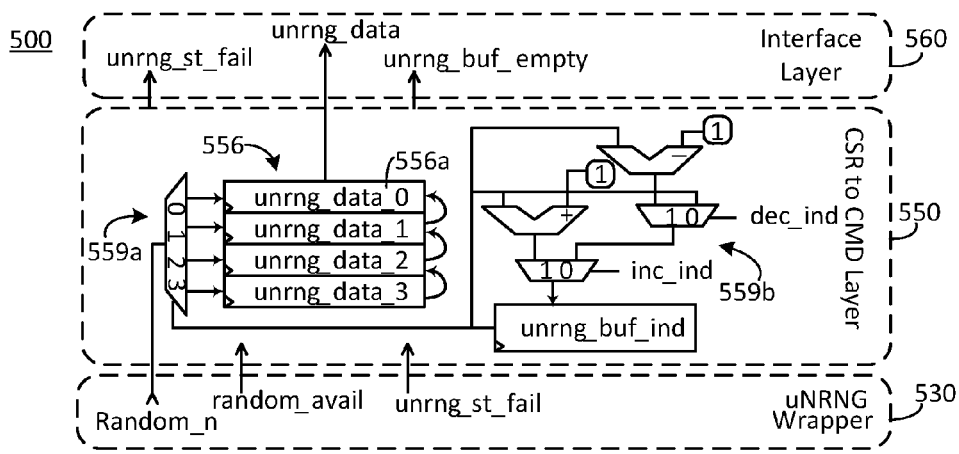
FIG. 5 illustrates one example random number generator (RNG) buffer configuration, consistent with the present disclosure.

FIGS. 3, 4 and 5 illustrate example buffer configurations 300, 400, 500 that correspond to AES buffers 252, SHS buffers 254 and RNG buffers 256, respectively, of FIG. 2. A total number of buffers is related to whether a selected cryptographic primitive is included in LCE 200. A number of buffers for a selected cryptographic primitive is related to the specific primitive and the optimizations implemented for that specific primitive. For example, a minimum cryptographic primitive may utilize relatively fewer buffers and may have a relatively lower associated throughput than an optimized cryptographic primitive that uses relatively more buffers and may have an associated relatively higher throughput. Buffer configurations 300, 400, 500 illustrate information communicated between buffers included in, e.g., layer 250, and an interface layer, e.g., layer 260, and a wrapper layer, e.g., layer 230.

FIG. 3 illustrates one example AES buffer configuration 300, consistent with various embodiments of the present disclosure. AES buffer configuration 300 includes a CSR to cmd layer 350. CSR to cmd layer 350 corresponds to at least a portion of CSR to cmd and buffer(s) layer 250. AES buffer configuration 300 illustrates inputs to CSR cmd layer 350 from interface layer 360 and outputs from CSR to cmd layer 350 to AES wrapper 330. Interface layer 360 corresponds to interface and CSR(s) layer 260 of FIG. 2. AES wrapper 330 corresponds to AES wrapper 232 of FIG. 2.

CSR to cmd layer 350 includes a first number of AES command buffers 352a coupled to command selection logic 359a and a second number of AES key buffers 352b coupled to key selection logic 359b, 359c. The AES command buffers 352a are configured to store AES command(s) and the AES key buffers 352b are configured to store AES key(s). The AES keys may include cryptographic keys and/or IVs (i.e., initialization vectors). Selection logic 359a, 359b, 359c may include a multiplexer (mux) and/or a demultiplexer (demux). The selection logic 359a, 359b, 359c may correspond to at least a portion of buffer controller logic 259.

In this example 300, the first number of AES command buffers 352a is four and the second number of AES key buffers 352b is two. An optimum number of AES key buffers 352b may be related to the number of AES command buffers 352a. An AES command includes a block length field that is configured to contain a block length value of a block of data and/or message to be operated on by AES engine 212 (and AES wrapper 232). For example, a 128-bit AES command may include a 24-bit block length field, thus, a block length (i.e., size) of up to $2^{24}$ bits (about 16 megabits (Mb)) may be operated on by the AES engine 212. A message of length greater than 16 Mb may be parsed into a plurality of message blocks, each with a length less than or equal to $2^{24}$ bits. The message blocks may be associated with a context ID (e.g., first context ID) via the AES command. For example, each of the plurality of message blocks may be associated with a first context ID. A same cryptographic key may then be used to encrypt (or decrypt) each message block associated with the first context ID. Thus, at least two consecutive message blocks associated with two consecutive AES commands may share the same cryptographic key. The cryptographic key may be maintained in one buffer and re-used for a plurality of AES commands. In this manner, a number of writes of the cryptographic key may be reduced and a number of key buffers may also be reduced. Thus, CSR to cmd layer 350 is configured to implement architectural optimizations, as described herein.

The key buffers 352b may store IVs and/or cryptographic keys. For a message that includes a plurality of message blocks, an associated cryptographic key may be maintained in a key buffer until an AES command that includes a new context ID (e.g., second context ID) is provided to the AES wrapper 330. If only one key buffer, e.g., k_buf_0, is included in key buffers 352b, AES operations may stall, waiting for processing of message blocks associated with the first context ID to complete before initiating processing of message block(s) associated with the second context ID. If an associated throughput, including stalls, is greater than or equal to a target throughput, then the number of key buffers may be reduced to one. Otherwise, the number of key buffers may be greater than one, e.g., may be two. Providing a plurality of key buffers 352b facilitates pipelining and avoids stalling by facilitating writing a cryptographic key associated with the second context ID to, for example, k_buf_1 while maintaining the cryptographic key associated with the first context ID in k_buf_0. Thus, the key in k_buf_0 remains available to the first context ID and k_buf_1 is available to receive the second key.

In operation, selection of command buffers 352a and selection of key buffers 352b for reading from and writing to is managed by AES wrapper 330, selection logic 359a, 359b, 359c and interface layer 360. An AES command to be written to command buffers 352a corresponds to aes_new_cmd and an AES command to be read from the command buffers 352a corresponds to aes_cmd. Aes_cmd_ind is a control signal to selection logic 359a configured to select an AES command buffer to receive aes_new_cmd. Aes_cmd is read from AES command buffer aes_cmd_0. Aes_new_cmd is written to the AES command buffer (aes_cmd_0, aes_cmd_1, aes_cmd_2, aes_cmd_3) selected by aes_cmd_ind. Aes_cmd_ind is related to an index (AES command index) that is incremented based, at least in part, on receipt of a new AES command and decremented based, at least in part, on consumption of a stored AES command. New AES commands may be provided by interface layer 360 based, at least in part, on updates to AES command CSR(s), as described herein. When a new command is provided, the AES command index may be updated by, e.g., buffer controller logic 259. A stored AES command may be consumed (i.e., read) by AES wrapper 330. When a stored AES command is consumed, the AES command index may be updated (i.e., decremented).

Continuing with this example, the AES command index is a 2-bit binary number configured to select one of four AES command buffers. The AES command index may be decremented by one when a stored AES command is read and incremented by one when a new AES command is written to the AES command buffer 352a. Using such an index for managing receipt of new AES commands and consumption of stored AES commands is configured to accommodate unequal time intervals associated with receipt of new AES commands and consumption of stored AES commands. In other words, the AES command index allows asynchronous receipt and consumption of AES commands. The AES command index may be further utilized to indicate that AES command buffer 352a is full and therefore unable to accept new AES commands. AES command buffer full may be further communicated to a host via an LCE status CSR, e.g., LCE status CSR 268b.

The AES key buffer 352b is managed using two key indexes. A first AES key index, cmd_key_ind is configured to control selection logic 359b to select an AES key buffer (k_buf_0, k_buf_1) to receive a next AES key (or initialization value (IV)), aes_key_csrs, from a AES operational CSR(s). A second AES key index, aes_key_ind, is configured to control selection logic 359c to select the AES key buffer from which to read the next AES key value, aes_key, to be provided to AES wrapper 330. Each AES key may be associated with a respective context and context ID. A received (and stored) AES key may be associated with an appropriate context ID by aes_key_ind. In other words, when a message block associated with a selected context ID is being processed, aes_key_ind is configured to point to the AES key buffer, e.g., k_buf_0, that stores the AES key associated with the selected context ID. When the context ID changes to a new context ID, the aes_key_ind may be toggled to point to the other AES key buffer (e.g., k_buf_1), based, at least in part, on the new context ID. For example, the aes_key_ind may be managed by the AES wrapper 330. The first AES key index cmd_key_ind may be similarly toggled when an AES key associated with the new context ID is received from interface layer 360.

The two AES key indexes, cmd_key_ind and aes_key_ind, are configured to facilitate maintaining two AES keys in AES key buffer 352b. In other words, a first AES key may be in use by the AES wrapper and/or AES primitive while a second AES key is stored to the AES key buffer 352b. The AES wrapper 330 and AES primitive may then continue to use the first AES key, selected by aes_key_ind, while the second AES key is stored to k_buf_0 or k_buf_1, selected by cmd_key_ind.

Thus, the number of command buffers and the number of key buffers included in AES buffers, e.g., AES buffers 252, may be optimized to reduce size and/or power consumption while maintaining an associated throughput greater than or equal to a target throughput. The optimizations implemented may be related to an allowable, e.g., target throughput.

FIG. 4 illustrates one example SHS buffer configuration 400, consistent with the present disclosure. SHS buffer configuration 400 includes a CSR to cmd layer 450. CSR to cmd layer 450 corresponds to at least a portion of CSR to cmd and buffer(s) layer 250. SHS buffer configuration 400 illustrates inputs to CSR to cmd layer 450 from interface layer 460 and outputs from CSR to cmd layer 450 to SHS wrapper 430. Interface layer 460 corresponds to interface and CSR(s) layer 260. SHS wrapper 430 corresponds to SHS wrapper 234.

CSR to cmd layer 450 includes a plurality of SHS command buffers 454 coupled to selection logic 459. Similar to AES command buffers, the number of SHS command buffers may be increased or decreased based, at least in part, on an allowable throughput, die area and/or power consumption. The SHS command buffers 454 are configured to store SHA2 command(s). Selection logic 459 may include a mux and/or a demux. The selection logic 459 may correspond to at least a portion of buffer controller logic 259.

In operation, selection of an SHS command buffer for reading from and writing to is managed by SHS wrapper 430, selection logic 459 and interface layer 460. Sha2_new_cmd corresponds to SHA2 command to be written to one of SHS command buffers 454 and sha2_cmd corresponds to an SHA2 command to be read from an SHS command buffer. Sha2_cmd_ind is a control signal, e.g. an index, to selection logic 459 that is configured to select the SHS command buffer to receive sha2_new_cmd. Sha2_cmd is read from SHS command buffer sha2_cmd_0. Sha2_new_cmd is written to the SHS command buffer (sha2_cmd_0, sha2_cmd_1) selected by sha2_cmd_ind. Similar to aes_cmd_ind, sha2_cmd_ind is related to an index (SHA2 command index) that is incremented based, at least in part, on receipt of a new SHA2 command and decremented based, at least in part, on consumption of a stored SHA2 command. New SHA2 commands may be provided by interface layer 460 based, at least in part, on updates to SHA2 command CSR(s), as described herein. A stored SHA2 command may be consumed (i.e., read) by SHS wrapper 430.

The SHA2 command index may correspond to one or two binary digits configured to select one of two SHS command buffers 454 and/or to indicate SHS command buffers 454 are full. The SHA2 command index may be decremented when a stored SHA2 command is read and incremented when a new SHA2 command is written to the SHS command buffer 454. Similar to the AES command index, the SHA2 command index allows asynchronous receipt and consumption of SHA2 commands. SHS command buffers full may be further communicated to a host via an LCE status CSR.

FIG. 5 illustrates one example RNG buffer configuration 500, consistent with the present disclosure. RNG buffer configuration 500 includes a CSR to cmd layer 550. CSR to cmd layer 550 corresponds to at least a portion of CSR to cmd and buffer(s) layer 250. RNG buffer configuration 500 illustrates outputs from CSR to cmd layer 550 to interface layer 560 and inputs to CSR to cmd layer 550 from RNG wrapper 530. Interface layer 560 corresponds to interface and CSR(s) layer 260. RNG wrapper 530 corresponds to RNG wrapper 236.

CSR to cmd layer 550 includes a number of RNG data buffers 556 coupled to selection logic 559a and 559b. The RNG data buffers 556 are configured to store random numbers (unrng_data_0, unrng_data_1, unrng_data_2, unrng_data_3). Selection logic 559a may include a mux and/or a demux. Selection logic 559b is configured to generate an RNG buffer index unrng_buf_ind based, at least in part, on whether a random number has been consumed from or received by RNG data buffers 556. The selection logic 559a, 559b may correspond to at least a portion of buffer controller logic 259.

In this example 500, the number of RNG data buffers 556 is four. A plurality of RNG data buffers is configured to provide a pool of random numbers with relatively less latency (i.e., relatively greater throughput) if two random number are requested in sequence by, e.g., host logic 104, compared to one RNG data buffer. The plurality of RNG data buffers 556 is configured to facilitate providing random numbers generated "on the fly" to, e.g., host system 100. Similar to AES command buffers, the number of command buffers 352a, 454 may be increased or decreased based, at least in part, on an allowable throughput, die area and/or power consumption.

The RNG buffer index is a 2-bit binary number configured to select one of four RNG data buffers. The RNG buffer index may be initialized to zero. The RNG buffer index may be incremented by one when a new random number is written to the RNG data buffers 556 and the RNG data buffers 556 are not full. The RNG buffer index may be decremented by one when a stored random number is consumed from the RNG data buffers 556 and the RNG data buffers are not empty. Using such an index for managing receipt of new random numbers and consumption of stored random numbers is configured to facilitate asynchronous receipt and consumption of random numbers. The RNG buffer index may be further utilized to indicate that RNG data buffer 556 is empty and therefore unable to provide new random numbers. RNG data buffer 556 empty may be further communicated to the host via, e.g., LCE status CSR.

In operation, a random number random_n may be received from RNG Wrapper 530 and stored in the RNG buffer (unrng_data_0, unrng_data_1, unrng_data_2 or unrng_data_3) selected by selection logic 559a and the RNG buffer index unrng_buf_ind. The value of unrng_buf_ind may be determined by selection logic 559b based, at least in part, on decrement index signal dec_ind and based, at least in part, on increment index signal inc_ind. The RNG buffer index, unrng_buf_index, is configured to select a next buffer in RNG data buffer 556 to receive a next random number. For example, when a random number is read (i.e., consumed), dec_ind may correspond to a logic one and ind_ind may correspond to a logic zero. As a result, selection logic 559b is configured to decrement unrng_buf_ind by one. In another example, when a random number is available for storage in RNG buffer 556, dec_ind may correspond to a logic zero and ind_ind may correspond to a logic one. As a result, selection logic 559b is configured to increment unrng_buf_ind by one. Thus, unrng_buf_ind may be configured to select a next available storage location in RNG buffer 556.

A stored random number, unrng_data_0, may be consumed, i.e., read, by interface layer 560. The stored random number, unrng_data_0, may be read from RNG buffer zero 556a. For example, unrng_data_0 may be read from RNG buffer zero 556a and stored in an RNG data CSR. In another example, RNG buffer zero 556a may correspond to the RNG data CSR. The random number unrng_data_0 may then be read from the RNG data CSR by, e.g., host logic 104, processor 110 and/or memory controller 114 via DMA. Any random numbers remaining in RNG data buffer 556 may then be shifted to adjacent less significant buffer(s). In other words, unrng_data_1 may move to unrng_data_0, unrng_data_2 may move to unrng_data_1, etc. A next random number may then be stored in a most significant empty RNG buffer of RNG data buffer 256.

CSR to cmd layer 550 may be configured to receive RNG status information from RNG Wrapper 530. For example, status information may include an indicator, random_avail, whether or not a random number is available. In another example, the status information may include an indicator, unrng_st_fail, related to whether the RNG passed (or failed) an RNG self-test. The self-test result indicator may be provided to the interface layer 560 by the CSR to cmd layer 550. The CSR to cmd layer 550 may further provide an RNG data buffers empty indicator, unrng_buf_empty, to the interface layer 560.

Thus, buffers included in CSR to cmd & buffers layer may be configured to store commands, cryptographic key(s) and/or random numbers. Commands, keys and/or random numbers may be written to and read from the buffers using indexes configured to facilitate asynchronous reads and writes. The numbers of buffers may be optimized to reduce and/or minimize die size and/or power consumption while maintaining an associated throughput at or above a target throughput.

Figure 6:
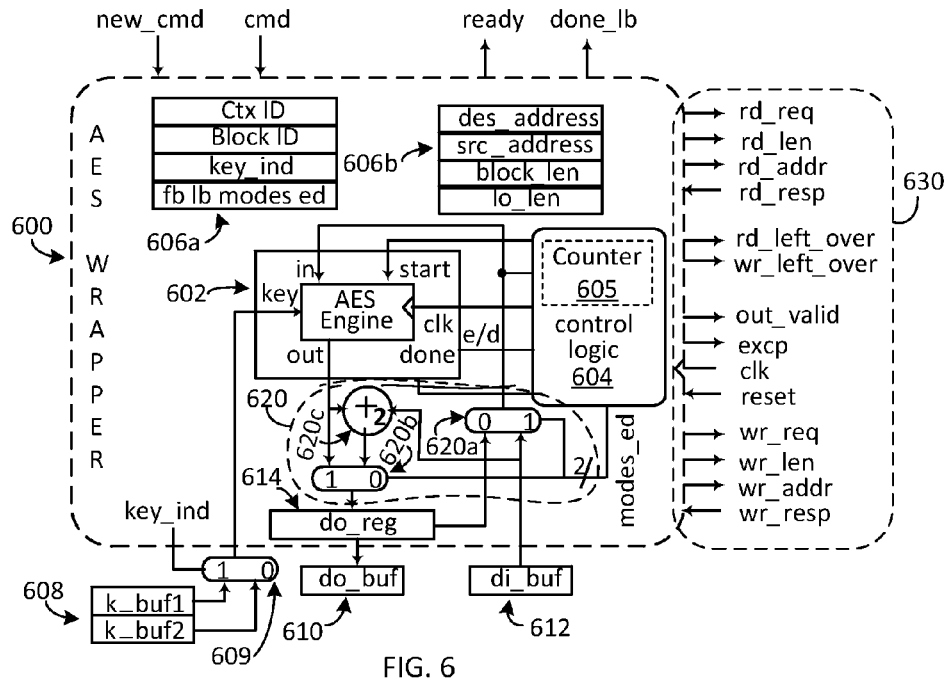
FIG. 6 illustrates an example AES wrapper and AES engine, consistent with various embodiments of the present disclosure.

FIG. 6 illustrates an example AES wrapper 600 and AES engine 602, consistent with various embodiments of the present disclosure. AES wrapper 600 is one example of AES wrapper 232 of FIG. 2. The AES wrapper 600 is coupled to one or more key buffer(s) 608, key buffer selection logic 609, an output buffer 610 and an input buffer 612. For example, the key buffer(s) 608, output buffer 610 and/or input buffer 612 may be included in AES buffers 252. Key buffer selection logic 609 may correspond to selection logic 359c of FIG. 3 and may be configured to receive a key selection input from AES wrapper 600, key_ind, as described herein. The key_ind may be included in a command, cmd, received by AES wrapper 600 from CSR to cmd & buffer(s) layer 250. Output buffer 610 is configured to store output data and input buffer 612 is configured to receive and store input data. The output buffer 610 and/or input buffer may have a size (e.g., length) of 128 bits. For example, input data and/or output data may be read and/or written using DMA.

The AES wrapper 600 includes control logic 604, a plurality of control information registers 606a, 606b, an output register 614 and mode selection logic 620. In some embodiments, control logic 604 may include a counter 605. The information stored in control information registers 606a, 606b may be received in an AES command ("cmd") from CSR to cmd & buffer(s) layer 250. Operations of AES wrapper 600 may be controlled by control logic 604. For example, control logic 604 may be included in wrapper controller logic 240 of FIG. 2. In another example, control logic 604 may be included in e.g., AES wrapper 252. Control information registers 606a are configured to store a context ID (Ctx ID), a block ID (i.e., a message block ID), the key index (key_ind) and a plurality of indicator fields (fb, lb, modes, ed). Field fb is configured to indicate that a related block is a first block in a sequence of one or more message block(s). Field lb is configured to indicate that a related block is a last block in a sequence of one or more message block(s). Field des_address is configured to point to a destination address for an encryption/decryption result and field src_address is configured to point to a source address for an encryption/decryption input. For example, src_address and/or des_address may be utilized by DMA engine 266 to read data to be encrypted or decrypted and to write the result. The addresses correspond to a starting address of a message block. Field block_len corresponds to block length, i.e., message block length.

Field lo_len corresponds to a length in bits (and/or bytes) of a portion of a prior block that is "leftover" from a prior block. Message blocks may or may not be a whole number multiple of AES block length (i.e., 128-bits). Rather than padding each non-final message block to achieve a message block length that is a whole number multiple of AES block length, lo_len may be used to prepend leftover bytes from a prior message block to a current message block. Control logic 604 may be configured to adjust a read length (rd_len) to accommodate the leftover bytes. Control logic 604 may be further configured to adjust a destination address for a write to accommodate the left over bytes.

Field "modes" is configured to select one of a plurality of modes related to AES encryption/decryption, as described herein. Field ed is configured to select between encryption or decryption. The modes and ed information (and other control information) may be received in an AES command ("cmd") from CSR to cmd & buffer(s) layer 250. Control logic 604 is configured to read the modes and ed fields and to provide related control signals to AES engine 602, as described herein.

AES wrapper 600 is configured to send and receive a plurality of control signals 630 related to reading data to be encrypted or decrypted by AES engine 602 and writing the result. For example, one or more of the control signals 630 may be provided to and/or received from interface and CSR(s) layer 260. For example, the data may be read and written via DMA, e.g., DMA engine 266. One or more of the plurality of control signals 630 may be related to communicating an exception and/or an output valid indicator. The exception and output valid indicators are configured to provide error notification and hand shaking between AES wrapper 600 and a host system. One or more of the plurality of control signal 630 may be configured to receive a clock signal and/or a reset signal.

AES wrapper 600 and/or control logic 604 are configured to provide a "ready" status signal and a done_lb status signal to buffer controller logic 259 and/or interface controller logic 270. The ready status signal is configured to indicate whether the AES wrapper is ready to receive a next command from CSR to cmd & buffer(s) layer 250. The next command may be related to a current context ID. The done_lb status signal is configured to indicate that a last (i.e., most recent) received command has completed processing and the most recent received command indicated last block associated with the current context ID.

AES wrapper 600 and/or control logic 604 are configured to receive a new_cmd signal and a command, cmd. New_cmd is an indicator that a new command is ready to be provided to the AES wrapper 600 and cmd corresponds to the new command. If done_lb was asserted then the new command may be related to a new context ID. If done_lb was not asserted then the new command may be related to the current context ID. The contents of the received command, cmd, may then be loaded into registers 606a, 606b. For example, the command may include fields context ID, block ID, source address, destination address, block length, key index, first block indicator, last block indicator, enhanced mode indicator, mode ID, and/or encryption/decryption indicator.

Enhanced mode indicator is configured to indicate whether a message block to be encrypted and/or decrypted contains packet(s). Enhanced mode corresponds to encrypting and/or decrypting packet(s). In the enhanced mode, AES wrapper 600 is configured to discard a packet header and footer data. The payload may then be provided to AES engine 602 for encrypting or decrypting.

AES wrapper 600 is configured to implement a plurality of modes of block cipher operations. The modes include, but are not limited to, Electronic Code Book (ECB), Cipher Feedback (CFB), Counter (CTR) and/or CCM (Counter mode with CBC-MAC (Cipher Block Chaining—Message Authentication Code)). One or more of the modes may be implemented for encryption and/or decryption. ECB, CFB, CTR and/or CCM may be configured to provide confidentiality and CCM may provide integrity. The modes are configured to be applied to an underlying symmetric key block cipher, e.g., AES. The AES wrapper 600, control logic 604 and mode selection logic 620 are configured to implement a selected mode. Mode selection logic 620 includes MUXes 620a, 620b and summing junction 620c. A mode may be selected based, at least in part, on the contents of the modes field and whether to encrypt or decrypt may be determined based, at least in part, on the ed field contents of buffer 606a.

For encryption, AES wrapper 600 and/or control logic 604 may be configured to provide each plain text block and associated cryptographic key to AES engine 602. Similarly, for decryption each cipher text block of a message (cipher_text) to be decrypted and key (k_buf1 or k_buf2) may be provided to AES engine 602. Each plain text block (plain_text) corresponds to an unencrypted (or decrypted) block, key is the cryptographic key and cipher_text corresponds to an encrypted block. The key may be selected from key buffers 608 by key index key_ind, as described herein. An input data block may be read from a memory location related to src_address. For example, the input data block may be read by DMA engine 266. The input data block may be stored in input buffer 612 and an output data block may be provided to the output buffer 610. The output data block may then be written to a memory location related to des_address. The src_address and des_address may correspond to pointers to a first address of a block associated with a message block. Control logic 604 and/or the DMA engine may be configured to manage offsets associated with intermediate AES blocks in a message block. For example, the output data block may be written by DMA engine 266. For encryption, AES engine 602 may be configured to execute an AES encryption function, aes_enc. For decryption, AES engine 602 may be configured to execute an AES decryption function, aes_dec.

ECB encryption corresponds to $$\text{cipher\_text} = \text{aes\_enc}(\text{plain\_text}, \text{key})$$

and ECB decryption corresponds to $$\text{plain\_text} = \text{aes\_dec}(\text{cipher\_text}, \text{key}).$$

Modes_ed control signals are configured to control MUXes 620a, 620b. For ECB, the MUX 620a is configured to select di_buf 612 that stores a block (i.e., AES block 128 bits) of input data and MUX 620b is configured to select an output of the AES engine 602. Thus, at the completion of processing the input block, output register 614 and output buffer 610 may contain an encryption result (i.e., cipher_text) or decryption result (plain_text).

CFB encryption corresponds to $$\text{cipher\_text}_i = \text{aes\_enc}(\text{cipher\_text}_{i-1}, \text{key}) \text{ XOR plain\_text}_i$$

and, similarly, CFB decryption corresponds to $$\text{plain\_text}_i = \text{aes\_dec}(\text{cipher\_text}_{i-1}, \text{key}) \text{ XOR cipher\_text}_i,$$

where $i=1, 2, \ldots, N$, N is the number of AES blocks in a message block and $\text{cipher\_text}_0$ is an initialization vector (IV). CFB encryption and decryption may thus include a chaining operation that utilizes a prior result. Initially, an IV may be provided that represents a prior result. In operation, initially, the IV may be stored in output register do_reg 614. di_buf MUX 620a may be configured to select do_reg 614, i.e., the control input to MUX 620a may be low (e.g., zero). The do_reg MUX 620b may be configured to select an output of summing junction 620c, i.e., the control input to MUX 620b may be low. The summing junction 620c is configured to provide as an output, a bit-wise exclusive-OR of two inputs. For CFB encryption, for i=N, MUX 620a may continue to select di_buf 612 that is configured to store a sequence of plain text values (i.e., $\text{plain\_text}_i$). For CFB decryption, for $i=2, \ldots, N$, MUX 620a may be controlled to select do_reg 614 that is configured to store the output of the summing junction 620c. Thus, AES wrapper 600 may be configured to implement CFB encryption or CFB decryption by controlling inputs to AES engine 602. In other words, control logic 604 may be configured to control selection logic 620 to implement CFB encryption or CFB decryption.

CCM is configured to provide both confidentiality and authentication. In other words, CCM includes both encryption (or decryption) of a message as well as a message digest, e.g., a message authentication code (MAC), that may be utilized to check message integrity. The encryption/decryption functionality is provided by CTR and the authentication is provided by CBC. For example, for packet processing, for each packet, a packet payload may be authenticated and encrypted and the packet header may be authenticated. In encryption, CBC may be applied to the packet (payload and header) plus a nonce to produce an associated MAC. The payload plus MAC may then be encrypted using CTR encryption to produce a transmitted encrypted payload plus MAC. In decryption, the received encrypted payload may be decrypted using CTR decryption to yield received payload. CBC may then be applied to the received payload, header and nonce to yield a test MAC. The test MAC may then be compared to the received MAC to check message integrity.

AES wrapper 600 is configured to implement CBC authentication and CTR encryption or decryption as two threads. CBC authentication is performed sequentially on each AES block of a sequence of AES blocks as:

$$X_1 = AES(key, B_0),$$

and $$X_{i+1} = AES(key, X_i \text{ XOR } B_i),$$

where i=1, 2, 3, ..., N, and $B_i$ correspond to AES blocks and i=1 corresponds to a first AES block. Initially, for i equal to zero, $B_0 = \{F, N, l(m)\}$, where F is a 1-byte authentication flag, N is a 104-bit nonce and l(m) is a 16-bit value that includes a header length in the most significant byte and a bit related to a length of an authentication tag, T, in the least significant byte. For example, for a BLE protocol, the authentication tag includes four bytes. In another example, for a WiFi protocol, the authentication tag includes eight bytes. The authentication tag, T, may then correspond to the first M bytes of $X_{N+1}$, where M is four or eight depending on the value of the authentication flag. The authentication tag T is related to and/or may correspond to a MAC.

Thus, in operation, initially $B_0$ may be stored in output register do_reg 614. di_buf MUX 620a may be configured to select do_reg 614 as input to AES engine 602. The do_reg MUX 620b may be configured to select an output of summing junction 620c as input to the output register do_reg 614. A sequence of AES blocks $B_1$ through $B_N$ may then be stored in the input buffer di_buf 612. After the $N^{th}$ AES block is processed, do_reg 614 may then store $X_{N+1}$. For authentication associated with CCM decryption, the MUXes 620a, 620b, may be similarly controlled. Rather than plain text AES blocks that are to be transmitted, AES blocks $B_1$ through $B_N$ may correspond to decrypted received AES blocks.

CTR encryption includes generating a counter (i.e., a sequence of counter values), encrypting each counter value and exclusive ORing the encrypted counter value with a respective AES block of plain text, $plain\_text_i$. CTR decryption includes generating a counter, encrypting each counter value and exclusive ORing the encrypted counter value with a respective AES block of cipher text $cipher\_text_i$. For the final AES block, if the final block is a partial block, then the most significant bits of the encrypted counter value are exclusive-OR'd with the final block. The number of bits of the encrypted counter value correspond to the number of bits of the partial block.

For example, the counter value may be formed as $A_i = \{F, N, i\}$, where F is a 1-byte CCM encryption flag, N is 104 bit nonce, and i is a 16-bit count that starts with zero. CTR encryption may then include $$S_i = aes\_enc(key, A_i)$$

and $$c_j = m_j \text{ XOR } s_j,$$

where $S_i$ corresponds to an encrypted counter value (i.e., key stream), j=0, 1, 2, ... in Bytes; each $s_j$ corresponds to a most significant ordered byte of the concatenation of $S_1$, $S_2$, $S_3$, ... $S_N$, and $m_j$ corresponds to bytes of the AES block to be encrypted. A MAC value, U, corresponding to the last bytes of the AES block may then be U=T XOR first_M_bytes($S_0$), where T is the authentication tag generated by CBC, as described herein.

In operation, the count may be generated by counter 605. Control logic 604 may then be configured to provide each counter value $A_i$ to the AES engine 602 to generate a respective encrypted counter value $S_i$. Selection logic 620 may then be configured to receive message bytes $m_j$ via, e.g., di_buf 612 and $s_j$ bytes to produce $c_j$ bytes. A last encryption value, U, may then be determined using the authentication tag, T and $S_0$.

Thus, AES wrapper 600 may be configured to implement one or more encryption and/or decryption modes by managing inputs to and outputs from AES engine 602.

Figure 7:
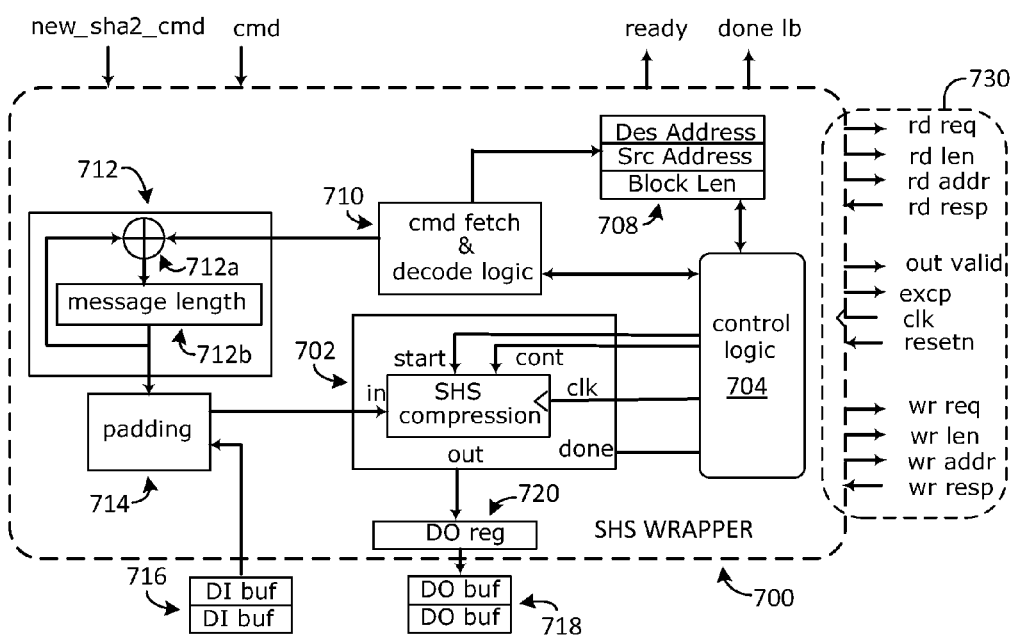
FIG. 7 illustrates an example SHS wrapper and SHS engine, consistent with various embodiments of the present disclosure.

FIG. 7 illustrates an example SHS wrapper 700 and an SHS engine 702, consistent with various embodiments of the present disclosure. The SHS wrapper 700 includes control logic 704, command information buffers 708, command fetch and decode logic 710, message length logic 712, padding 714 and output register do_reg 720.

The SHS wrapper 700 is coupled to one or more input buffers 716 and one or more output buffers 718. The buffers 716, 718 may be included in SHS buffers 254 of FIG. 2. Similar to AES wrapper 600, SHS wrapper 700 is configured to receive a plurality of control signals 730 related to reading data to be processed by SHS engine 602 and writing processed data. For example, one or more of the control signals 730 may be provided to and/or received from interface and CSR(s) layer 260. For example, the data may be read and written via DMA. One or more of the plurality of control signals 730 may be related to communicating an exception and/or an output valid indicator. One or more of the plurality of control signal 730 may be configured to receive a clock signal and/or a reset signal.

SHS wrapper 700 and/or control logic 704 are configured to provide a "ready" status signal and a done_lb status signal to buffer controller logic 259 and/or interface controller logic 270. The ready status signal is configured to indicate whether the SHS wrapper 700 is ready to receive a new command from CSR to cmd & buffer(s) layer 250. The new command may be related to a current context ID. The done_lb status signal is configured to indicate that a last (i.e., most recent) received command has completed processing and the most recent received command indicated last block associated with the current context ID.

SHS wrapper 700 and/or control logic 704 are configured to receive new_sha2_cmd and cmd control inputs. New_sha2_cmd is an indicator that a new SHA2 command is ready to be provided to the SHS wrapper 700 and cmd corresponds to the new SHA2 command. The SHA2 command may include CSR information related to the new command. For example, CSR information may include a context ID, a message block ID, a mode indicator, a block length, a source address and/or destination address. If done_lb was asserted then the new SHA2 command may be related to a new context ID. If the new SHA2 command is related to a new context ID, then the new SHA2 command may include the source address and the destination address. If done_lb was not asserted then the new SHA2 command may be related to the current context ID and the destination address may not be included in the SHA2 command.

Cmd & fetch decode logic 710 is configured to fetch and decode each received SHA2 command. For example, the command(s) may be received from command buffer(s) 454 of FIG. 4. Cmd & fetch decode logic 710 may then store a destination address, source address and/or block length in command information buffers 708. Context ID may be provided to control logic 704. Control logic 704 is configured to manage operations of SHS wrapper 700 and SHS engine 702. For example, control logic 704 may be configured to request SHA2 blocks to be read from memory, e.g., memory 106, and stored in input buffer(s) 716. For example, SHA2 blocks may be read from memory via DMA. Padding may be added to a last SHA2 block prior to being provided to SHS engine 702 by padding logic 714, as described herein. Each SHA2 hash output may be stored in output register 720 and may be written to output buffer(s) 718. Control logic 704 may then be configured to request that the SHA2 output written to memory, e.g., to the memory location pointed to by destination address.

In operation, a message associated with a context ID may be parsed into a plurality of message blocks. A message digest may then be determined for the message when processing of a final message block of the plurality of message blocks associated with the context ID is completed. A length of each message block may be less than or equal to a capacity of a block length field in an SHA2 operational CSR. For example, the block length field may have a capacity of 24 bits. Continuing with this example, the length of a message block may then be less than or equal to $2^{24}$ bytes. For streaming data, a message length and thus, a number, n, of message blocks, may not be known a priori. The host, e.g., host logic 104 and/or processor 110 of FIG. 1, may be configured to sequentially parse the message into message blocks. Each SHA2 command may include a block ID configured to identify each message block. An SHA2 command associated with a first message block may be provided to SHS wrapper 700 with an fb (i.e., first block) bit asserted. SHA2 commands associated with intermediate message blocks (i.e., n−2 message blocks) may not have the fb nor the lb bits asserted. The SHA2 command associated with the $n^{th}$ message block may have the lb bit asserted. Thus, whether a selected message block is a first message block, intermediate message block or a last message block may be communicated to SHA wrapper 700.

The length of each message block is configured to be a whole number multiple of an SHA2 block size, e.g., 512 bits. If the length of the message is not also a whole number multiple of the SHA2 block size, the last message block may have a length that is not a whole number multiple of the SHA2 block size. In order to create a last message block that has a length that is a whole number multiple of the SHA2 block size, padding, i.e., additional bits may be appended to the last message block. The SHS protocol provides a format for the padding bits that includes a binary representation of the unpadded length of the last message block. SHS wrapper 700 may be configured to append the padding to the last message block.

In some embodiments, the SHS wrapper 700 may be configured to determine a message length. In these embodiments, SHS wrapper 700 may be further configured to include the determined message length in the last message block padding. For example, cmd & fetch decode logic 710 may be configured to provide the block length associated with each decoded SHA2 command to message length logic 712. Message length logic 712 may include a summing junction 712*a* and a register 712*b* configured to store a message length. In operation, the message length register 712*b* may be initialized with the block length included in an SHA2 command associated with a first message block. The block lengths associated with each intermediate SHA2 command may then be added to the intermediate message length stored in the message length register using summing junction 712*a*. The message length of the last SHA2 message block may similarly be added to the value in the message length register 712*b*, yielding the message length. The message length may then be provided to padding logic 714. Padding logic 714 may then be configured to pad a last SHA2 block of the last message block with appropriate padding and the binary representation of the message length. The padded last SHA2 block may then be provided to SHS engine 702.

Determining the message length by the SHS wrapper 700 is configured to reduce a power consumption of host system 100 that includes LCE 200. For example, processor 100 and/or host logic 104 may be allowed to transition to a relatively low power mode, i.e., sleep mode, while LCE 200, SHS 700 wrapper and SHS engine 702 are operating on a message stored in memory 106. Power consumption of LCE 200 is configured to be relatively low and lower than the power consumption of host system 100, processor 110 and/or host logic 104. Thus, allowing elements of host system 100 to sleep is configured to reduce the overall power consumption of host system 100.

Thus, SHS wrapper 700 may be configured to manage SHA2 operations associated with hashing a message. In an embodiment, the message may be of arbitrary length. SHS wrapper 700 may thus be configured to parse a message block into 64 byte SHA2 blocks. SHS wrapper 700 may be further configured to determine the message block length in bytes, add associated padding to last SHA2 block and to deliver a final result, i.e., final hash to a destination address.

In an embodiment, SHS wrapper 700 and/or control logic 704 may be configured to determine an HMAC. For example, an SHA2 command (and/or CSR) may include an indicator that selects an SHA2 message digest or an HMAC as output of SHS wrapper 700 for an associated message (or message block). An HMAC includes a cryptographic key and is configured to prevent a "man-in-the-middle" attack on an associated message, as described herein. In this embodiment, a cryptographic key may be provided to SHS wrapper, in addition to the message.

Figure 8:
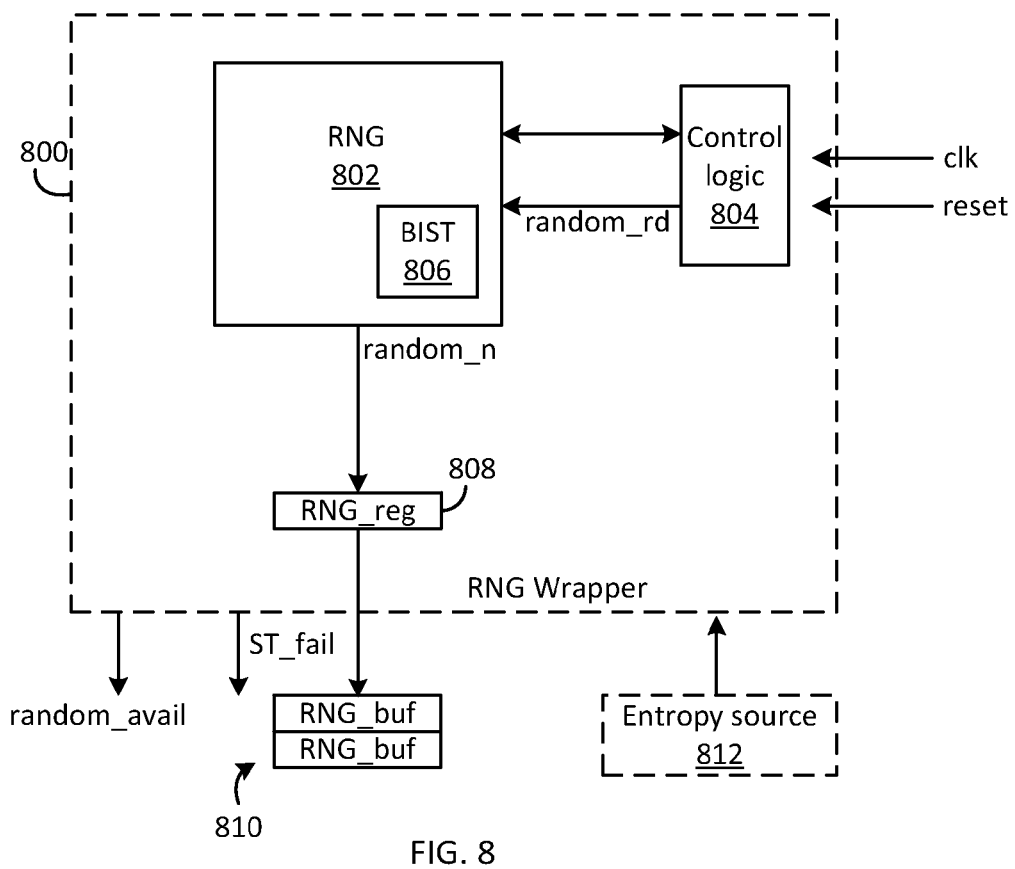
FIG. 8 illustrates a functional block diagram of an RNG wrapper and RNG, consistent with various embodiments of the present disclosure.

FIG. 8 illustrates a functional block diagram of an RNG wrapper 800 and RNG 802, consistent with various embodiments of the present disclosure. RNG wrapper 800 includes control logic 804 and a random number register RNG_reg 808. RNG 802 includes a built-in self test logic BIST 804. RNG wrapper 800 and RNG_reg 808 may be coupled to one or more RNG buffers 810. RNG wrapper 800 may be further coupled to an entropy source 812. Entropy source 812 may be configured to provide data to RNG 802 to facilitate generation of a random number.

In operation, RNG wrapper 800 is configured to receive a clock signal clk and a reset signal from, e.g., interface controller logic 270 of FIG. 2. In response to the reset signal, RNG wrapper 800 and/or control logic 804 are configured to trigger RNG 802 and/or BIST 806 to start a self test. The self test is configured to provide an indicator to a host system whether or not the RNG is available. If the self test fails, RNG wrapper 800 is configured to provide a self test fail signal ST_fail to interface controller logic 270. Interface controller logic 270 may then set an indicator bit in an LCE status CSR configured to indicate that the RNG is not available. If the self test is successful, i.e., self test passes, then control logic 804 is configured to provide a read random number signal random_rd to RNG 802. The random number random_n, if available, may be stored in the random number register 808. If an RNG buffer of RNG buffer(s) 810 is available, the random number may be stored in the RNG buffer(s) 810. If an RNG buffer is not available, then the RNG wrapper 800 may wait until an RNG buffer becomes available to store a next random number. Once the random number has been written to an RNG buffer, control logic 804 is configured to provide another random_rd to RNG 802. Thus, RNG wrapper 800 may manage operations of RNG 802.

RNG 802 may be a nondeterministic RNG. Entropy source 812 is configured to support operation of RNG 802. For example, entropy source 812 may include cross coupled inverters coupled to transistors controlled by a clock signal, e.g., clk. In another example, an entropy source 812 may include a random noise source, e.g., thermal noise.

RNG wrapper 800 and RNG 802 are configured to generate random numbers, as described herein. The random numbers may then be stored in one or more buffers, e.g., RNG buffers 256. A host system may then read one or more random number(s) from RNG buffers 256. For example, host logic 104 and/or processor 110 may read the random numbers via slave interface port 264.

In an embodiment, random numbers may be generated on-the-fly, i.e., may be generated relatively close in time to consumption. The random numbers may then be stored in and consumed from RNG buffer(s) 810. A number of RNG buffers included in RNG buffer(s) 810 may be optimized, i.e., increased or decreased, based, at least in part, on target die size, target power consumption and/or target throughput.

In another embodiment, RNG wrapper and RNG 802 may be configured to generate a plurality of random numbers in advance. These random numbers may then be stored in memory, e.g., memory 106. The number of random numbers generated in advance may be set by, for example, host logic 104. In this embodiment, the number of RNG buffers may be relatively small, e.g., one, since a supply of random numbers may be generated in advance.

Figure 9:
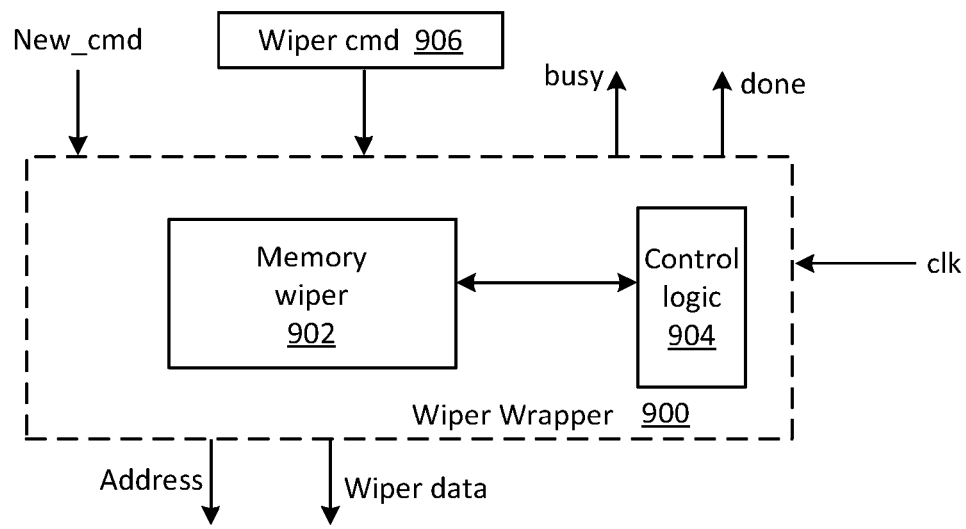
FIG. 9 illustrates a functional block diagram of wiper wrapper and memory wiper, consistent with various embodiments of the present disclosure.

FIG. 9 illustrates a functional block diagram of wiper wrapper 900 and memory wiper 902, consistent with various embodiments of the present disclosure. Wiper wrapper 900 includes control logic 904 and is coupled to a wiper command buffer 906. For example, wiper command buffer 906 may correspond to wiper buffer 258 of FIG. 2. Operation of wiper wrapper 900 and memory wiper 902 may be best understood when considered in combination with FIGS. 1 and 2. The memory wipe command may include a source address field and a block length field. The source address corresponds to a starting address for the memory wipe operation and the block length corresponds to the number of bytes to be erased.

Wiper wrapper 900 and memory wiper 902 are configured to wipe, i.e., erase a block of memory, e.g., memory 106. The block of memory may include as few as one byte. In an embodiment, the wiper command buffer 906 may be configured to store one memory wipe command. A memory wiper buffer with a capacity of one memory wipe command is configured to facilitate constraining memory wipe commands to one element of host system 100. The capacity is further configured to constrain operation of master interface port 262. In another embodiment, the wiper command buffer 906 may be configured to store a plurality of memory wiper commands. The capacity of the wiper command buffer 906 may be optimized for die area, power consumption and/or throughput.

Wiper wrapper 900 may be configured to receive a clock signal, clk, and a new command signal, new cmd. Wiper wrapper 900 may be further configured to provide as output a busy signal and/or a done signal. The busy signal and done signal may be one signal with busy corresponding to a first state (e.g., not asserted) and done corresponding to a second state (e.g., asserted). Wiper wrapper 900 may be further configured to provide as output an address and associated wiper data.

In operation, a memory wipe command may be written to wiper command buffer 906 by, e.g., buffer controller logic 259 and/or interface controller logic 270. New cmd signal may be asserted to indicate that a new wipe command has been stored to wiper command buffer 906. Control logic 904 may be configured to fetch and decode the stored wipe command and to assert busy signal. Asserting busy signal may result in a memory wiper busy bit being set in LCE status 268*b* configured to communicate to host system 100 that memory wiper 902 is busy and unable to accept additional memory wiper commands.

Memory wiper 902 is configured to provide a memory address related to the starting address and wiper data (e.g., zero byte) to, for example, DMA engine 266 for writing to memory 106 via master interface port 262. Memory wiper 902 may be configured to repeat the write operations until a memory block of size block length has been erased. When the memory block of size block length has been erased, control logic 904 and/or memory wiper 902 may be configured to assert the done signal. Asserting the done signal is configured to clear the wiper busy bit in the LCE status CSR 268*b*, thus, communicating that the memory wiper is available.

Thus, a block of memory of length one or more bytes may be cleared by wiper wrapper 900 and/or memory wiper 902.

Thus, wrapper(s) may be configured to facilitate operation of respective crypto primitive(s). Wrapper(s) may be configured to fetch and decode received commands. Wrapper(s) may be further configured to implement one or more modes, as described herein.

Figure 10:
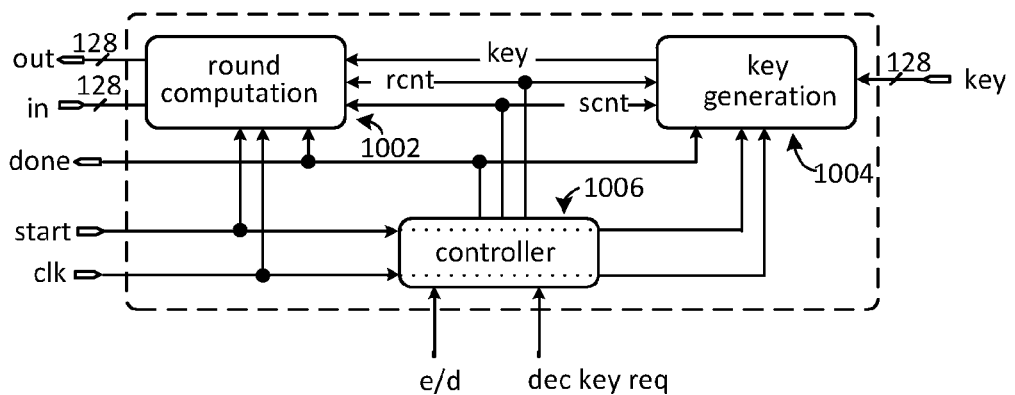
FIG. 10 illustrates a top level architecture of an AES engine, consistent with various embodiments of the present disclosure.

FIG. 10 illustrates a top level architecture of an AES engine 1000, consistent with various embodiments of the present disclosure. AES engine 1000 includes round computation logic 1002, key generation logic (i.e., key generation engine) 1004 and a controller 1006. AES engine 1000 is configured to receive an input (in) and a cryptographic key (key) and to provide an output (out). The input and output may each have a size, i.e., length, of 128 bits. The key may have a length of 128, 192 or 256 bits. For encryption, the input corresponds to plaintext and the output corresponds to ciphertext and for decryption, the input corresponds to ciphertext and the output corresponds to plaintext. Whether AES 1000 is configured to perform AES encryption or AES decryption depends on e/d signal input to controller 1006. AES engine 1000 is further configured to receive a start signal (start) and a clock signal (clk) and to provide a done signal (done). The start signal is configured to indicate that the input and key inputs are valid. The done signal is configured to indicate that an AES operation has completed. AES engine 1000 may be configured to receive a dec key req signal. The dec key req corresponds to a request for a decryption key. For example, the dec key req may be provided by AES wrapper 600. Round keys for AES decryption correspond to round keys for AES encryption with the order reversed. In response to the dec key req signal, AES engine 1000 is configured to perform an encryption with an associated user key as the initial key and to provide as output the round key associated with the last round of AES encryption. The AES wrapper may then provide the received last round key as the initial key to AES engine 1000 for the decryption operations.

Round computation logic 1002 is configured to perform round computation operations including SubBytes( ), ShiftRows( ), MixColumns( ) and AddRoundKey( ). Key generation logic 1004 is configured to generate round keys based, at least in part, on the cryptographic key input. The generated round keys may then be provided to round computation logic 1002.

AES engine 1000 and/or controller 1006 include a first counter rcnt (round count) and a second counter scnt (subround count). Counter rcnt is related to a number of rounds, i.e., round number, associated with round computation logic 1002. For example, counter rcnt may include four bits. Thus, rcnt may accommodate key lengths of 128, 192 or 256 bits. In other words, a 128-bit key length corresponds to ten rounds, a 192-bit key length corresponds to twelve rounds and a 256-bit key length corresponds to fourteen rounds. Counter scnt is configured to count a number of clock cycles associated with a round. For example, counter scnt may include two bits. Thus, the number of clock cycles associated with a round may be four. In other words, AES engine 1000 is configured to perform operations associated with a round in four clock cycles.

In operation, controller 1006 may be configured to synchronize the operations of round computation logic 1002 and the operations of key generation logic 1004. For example, key generation logic 1004 may be configured to generate the round keys on-the-fly.

Thus, AES engine 1000 is configured to determine a ciphertext from plaintext and/or a plaintext from a ciphertext.

Figure 11:
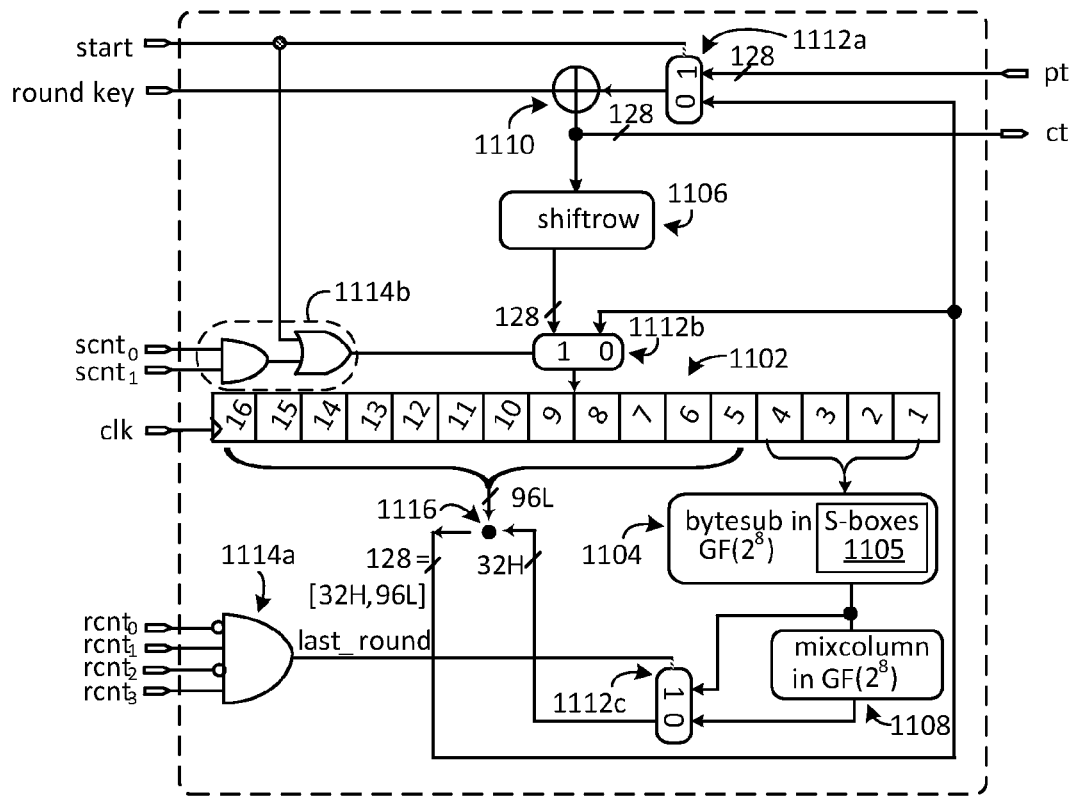
FIG. 11 illustrates an example data path for an AES engine, consistent with various embodiments of the present disclosure.

FIG. 11 illustrates an example data path 1100 for an AES engine, consistent with various embodiments of the present disclosure. Data path 1100 is one example of round computation logic 1002 of FIG. 10. Data path 1100 is configured to receive plaintext (pt), encrypt the received pt and to provide corresponding cihpertext (ct) as output. Like signal names in FIG. 11 correspond to like signal names in FIG. 10. $scnt_0$ and $scnt_1$ correspond to bits of scnt and $rcnt_0$, $rcnt_1$, $rcnt_2$, $rcnt_3$ correspond to bits of rcnt.

Data path 1100 includes a state register 1102, bytesub logic 1104, shiftrow logic 1106 and mixcolumn logic 1108. Bytesub logic 1104 includes one or more S-box(es) 1105. Data path 1100 further includes addroundkey logic 1110, a plurality of MUXes 1112a, 1112b, 1112c, a rcnt logic gate 1114a, scnt logic 1114b and a junction 1116. addroundkey logic 1110 is configured to perform a logic exclusive OR (XOR) operation on two input operands. For example, addroundkey logic 1110 is configured to perform an XOR operation on plaintext and a user key (i.e., an initial round of AES). In another example, addroundkey logic 1110 is configured to perform an XOR operation on an intermediate state and generated key, as described herein. Thus, one addroundkey logic 1110 may be used to perform both operations reducing die area compared to dedicated addroundkey logics. State register 1102 is configured to store an AES state, e.g., a state variable. State register 1102 includes sixteen bytes, numbered from one to sixteen. Each contiguous four bytes corresponds to a 32-bit word of the AES state variable, i.e., a column in a state array, as described herein.

Data path 1100 is configured to perform AES operations for each round as ShiftRows( ) followed by SubBytes( ) followed by MixColumns( ) followed by AddRoundKey( ). Ordering operations as ShiftRows( ) followed by SubBytes( ) is configured to facilitate utilizing one state register for round operations. Ordering operations as ShiftRows( ) followed by SubBytes( ) is further configured to avoid additional rearrangement of bytes in the state array to support subsequent operations. For example, state register 1102 may be configured as a 32-bit shift register. After a shift operation, each least significant four bytes may then represent a column of the state array. Each least significant four bytes (i.e., column of the corresponding state array) may then be processed by bytesub logic 1104 followed by mixcolumn logic 1108 without additional rearrangement.

Initially, input pt is XOR'd with a first roundkey (e.g., a user key) by addroundkey logic 1110. The start signal is configured to select pt as input to the addroundkey logic 1110 via MUX 1112a. The start signal is further configured to select the output of shiftrow logic 1106 as input into the state register 1102 via MUX 1112b and gate logic 1114b. An output (pt XOR user key) of the addroundkey logic 1110 may then be provided to shiftrow logic 1106. Shiftrow logic 1106 is configured to shift bytes corresponding to selected rows of the state array, as described herein. The row shifting corresponds to a first operation of a first round. The shifted rows may then be stored in state register 1102.

The least significant four bytes (i.e., bytes 1, 2, 3 and 4) of state register 1102 may be provided to bytesub logic 1104. Bytesub logic 1104 may include one or more S-box(es). For example, bytesub logic 1104 may include four S-boxes configured to implement $GF((2^4)^2)$ where GF is Galois Field. $GF((2^4)^2)$ may be implemented, for example, using combinatorial logic and may thus avoid storage registers. The result of bytesub logic 1104 may then be provided to mixcolumn logic 1108. The result of mixcolumn logic 1108 may then be stored in the four most significant bytes (i.e., bytes 13, 14, 15 and 16) of the state register 1102. For example, each of the four columns of the state array may be placed in the four least significant bytes of the state register 1102 in a respective clock cycle. Thus, the contents of the state register (i.e., the state variable) may be processed in four clock cycles. In other words, one round may be processed in four clock cycles.

When processing of the four most significant bytes of the state variable by mixcolumn logic 1108 completes, these four most significant bytes and the twelve least significant bytes stored in the state register 1102 may be combined at junction 1116 and provided to addroundkey logic 1110. For example, start signal may transition low to select the output of mixcolumn logic 1108 and junction 1116 via MUX 1112a for input to addroundkey logic 1110. addroundkey logic 1110 is configured to receive a round key from key generation logic, e.g., key generation logic 1004. While the start signal is low, if both scnt0 and scnt1 high (e.g., logic one), then the MUX 1112b is configured to select the output of shiftrow logic 1106 for input to the state register 1102; otherwise, the MUX 1112b is configured to select the output from junction 1116 for input to the state register 1102. In other words, once in every 4 clock cycles the MUX 1112b passes the output of shiftrow 1106 to the state register 1102. Provision of the round key may be synchronous with operations of data path 1100. Such synchronization may be provided, for example, using counters scnt and rcnt maintained by controller 1006 of FIG. 10. The output of the XOR operation may then be provided to shiftrow logic 1106. Providing the most significant bytes to the addroundkey logic 1110 is configured to avoid consuming an additional clock cycle writing the result to the state register 1102.

The operations of shiftrow logic 1106, bytesub logic 1104, mixcolumn 1108 and addroundkey logic 1110 may be repeated until a number of rounds has completed. For example, the number of rounds may correspond to nine (Nr−1) for a 128-bit key, as described herein. The final round may not include the mixcolumn logic 1108. The rcnt logic gate 1114a may be configured to select the output of bytesub logic 1104 via MUX 1112c when rcnt corresponds to the final round. The output of bytesub logic 1104 may be stored in state register 1102. When processing of the four most significant bytes of the state variable by bytesub logic 1104 completes, these four most significant bytes and the twelve least significant bytes stored in the state register 1102 may be combined at junction 1116 and provided to addroundkey logic 1110. addroundkey logic 1110 is configured to receive a round key from key generation logic, e.g., key generation logic 1004. The output of addroundkey logic 1110 may then correspond to ciphertext, ct.

Figure 12:
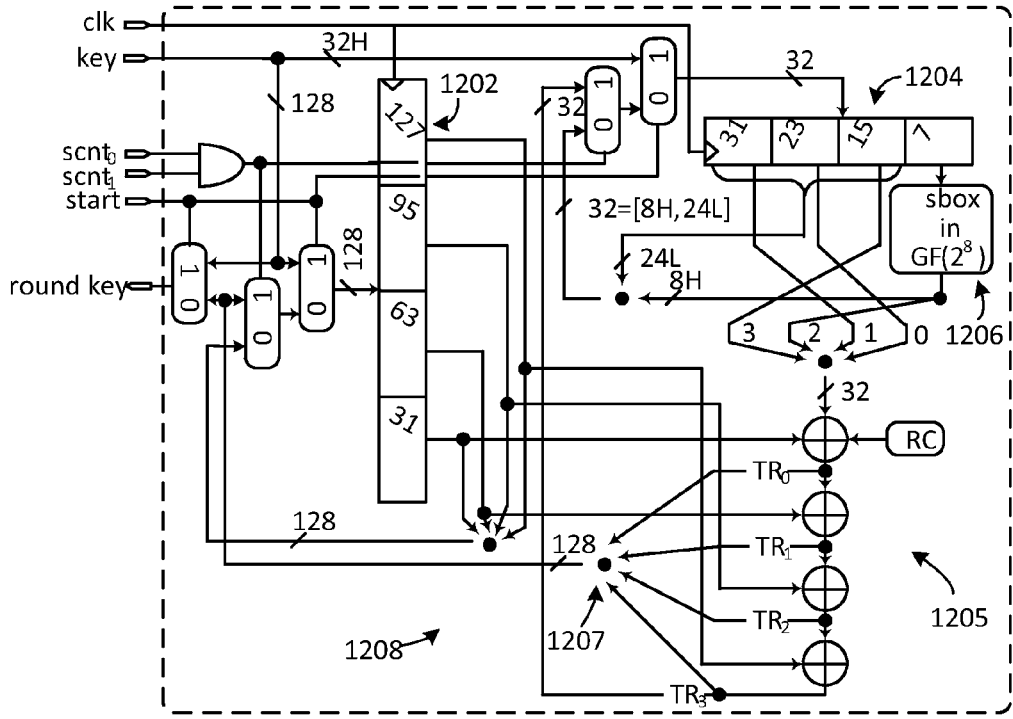
FIG. 12 illustrates an example key generation engine for an AES engine, consistent with various embodiments of the present disclosure.

FIG. 12 illustrates an example key generation engine 1200 for an AES engine, consistent with various embodiments of the present disclosure. Key generation engine 1200 is configured to generate round keys used for encryption based, at least in part, on a user key. Key generation engine 1200 is one example of key generation logic 1004 of FIG. 10. Like signal names in FIG. 12 correspond to like signal names in FIG. 9. $scnt_0$ and $scnt_1$ correspond to bits of scnt. Key generation engine 1200 is configured to generate each of a plurality of round keys utilized by an AddRoundKey( ) function, e.g., addroundkey logic 1110 of FIG. 11, included in an AES engine, e.g., AES engine 212 of FIG. 2.

Key generation engine 1200 includes a round key register 1202, a most significant bytes (MSB) register 1204, an S-box 1206, XOR logic 1205 and key generation logic 1208. Key generation engine 1200 is configured to receive a user key (key) and to generate a first round key based, at least in part, on the received user key. Key generation engine 1200 is further configured to generate subsequent round keys based, at least in part, on a prior round key. Each generated round key may be provided as output by key generation engine 1200. XOR logic 1205 is configured to receive a round constant, RC. Round constants are fixed 1 byte values specified by the AES standard. TR0, TR1, TR2, TR3, are intermediate 32-bit results of each round key generation that may be combined at junction 1207.

In operation, key generation logic 1208 is configured to implement a round key generation function. For example, key generation logic 1208 may be configured to capture the four most significant bytes of a received user key and to store the most significant bytes in MSB register 1204. One byte of the most significant bytes may be provided to S-box logic 1206. An output of the S-box logic 1206 and the remaining three bytes in the MSB register 1204 may then be utilized by key generation logic 1208 to generate a current round key. The four most significant bits of the current round key may then be similarly processed to yield a new round key. The process of using a current round key to generate a new round key may be repeated for a number of rounds minus one to produce a total of the number of round keys.

Key generation engine 1200 is configured to generate each round key in a same number of clock cycles (e.g., four) as number of clock cycles consumed to process one round in the AES engine. S-box logic 1206 is configured to process four bytes of the round key MSB 1204 in four clock cycles. Thus, S-box logic 1206 is configured to facilitate key generation engine 1200 supplying a new round key at each fourth clock cycle. Thus, key generation engine 1200 may be synchronized with round computation, as described herein.

Figure 13:
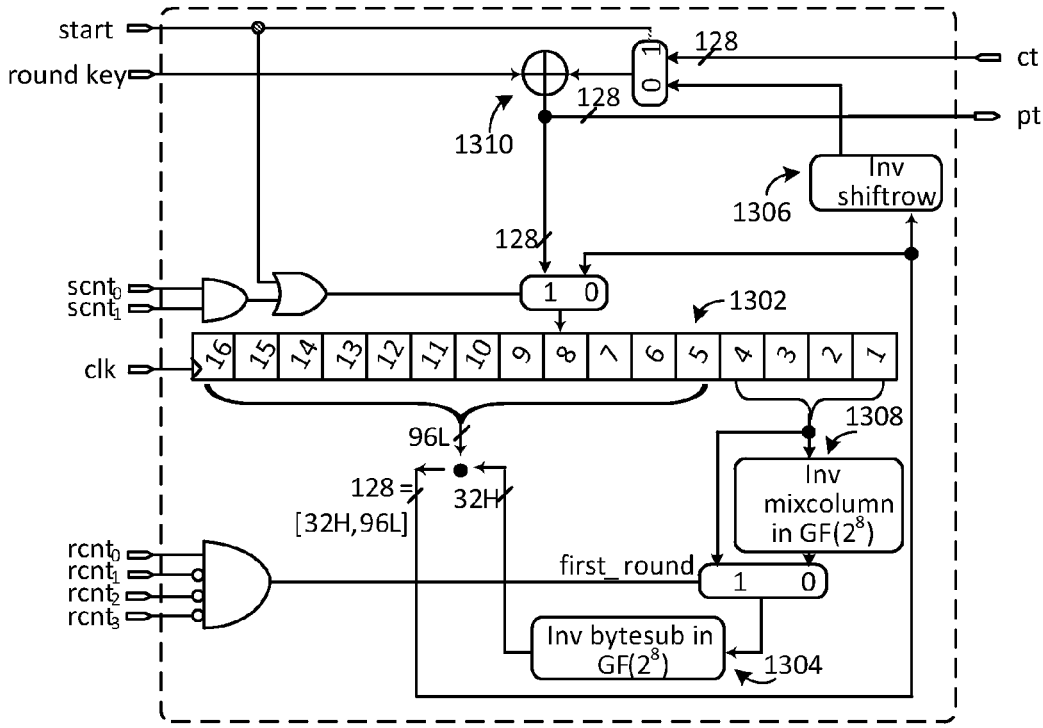
FIG. 13 illustrates an example data path for an AES engine, consistent with various embodiments of the present disclosure.

FIG. 13 illustrates an example data path 1300 for an AES engine, consistent with various embodiments of the present disclosure. Data path 1300 is one example of round computation logic 1002 of FIG. 10. Data path 1300 is configured to receive ciphertext (ct), decrypt the received ct and to provide corresponding plaintext (pt) as output. Like signal names in FIG. 13 correspond to like signal names in FIG. 10. $scnt_0$ and $scnt_1$ correspond to bits of scnt and $rcnt_0$, $rcnt_1$, $rcnt_2$, $rcnt_3$ correspond to bits of rcnt.

Data path 1300 includes a state register 1302, Invbytesub logic 1304, Invshiftrow logic 1306 and Invmixcolumn logic 1308. Data path 1300 further includes addroundkey logic 1310. Similar to example data path 1100 of FIG. 11, data path 1300 includes one state register 1302. Data path 1300 is configured to implement an inverse cipher that complies with AES, as described herein. Similar optimizations may be implemented in data path 1300 as may be implemented in data path 1100.

Figure 14:
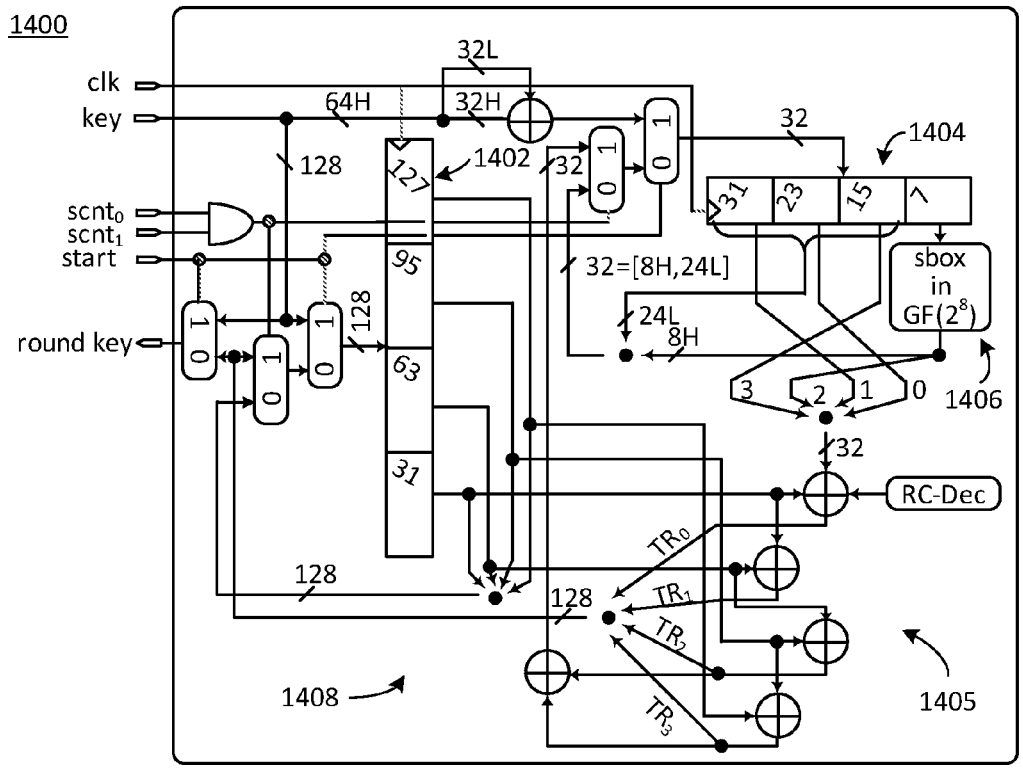
FIG. 14 illustrates an example decryption reverse key generation engine for an AES engine, consistent with various embodiments of the present disclosure.

FIG. 14 illustrates an example decryption reverse key generation engine 1400 for an AES engine, consistent with various embodiments of the present disclosure. Reverse key generation engine 1400 is configured to generate round keys used for decryption based, at least in part, on a user key. Reverse key generation engine 1400 is one example of key generation logic 1004 of FIG. 10. Like signal names in FIG. 14 correspond to like signal names in FIG. 10. $scnt_0$ and $scnt_1$ correspond to bits of scnt. Key generation engine 1400 is configured to generate each of a plurality of round keys utilized by an AddRoundKey( ) function, e.g., addroundkey logic 1310 of FIG. 13, included in an AES engine, e.g., AES engine 212 of FIG. 2.

Key generation engine 1400 includes a round key register 1402, a most significant bytes (MSB) register 1404, an S-box 1406, XOR logic 1405 and key generation logic 1408. Key generation engine 1400 is configured to receive a user key (key) and to generate a first round key based, at least in part, on the received user key. Key generation engine 1400 is further configured to generate subsequent round keys based, at least in part, on a prior round key. Each generated round key may be provided as output by key generation engine 1400. XOR logic 1405 is configured to receive a round constant, RC-dec. RC-dec are the round constants for AES decryption which may be the same values of RC used for AES encryption in reverse order.

Figure 15:
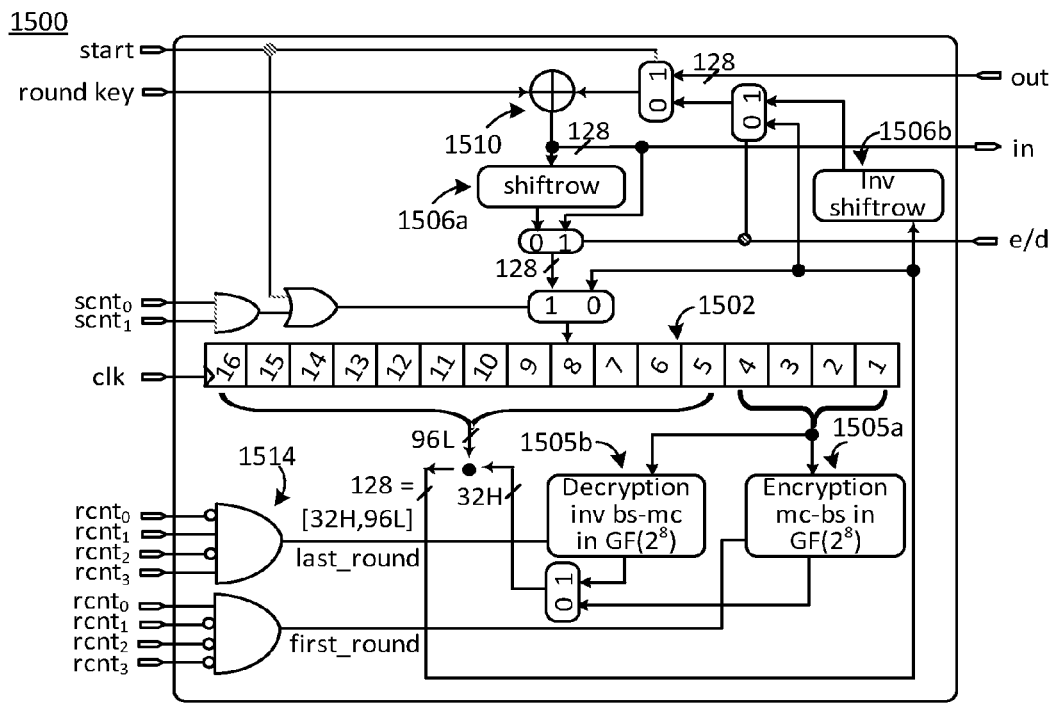
FIG. 15 illustrates an example data path for an AES engine, consistent with various embodiments of the present disclosure.

FIG. 15 illustrates an example data path 1500 for an AES engine, consistent with various embodiments of the present disclosure. Data path 1500 is one example of round computation logic 1002 of FIG. 10. Data path 1500 is configured to encrypt or decrypt input in based, at least in part, on control signal e/d where e corresponds to encrypt and d corresponds to decrypt. Thus, data path 1500 may be considered a combination of data path 1100 and data path 1300. Like signal names in FIG. 15 correspond to like signal names in FIG. 10. $scnt_0$ and $scnt_1$ correspond to bits of scnt and $rcnt_0$, $rcnt_1$, $rcnt_2$, $rcnt_3$ correspond to bits of rcnt.

Data path 1500 includes a state register 1502, encryption mix column and byte-substitution (mc-bs) logic 1505a, decryption inverse byte-substitution and mix column (bs-mc) logic 1505a, Shiftrow logic 1506a, Invshiftrow logic 1506b and addroundkey logic 1510. Data path 1500 further includes first and last round indication logic 1514. Similar to example data path 1000 of FIG. 10, data path 1500 includes one state register 1502. Data path 1500 is configured to implement a cipher and/or an inverse cipher that comply with AES, as described herein. Similar optimizations are implemented in data path 1500 as have been implemented in data path 1000 and data path 1200. Further, the state register 1502 and the addroundkey logic 1510 may be utilized for encryption and/or decryption. Thus, data path 1500 may provide both encryption and decryption in a die area that is less than a sum of the die area associated with encryption (e.g., data path 1100) and the die area associated with decryption (e.g., data path 1300).

Figure 16:
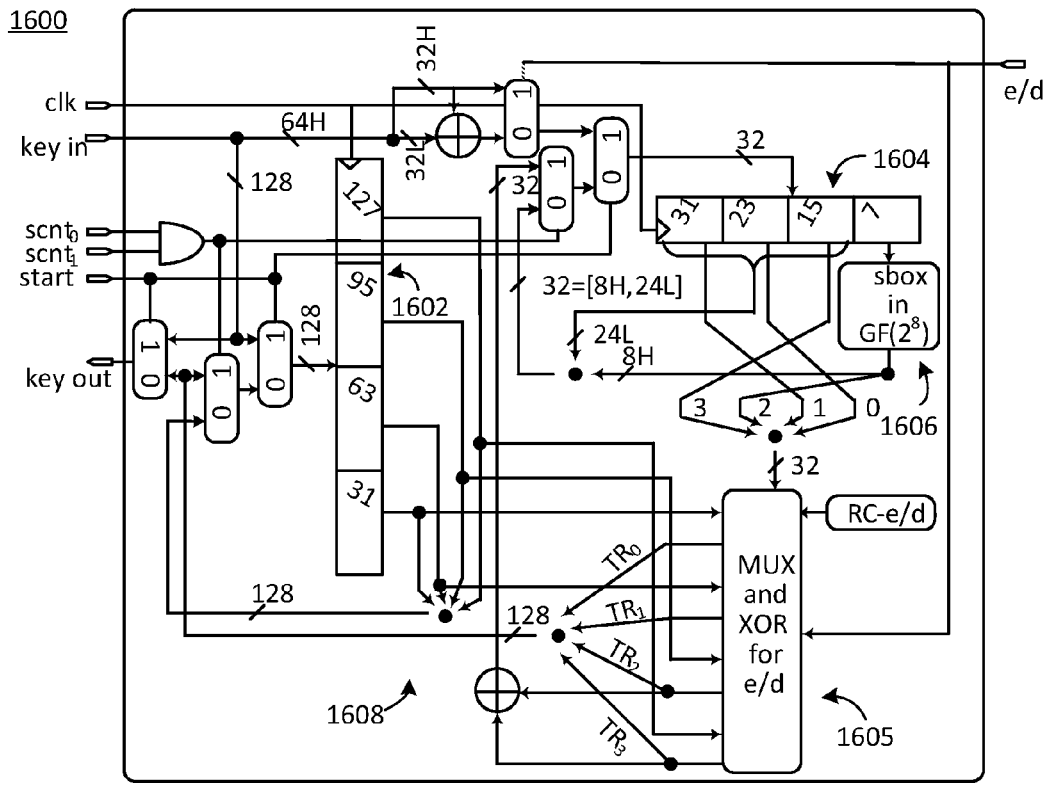
FIG. 16 illustrates an example combination encryption key and decryption reverse key generation engine for an AES engine, consistent with various embodiments of the present disclosure.

FIG. 16 illustrates an example combination encryption key and decryption reverse key generation engine 1600 for an AES engine, consistent with various embodiments of the present disclosure. Key generation engine 1600 is one example of key generation logic 1004 of FIG. 10. Like signal names in FIG. 16 correspond to like signal names in FIG. 10. $scnt_0$ and $scnt_1$ correspond to bits of scnt. Key generation engine 1600 is configured to generate each of a plurality of round keys utilized by an AddRoundKey( ) function, e.g., addroundkey logic 1110, 1310 of FIG. 11 and FIG. 13, respectively, and/or addroundkey logic, included in an AES engine, e.g., AES engine 212 of FIG. 2.

Key generation engine 1600 includes a round key register 1602, a most significant bytes (MSB) register 1604, an S-box 1606, MUX and XOR logic 1605 and key generation logic 1608. Key generation engine 1600 is configured to generate a round key for encryption or decryption based, at least in part, on control signal e/d where e corresponds to encryption and d corresponds to decryption. Thus, key generation engine 1600 may be considered a combination of key generation engine 1200 and key generation engine 1400. Key generation engine 1600 is configured to receive a user key (key in) and to generate a first round key (key out) based, at least in part, on the received user key. Key generation engine 1600 is further configured to generate subsequent round keys (key out) based, at least in part, on a prior round key. Each generated round key may be provided as output by key generation engine 1600. XOR logic 1605 is configured to receive round constants, e.g., RC or RC-dec, depending on whether key generation engine is configured to generate round keys for encryption or reverse round keys for decryption. XOR logic 1605 corresponds to a multiplexed combination of XOR logic 1205 and XOR logic 1405. Whether XOR logic 1205 or XOR logic 1405 is selected by the multiplexer depends on whether key generation engine is configured to generate round keys for encryption or reverse round keys for decryption.

Thus, an AES cryptographic engine, consistent with the present disclosure, is configured to receive input data and a user key, to encrypt or decrypt the input data and to provide corresponding output data. The input data and output data may each be 128 bits. The user key may be 128, 192 or 256 bits. An AES cryptographic engine may include one or more architectural optimizations and/or one or more operational optimizations. The optimizations are configured to reduce and/or minimize size (i.e., die area) and/or power consumption while maintaining an associated throughput that is greater than or equal to a target throughput. Architectural optimizations may include implementing one 128 bit register for round computations. Architectural optimizations may further include implementing one 128 bit register and one 32-bit register for key generation. Architectural optimizations may further include implementing five S-boxes with four S-boxes included in the round computation logic and one S-box included in the key generation logic. The four S-boxes included in the round computation logic may be configured to implement $GF((2^4)^2)$ using combinatorial logic. Architectural optimizations may further include implementing one mixcolumn block. Implementing relatively fewer registers may reduce power consumption of the AES cryptographic engine.

Operational optimizations include performing row shifting operations (i.e., ShiftRow( )) prior to byte substitution operations (i.e., ByteSub( )), thus allowing round computations to be performed using one 128-bit register rather than two 128-bit registers. Such order may further facilitate reducing an amount of combinatorial logic included in the AES cryptographic engine. Thus, AES engine size, i.e., die area, may be correspondingly decreased.

Operational optimizations may further include on-the-fly key generation. The on-the-fly key generation may be performed in parallel with and synchronous with the round computation and may thus save four clock cycles per round. In other words, such key generation is configured to provide a timing benefit that may result in a greater overall throughput associated with operation of the AES cryptographic engine. Similarly, data forwarding included in the round computation logic and/or in the key generation logic may also provide a timing benefit and greater overall throughput.

Architectural optimizations combined with operational optimizations may provide a lesser overall power consumption. For example, the 128-bit round key register may be updated once per round thus, reducing power consumption compared to a plurality of updates per round. On-the-fly key generation may result in lesser power consumption compared to predetermined round keys that may be fetched from memory.

Thus, an AES cryptographic engine, consistent with the present disclosure, may include one or more optimizations configured to reduce and/or minimize size and/or power consumption while maintaining an associated throughput that is greater than or equal to a target throughput.

For example, an AES cryptographic engine, consistent with the present disclosure, may occupy a die area of 4.1 kilo-gate equivalents (kGE) (implemented with 14 nanometer (nm) technology) with an associated power consumption of 1.1 milliwatts (mW). The example AES cryptographic engine may encrypt a 128-bit block of data using a 128-bit cryptographic key in 40 clock cycles. The example AES cryptographic engine may consume 0.45 nano-Joules (nJ) of energy over the 40 clock cycles. The example AES cryptographic engine may further achieve a throughput of 345 Megabits/second (Mb/s) at a 108 Megahertz (MHz) clock frequency.

Figure 17:
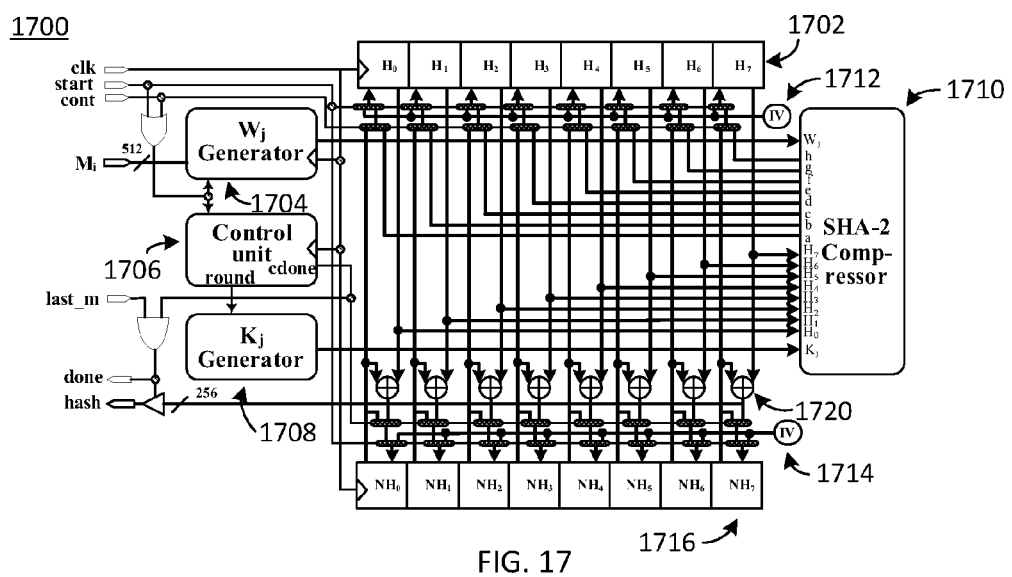
FIG. 17 illustrates a top level architecture of a SHS cryptographic engine, consistent with various embodiments of the present disclosure.

FIG. 17 illustrates a top level architecture of a SHS cryptographic engine 1700, consistent with various embodiments of the present disclosure. For example, the SHS cryptographic engine may be configured to implement an SHA-256 cryptographic algorithm. In another example, the SHS cryptographic engine may be configured to implement an SHA-224 cryptographic algorithm. A similar cryptographic engine may be configured to implement, for example, another SHS cryptographic algorithm. The SHS cryptographic engine 1700 includes an initial hash register 1702, a message schedule (Wj) generator 1704, control unit logic 1706, a constant generator 1708, an SHA2 compressor 1710, initialization vectors (IVs) 1712, 1714, a hash output register 1716 and interconnect logic 1720. For example, initial hash register 1702 and hash output register 1716 may each include 256 bits.

The initial hash register 1702 and the hash output register 1716 are configured to store the initial hash value, as described herein. For example, the initial hash value may correspond to an initialization vector IV 1712, IV 1714. IV 1712 and IV 1714 may be a same value. Message digest generator 1704 is configured to receive an SHA2 block, $M_i$, and to generate a message schedule, as described herein. Control unit logic 1716 is configured to manage operation of SHS cryptographic engine 1700. Constant generator 1708 is configured to provide a sequence of constants to SHA2 compressor 1710, as described herein. SHA2 compressor 1710 is configured to determine a hash output of SHA block $M_i$ and to store the hash output in hash output register 1716. The hash output may then be provided to output "hash" when done is asserted. In other words, done is configured to indicate that an output hash value is ready, i.e., valid. Input last_m corresponds to a last SHA2 block in a last message block. In other words, last_m may include padding and a message length value.

SHS engine 1700 is configured to generate an intermediate hash value in one clock cycle corresponding to determining a 256-bit message digest of a 512-bit SHA2 block in 64 clock cycles. SHS engine 1700 is further configured to utilize two sets of registers to store a temporary state and message digest up to the last SHA2 block compression.

Thus, an SHS cryptographic engine, consistent with the present disclosure, may include one or more optimizations configured to reduce and/or minimize size and/or power consumption while maintaining an associated throughput that is greater than or equal to a target throughput.

For example, an SHS cryptographic engine, consistent with the present disclosure, may occupy a die area of 9.7 kGE (implemented with 14 nanometer (nm) technology) with an associated power consumption of 1.7 milliwatts (mW). The example SHS cryptographic engine may hash a 512-bit block of data to provide a 256-bit message digest in 64 clock cycles. The example SHS cryptographic engine may consume 1.03 nJ of energy over the 64 clock cycles. The example SHS cryptographic engine may further achieve a throughput of 864 Mb/s at a 108 MHz clock frequency.

Thus, an LCE that is optimized, consistent with the present disclosure, may be configured to offload cryptographic functions from a host system to provide confidentiality and/or integrity of data at the host system and/or during transmission from or to the host system. The optimizations may include minimizing and/or reducing die area and/or power consumption while maintaining an associated throughput that is greater than or equal to a target throughput. The cryptographic primitives may include one or more of an AES engine, an SHS engine, an RNG and/or a memory wiper.

Figure 18:
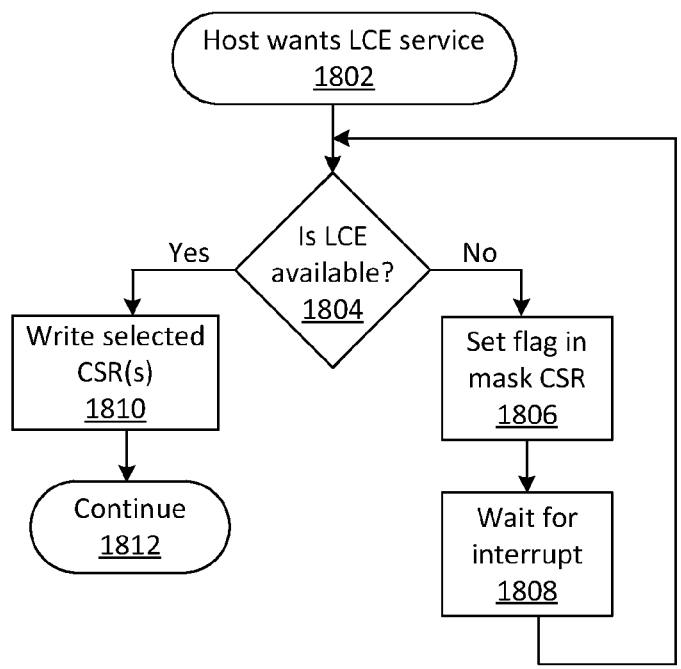
FIG. 18 is a flowchart of cryptographic service request operations according to various embodiments of the present disclosure.

FIG. 18 is a flowchart 1800 of cryptographic service request operations according to various embodiments of the present disclosure. In particular, the flowchart 1800 illustrates determining whether an LCE is available. The operations may be performed, for example, by host logic 104 and/or processor 110 of FIG. 1.

Operations of this embodiment may begin with a host system desiring LCE service 1802. LCE service corresponds to cryptographic service. Whether the LCE is available may be determined at operation 1804. For example, an LCE status CSR may be read to determine whether the LCE is available. If the LCE is not available, then a flag (e.g., bit) may be set in a mask CSR at operation 1806. The flag is configured to indicate that a host has requested LCE service. Operation 1808 includes waiting for an interrupt. For example, the interrupt may indicate that the LCE has become available. Program flow may then proceed to operation 1804.

If the LCE is available, selected CSR(s) may be written at operation 1810. For example, the selected CSR(s) may be related to a target cryptographic primitive, e.g., AES, SHS, etc. Program flow may then continue at operation 1812.

Thus, a host may request cryptographic service from an LCE.

Figure 19:
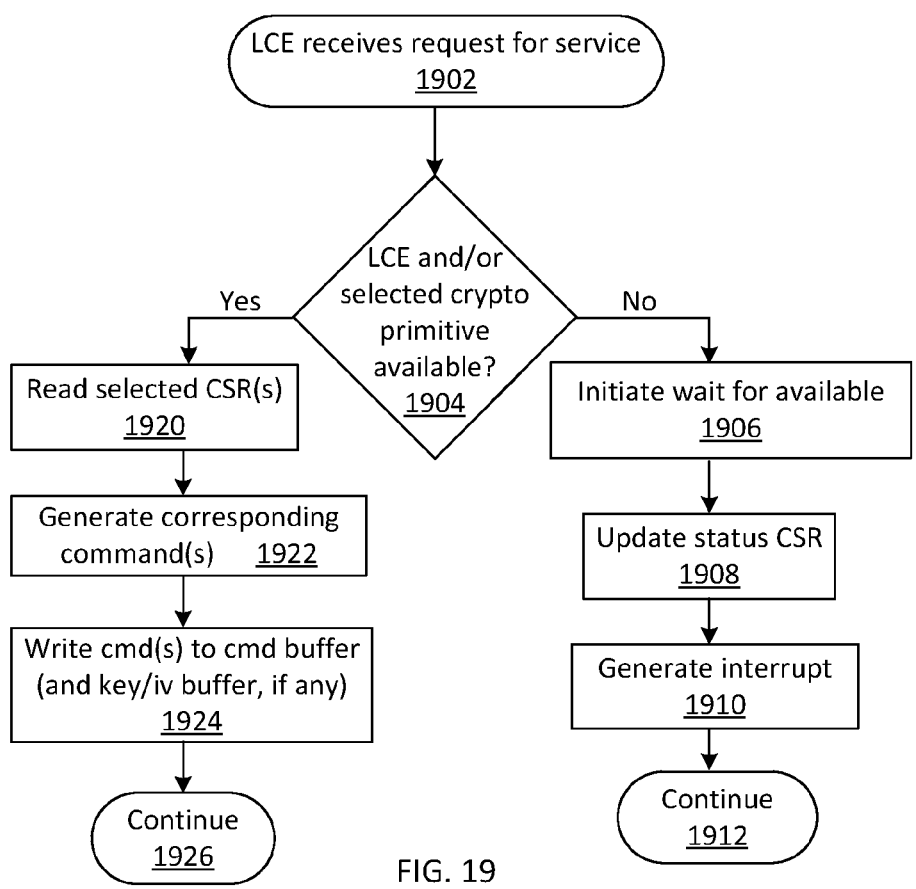
FIG. 19 is a flowchart of cryptographic service operations according to various embodiments of the present disclosure.

FIG. 19 is a flowchart 1900 of cryptographic service operations according to various embodiments of the present disclosure. In particular, the flowchart 1900 illustrates responding to a request for cryptographic service. The operations may be performed, for example, by LCE 102 of FIG. 1 and/or LCE 200 of FIG. 2.

Operations of this embodiment may begin with an LCE receiving a request for cryptographic service at operation 1902. Whether the LCE and/or selected cryptographic primitive is available may be determined at operation 1904. For example, an LCE status CSR may be read to determine whether the LCE and/or selected cryptographic primitive is available. If the LCE is not available, then a wait for the LCE and/or cryptographic primitive to become available may be initiated at operation 1906. Operation 1908 includes updating a status CSR. For example, the status CSR may be updated to indicate that the LCE has become available. An interrupt may be generated at operation 1910. For example, the interrupt may be configured to communicate to the service requestor that the LCE and/or cryptographic primitive has become available. Program flow may then continue at operation 1912.

If the LCE and/or cryptographic primitive is available, selected CSR(s) may be read at operation 1920. For example, the selected CSR(s) may be related to a target cryptographic primitive, e.g., AES, SHS, etc. Corresponding command(s) may be generated at operation 1922. The corresponding command(s) may be based, at least in part, on the contents of the selected CSR(s). The command(s) may be written to a command buffer (and key/IV buffer, if any) at operation 1924. The command(s) may then be available to a cryptographic primitive and/or wrapper. Program flow may then continue at operation 1926.

Thus, a request for cryptographic service may be processed by an LCE.

Figure 20:
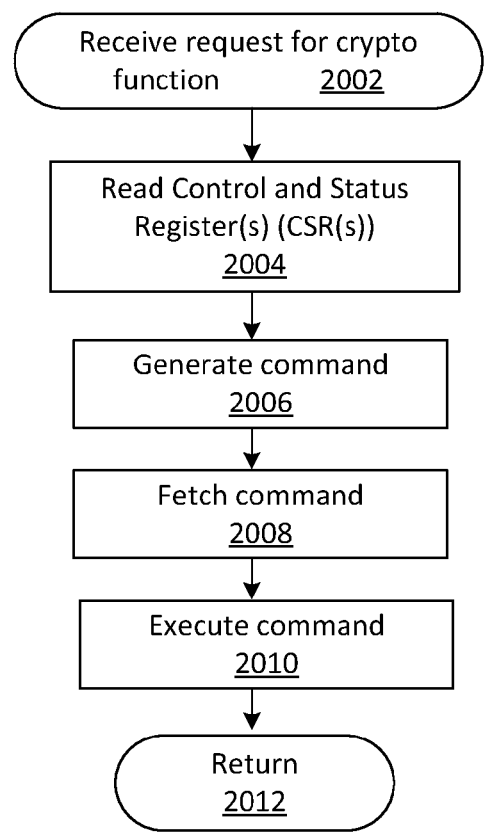
FIG. 20 is a flowchart of cryptographic service operations according to various embodiments of the present disclosure.

FIG. 20 is a flowchart 2000 of cryptographic service operations according to various embodiments of the present disclosure. In particular, the flowchart 2000 illustrates responding to a request for cryptographic service. The operations may be performed, for example, by one or more element(s) of layer(s) 210, 230, 250 and/or 260 of LCE 200 of FIG. 2.

Operations of this embodiment may begin with receiving a request for a cryptographic function at operation 2002. For example, cryptographic functions may include encryption and/or decryption operations, generating a secure hash and/or HMAC of a message, providing random number(s) and/or wiping (i.e., erasing) a block of memory. Operation 2004 includes reading one or more CSR(s). For example, an LCE status CSR may be read to determine whether the LCE and/or selected cryptographic primitive is available. In another example, selected CSR(s) may be read to capture information related to a selected cryptographic function. Operation 2006 includes generating a command. The command may include information captured from the selected CSR(s). For example, the command may include a context ID, block ID, source address, etc., related to the requested cryptographic function. Operation 2008 includes fetching the command. For example, the command generated at operation 2006 may be stored to a command buffer by, e.g., interface controller logic 270 and/or buffer controller logic of FIG. 2. Continuing with this example, the stored command may be fetched by an appropriate wrapper 232, 234, 236 or 238 and/or wrapper controller logic 240. The command may be executed at operation 2010. Program flow may then return at operation 2012.

Thus, a request for cryptographic service may be processed by an LCE. In an embodiment, the operations of flowchart 2000 may be performed in a pipelined fashion so that one or more operations may be occurring at a given instant in time. Further, depending on the cryptographic function(s) requested, a plurality of cryptographic services may be occurring in parallel. In other words, for an LCE that includes both an AES engine and an SHS engine, an encryption (or decryption) operation may be executing on the AES engine while a hashing operation is executing on the SHS engine. The interface ports 262, 264 may be shared while the executing may be done in parallel.

Figure 21:
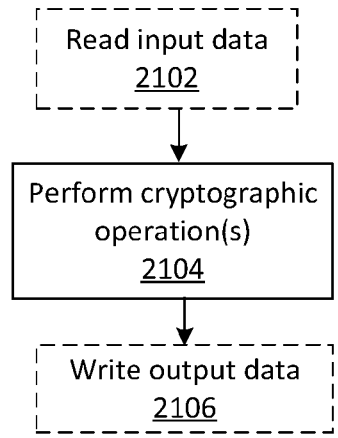
FIG. 21 is a flowchart of command execution operations consistent with various embodiments of the present disclosure.

FIG. 21 is a flowchart 2100 of command execution operations consistent with various embodiments of the present disclosure. Flowchart 2100 corresponds to operation 2010 of FIG. 20. The operations may be performed, for example, by one or more element(s) of interface and CSR layer 260, wrapper layer 230 and/or crypto primitive layer 210 of LCE 102 of FIG. 1 and/or LCE 200 of FIG. 2.

Operations of this embodiment may begin with reading input data at operation 2102. For example, input data may be read from host system memory via DMA. Operation 2104 includes performing cryptographic operation(s). For example, cryptographic operations may include one or more of, encryption, decryption, generating a message digest and/or generating an HMAC. Operation 2106 includes writing output data. For example, output data may be written to host system memory via DMA. Thus, a command may be executed by one or more elements of an LCE.

Whether some or all of the operations of flowchart 2100 may be performed is based, at least in part, on the related cryptographic primitive. For example, operations associated with an AES engine and/or an SHS engine may include all of the operations of flowchart 2100. In another example, operations associated with a memory wiper may include operation 2106. In this example, the output data corresponds to erasing one or more memory locations, e.g., storing all logic zeros or storing all logic ones. In another example, operations associated with an RNG may include operation 2104. In this example, host logic 104 and/or processor 110 may read a resulting random number. Thus, all or fewer than all of the operations of flowchart 2100 may be performed, depending on the related cryptographic primitive.

Figure 22:
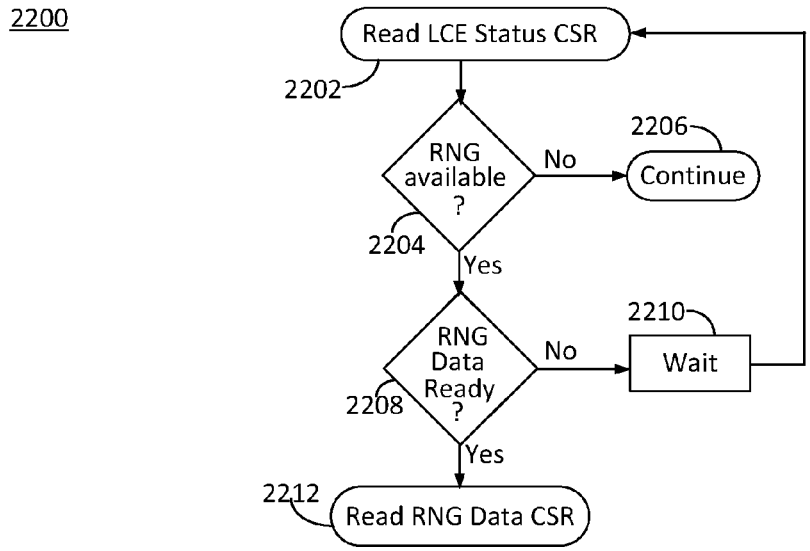
FIG. 22 is a flowchart of cryptographic service request operations according to various embodiments of the present disclosure.

FIG. 22 is a flowchart 2200 of cryptographic service request operations according to various embodiments of the present disclosure. In particular, the flowchart 2200 illustrates requesting a random number. The operations may be performed, for example, by host logic 104 and/or processor 110 of FIG. 1.

Operations of this embodiment may begin with a host system reading an LCE status CSR 2202. Whether the RNG is available may be determined at operation 2204. For example, whether the RNG is available may be determined based, at least in part, on an indicator bit included in the LCE status CSR. If the RNG is not available, then program flow may continue at operation 2206. For example, the host system may be configured to read the LCE status CSR again, after a delay. In another example, the LCE may be configured to initiate an interrupt when the RNG becomes available. Interrupt service may then include triggering the host to again read the LCE status CSR.

If the RNG is available, whether RNG data is ready may be determined at operation 2208. RNG data ready corresponds to at least one random number stored in RNG buffer(s). In other words, RNG data ready corresponds to RNG buffer not empty. If RNG data is not ready, program flow may wait at operation 2210. Program flow may then proceed to operation 2202. If RNG data is ready, an RNG data CSR may be read at operation 2212. The RNG data CSR may correspond to a least significant RNG buffer of one or more RNG data buffer(s). For example, the RNG data CSR may be read via DMA. Thus, a host may request a random number from an LCE.

Figure 23:
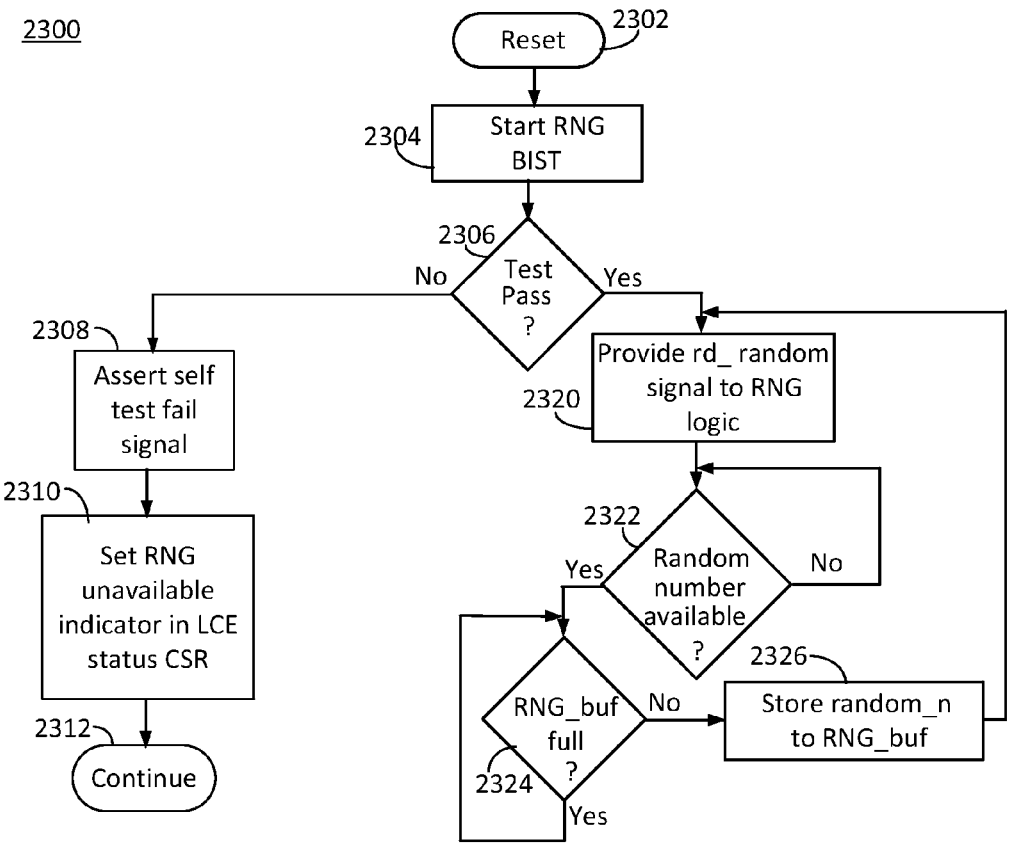
FIG. 23 is a flowchart of random number generation operations according to various embodiments of the present disclosure.

FIG. 23 is a flowchart 2300 of random number generation operations according to various embodiments of the present disclosure. In particular, the flowchart 2300 illustrates initiating a self test and random number generation if the self test is passed. The operations may be performed, for example, RNG 216 and/or RNG wrapper 236 of FIG. 2.

Operations of this embodiment may begin with an RNG receiving a reset signal at operation 2302. An RNG built-in self test (BIST) may be started at operation 2304. Whether the self test is passed may be determined at operation 2306. If the self test failed, then a self test fail signal may be asserted at operation 2308. An RNG indicator may be set to unavailable in an LCE status CSR at operation 2310. Program flow may then continue at operation 2312.

If the self test is passed, a read random (rd_random) signal may be provided to RNG logic at operation 2320. The rd_random signal is configured to initiate generation of a random number, e.g., using an entropy source, as described herein. Whether a random number is available may be determined at operation 2322. If a random number is not available, program flow may proceed to operation 2322. If a random number is available, whether a random number buffer (RNG_buf) is full may be determined at operation 2324. If RNG_buf is full, program flow may proceed to operation 2324. If the RNG_buf is not full, the random number (random_n) may be stored to the RNG_buf at operation 2326. Program flow may then proceed to operation 2320.

Thus, a generation of random number(s) may be initiated and one or more random number(s), random_n, may be stored to an RNG buffer, RNG_buf.

While the flowcharts of FIGS. 18 through 23 illustrate operations according various embodiments, it is to be understood that not all of the operations depicted in FIGS. 18 through 23 are necessary for other embodiments. In addition, it is fully contemplated herein that in other embodiments of the present disclosure, the operations depicted in FIGS. 18, 19, 20, 21, 22 and/or 23, and/or other operations described herein may be combined in a manner not specifically shown in any of the drawings, and such embodiments may include less or more operations than are illustrated in FIGS. 18 through 23. Thus, claims directed to features and/or operations that are not exactly shown in one drawing are deemed within the scope and content of the present disclosure.

Thus, an LCE, consistent with the present disclosure, is configured to implement one or more cryptographic primitives to provide confidentiality and/or integrity of data at a device and/or during transmission from or to the device. The LCE is configured to offload cryptographic functions from a host system and to implement the cryptographic primitive(s) within a constrained size (e.g., die area) and within a constrained power budget while maintaining or achieving an associated throughput that is greater than or equal to a target throughput.

As used in any embodiment herein, the term "logic" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The logic may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc.

Cryptographic operations of LCE 102, 200, AES engine 212 and/or AES wrapper 232 may comply and/or be compatible with Federal Information Processing Standards (FIPS) Publication 197, titled: "Advanced Encryption Standard (AES) (FIPS PUBS 197)", published by the National Institute of Standards and Technology (NIST) in November 2001, and/or later and/or related versions of this standard.

Cryptographic operations of LCE 102, 200, SHS engine 214 and/or SHS wrapper may comply and/or be compatible with FIPS Publication 180-4, titled: "Secure Hash Standard (SHS)", published by NIST in March 2012 and/or later and/or related versions of this standard.

LCE 102, 200, elements 104, 106, 108, 110, and/or 114 of system 100 and/or interconnect 116 may comply or be compatible with a System-on-Chip (SoC) interconnect specification. For example, the SoC interconnect specification may comply or be compatible with the AMBA® 4 AXI (Advanced eXtensible Interface) and ACE (AXI Coherency Extensions) protocol specification, published by ARM®, San Jose, Calif., published in 2010, and/or earlier and/or later versions and/or revisions of this specification, and/or related specification(s).

LCE 102, 200, comm interface 108 and/or network 120 may comply and/or be compatible with one or more communication specifications, standards and/or protocols.

For example, LCE 102, 200, comm interface 108 and/or network 120 may comply and/or be compatible with Bluetooth® Core Specification, version 4.2, published by Bluetooth® SIG (Special Interest Group), Kirkland, Wash., December 2014, and/or later and/or related versions of this standard, e.g., Bluetooth® Low Energy (BLE), Bluetooth® Smart and/or Bluetooth® Core Specification, version 4.0, published June 2010.

In another example, LCE 102, 200, comm interface 108 and/or network 120 may comply and/or be compatible with an IPv6 (Internet Protocol version 6) over Low Power Wireless Personal Area Networks (6LoWPAN) standard: RFC (Request for Comments) 6282, titled Compression Format for IPv6 Datagrams over IEEE 802.15.4-Based Networks, published by the Internet Engineering Task Force (IETF), September 2011, and/or later and/or related versions of this standard.

In another example, LCE 102, 200, comm interface 108 and/or network 120 may comply and/or be compatible with IEEE (Institute of Electrical and Electronics Engineers) 802.15.4-2006 standard titled: IEEE Standard for Information technology—Telecommunications and information exchange between systems—Local and metropolitan area networks—Specific requirements Part 15.4: Wireless Medium Access Control (MAC) and Physical Layer (PHY) Specifications for Low Rate Wireless Personal Area Networks (LR-WPANS), published in 2006 and/or later and/or related versions of this standard.

In another example, LCE 102, 200, comm interface 108 and/or network 120 may comply and/or be compatible with a ZigBee specification and/or standard, published and/or released by the ZigBee Alliance, Inc., including, but not limited to, ZigBee 3.0, draft released November 2014, ZigBee RF4CE, ZigBee IP, and/or ZigBee PRO published in 2012, and/or later and/or related versions of these standards.

In another example, LCE 102, 200, comm interface 108 and/or network 120 may comply and/or be compatible with IEEE Std 802.11$^{17\wedge 4}$-2012 standard titled: IEEE Standard for Information technology—Telecommunications and information exchange between systems—Local and metropolitan area networks—Specific requirements Part 11: Wireless LAN Medium Access Control (MAC) and Physical Layer (PHY) Specifications, published in March 2012 and/or earlier and/or later and/or related versions of this standard, including, for example, IEEE Std 802.11ac™-2013, titled IEEE Standard for Information technology-Telecommunications and information exchange between systems, Local and metropolitan area networks-Specific requirements, Part 11: Wireless LAN Medium Access Control (MAC) and Physical Layer (PHY) Specifications; Amendment 4: Enhancements for Very High Throughput for Operation in Bands below 6 GHz, published by the IEEE, December 2013.

Memory 104 may include one or more of the following types of memory: semiconductor firmware memory, programmable memory, non-volatile memory, read only memory, electrically programmable memory, random access memory, flash memory, magnetic disk memory, and/or optical disk memory. Either additionally or alternatively system memory may include other and/or later-developed types of computer-readable memory.

Embodiments of the operations described herein may be implemented in a computer-readable storage device having stored thereon instructions that when executed by one or more processors perform the methods. The processor may include, for example, a processing unit and/or programmable circuitry. The storage device may include a machine readable storage device including any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions.

In some embodiments, a hardware description language (HDL) may be used to specify circuit and/or logic implementation(s) for the various logic and/or circuitry described herein. For example, in one embodiment the hardware description language may comply or be compatible with a very high speed integrated circuits (VHSIC) hardware description language (VHDL) that may enable semiconductor fabrication of one or more circuits and/or logic described herein. The VHDL may comply or be compatible with IEEE Standard 1076-1987, IEEE Standard 1076.2, IEEE1076.1, IEEE Draft 3.0 of VHDL-2006, IEEE Draft 4.0 of VHDL-2008 and/or other versions of the IEEE VHDL standards and/or other hardware description standards.

Thus, consistent with the teachings of the present disclosure, an LCE is configured to implement one or more cryptographic primitives to provide confidentiality and/or integrity of data at a device and/or during transmission from or to a host system. The LCE is configured to offload cryptographic functions from the host system and to implement the cryptographic primitive(s) within a constrained size (e.g., die area) and within a constrained power budget.

An LCE consistent with the present disclosure is optimized. The LCE may be optimized by implementing one or more architectural optimizations and/or one or more operational optimizations. The optimization(s) include maintaining the resulting throughput within an allowable throughput.

EXAMPLES

Examples of the present disclosure include subject material such as a method, means for performing acts of the method, a device, or of an apparatus or system related to a lightweight cryptographic engine, as discussed below.

Example 1

According to this example there is provided an apparatus. The apparatus includes a lightweight cryptographic engine (LCE). The LCE is optimized and has an associated throughput greater than or equal to a target throughput.

Example 2

This example includes the elements of example 1, wherein at least one of the LCE occupies at least one of a reduced and/or minimized die area and/or a power consumption of the LCE is at least one of reduced and/or minimized.

Example 3

This example includes the elements of example 1, wherein the LCE includes at least one of an Advanced Encryption Standard (AES) cryptographic engine, a Secure Hash Standard (SHS) cryptographic engine, a random number generator and/or a memory wiper.

Example 4

This example includes the elements of example 1, wherein the target throughput is in the range of 100 kilobits per second (kbps) to 200 Megabits per second (Mbps).

Example 5

This example includes the elements according to any one of examples 1 to 4, wherein the LCE includes at least one of an architectural optimization and/or an operational optimization.

Example 6

This example includes the elements according to any one of examples 1 to 4, wherein the LCE is scalable.

Example 7

This example includes the elements of example 5, wherein the architectural optimization includes one or more of a reduced and/or minimized number of registers, a reduced and/or minimized associated combinatorial logic, a number of buffers related to anticipated message characteristics and/or a cryptographic primitive-specific optimization and the operational optimization includes one or more of a reduced and/or minimized number of register updates, data forwarding, adjusted order of operations, on-the-fly operation and/or functionality offloaded from a host.

Example 8

This example includes the elements of example 6, wherein the LCE includes a subset of possible cryptographic primitives.

Example 9

This example includes the elements according to any one of examples 1 to 4, wherein the LCE includes a plurality of layers.

Example 10

This example includes the elements of example 9, wherein each layer corresponds to a functional grouping.

Example 11

This example includes the elements of example 9, wherein the plurality of layers includes a first layer, a second layer, a third layer and a fourth layer.

Example 12

This example includes the elements of example 11, wherein the first layer includes one or more of an Advanced Encryption Standard (AES) cryptographic engine, a Secure Hash Standard (SHS) cryptographic engine, a random number generator and/or a memory wiper.

Example 13

This example includes the elements of example 11, wherein the second layer includes one or more of an AES wrapper, a SHS wrapper, an RNG wrapper and/or a wiper wrapper.

Example 14

This example includes the elements of example 11, wherein the third layer includes one or more of an AES buffer, an SHS buffer, an RNG buffer and/or a memory wiper buffer.

Example 15

This example includes the elements of example 14, wherein a number of buffers is related to the target throughput.

Example 16

This example includes the elements of example 14, wherein a numbers of buffers is optimized to reduce and/or minimize die size and/or power consumption while maintaining the associated throughput at or above the target throughput.

Example 17

This example includes the elements of example 11, wherein the fourth layer includes one or more interface port(s) and a plurality of command and status registers (CSRs), the CSRs to store at least one of control and/or status information related to the LCE.

Example 18

This example includes the elements of example 17, wherein the CSRs include one or more of a policy CSR, an LCE status CSR, an operational CSR and/or an interrupt CSR.

Example 19

This example includes the elements of example 18, where the operational CSR includes a command CSR.

Example 20

This example includes the elements of example 11, wherein the fourth layer includes a direct memory access (DMA) engine.

Example 21

This example includes the elements of example 20, wherein the DMA engine is to multiplex data from a plurality of cryptographic primitives included in the LCE.

Example 22

This example includes the elements of example 11, wherein the fourth layer includes a first interface port and a second interface port, the first interface port to be used by the LCE to access a host system and the second interface port to be used by the host system to access the LCE.

Example 23

This example includes the elements according to any one of examples 1 to 4, wherein the LCE is to provide at least one of confidentiality and/or integrity of data.

Example 24

This example includes the elements according to any one of examples 1 to 4, wherein the LCE is to offload cryptographic functions from a host system.

Example 25

This example includes the elements according to any one of examples 1 to 4, wherein at least one of the LCE occupies a constrained die area and/or a power consumption associated with the LCE is constrained.

Example 26

This example includes the elements according to any one of examples 1 to 4, wherein the LCE includes an AES cryptographic engine.

Example 27

This example includes the elements of example 26, wherein the AES cryptographic engine includes round computation logic, a key generation engine and a controller.

Example 28

This example includes the elements of example 27, wherein the round computation logic is to perform round computation operations including SubBytes( ), ShiftRows( ), MixColumns( ) and AddRoundKey( ); key generation engine is to generate each round key based, at least in part, on a cryptographic key; and the controller is to synchronize operations of the round computation logic and the key generation engine.

Example 29

This example includes the elements according to any one of examples 27 or 28, wherein the round computation logic is to perform round computation operations including InvSubBytes( ), InvShiftRows( ), InvMixColumns( ) and AddRoundKey( ) and the key generation engine is to generate each reverse round key based, at least in part, on a cryptographic key.

Example 30

This example includes the elements according to any one of examples 26 to 28, wherein the AES cryptographic engine is to perform operations associated with one round in four clock cycles.

Example 31

This example includes the elements according to any one of examples 26 to 28, wherein the AES cryptographic engine is to determine at least one of a ciphertext from a plaintext and/or a plaintext from a ciphertext utilizing a user key.

Example 32

This example includes the elements according to any one of examples 27 to 28, wherein the round computation logic includes a state register, bytesub logic, shiftrow logic, mixcolumn logic and addroundkey logic.

Example 33

This example includes the elements of example 32, wherein the addroundkey logic is to perform a first exclusive-OR (XOR) operation on plaintext and the user key and to perform another XOR operation on an intermediate state and a generated key.

Example 34

This example includes the elements of example 33, wherein the user key is a cryptographic key and a cryptographic key size is 128, 192 or 256 bits.

Example 35

This example includes the elements of example 32, wherein the round computation logic includes one state register configured to store an AES state variable.

Example 36

This example includes the elements of example 32, wherein the round computation logic is to perform operations associated with each round in an order including ShiftRows( ) followed by SubBytes( ) followed by MixColumns( ) followed by AddRoundKey( ).

Example 37

This example includes the elements of example 32, wherein the state register is a 128-bit register and is configured as a 32-bit shift register.

Example 38

This example includes the elements of example 32, wherein the bytesub logic includes four S-boxes to implement Galois Field $GF((2^4)^2)$.

Example 39

This example includes the elements of example 32, wherein the round computation logic is to process one round in four clock cycles.

Example 40

This example includes the elements according to any one of examples 27 to 28, wherein the key generation engine includes a round key register, a most significant bytes (MSB) register, an S-box and key generation logic.

Example 41

This example includes the elements of example 40, wherein the key generation engine is to receive a user key; to generate a first round key based, at least in part, on the received user key; and to generate one or more subsequent round keys based, at least in part, on a respective prior round key.

Example 42

This example includes the elements of example 40, wherein the key generation engine is to generate each round key in a same number of clock cycles as a number of clock cycles consumed to process one round in the AES cryptographic engine.

Example 43

This example includes the elements of example 40, wherein the S-box logic is to process four bytes of a round key MSB in four clock cycles.

Example 44

This example includes the elements of example 40, wherein the key generation engine is synchronized with the round computation logic.

Example 45

This example includes the elements according to any one of examples 27 to 28, wherein the round computation logic includes a state register, Invbytesub logic, Invshiftrow logic, Invmixcolumn logic and addroundkey logic.

Example 46

This example includes the elements of example 45, wherein the user key is a cryptographic key and a cryptographic key size is 128, 192 or 256 bits.

Example 47

This example includes the elements of example 45, wherein the round computation logic includes one state register configured to store an AES state variable.

Example 48

This example includes the elements of example 45, wherein the state register is a 128-bit register and is configured as a 32-bit shift register.

Example 49

This example includes the elements according to any one of examples 27 to 28, wherein the key generation engine is a reverse key generation engine, the reverse key generation engine including a round key register, a most significant bytes (MSB) register, an S-box and key generation logic.

Example 50

This example includes the elements of example 49, wherein the reverse key generation engine is to receive a user key; and to generate a plurality of round keys based, at least in part, on the received user key.

Example 51

This example includes the elements according to any one of examples 27 to 28, wherein the round computation logic includes a state register, encryption mix column and byte-substitution (mc-bs) logic, decryption inverse byte-substitution and mix column (bs-mc) logic, shiftrow logic, Invshiftrow logic and addroundkey logic.

Example 52

This example includes the elements of example 51, wherein the round computation logic is to implement at least one of a cipher and/or an inverse cipher.

Example 53

This example includes the elements of example 51, wherein the state register and the addroundkey logic are used for both encryption and decryption.

Example 54

This example includes the elements according to any one of examples 26 to 28, wherein the AES cryptographic engine is to receive input data and a user key, to encrypt or decrypt the input data and to provide corresponding output data.

Example 55

This example includes the elements of example 54, wherein the input data and the output data are 128 bits and the user key is 128, 192 or 256 bits.

Example 56

This example includes the elements of example 54, wherein the AES cryptographic engine includes at least one architectural optimization.

Example 57

This example includes the elements of example 56, wherein the architectural optimizations include one or more of implementing one 128 bit register for round computations, implementing one 128 bit register and one 32-bit register for key generation, implementing four S-boxes in a round computation logic and one S-box in a key generation logic and/or implementing one mixcolumn block.

Example 58

This example includes the elements of example 57, wherein the four S-boxes included in the round computation logic are to implement Galois Field $GF((2^4)^2)$ using combinatorial logic.

Example 59

This example includes the elements according to any one of examples 54 to 56, wherein the AES cryptographic engine includes at least one operational optimization.

Example 60

This example includes the elements of example 59, wherein the operational optimizations include one or more of performing row shifting operations prior to byte substitution operations, on-the-fly key generation, updating a round key register once per round and/or data forwarding.

Example 61

This example includes the elements of example 60, wherein at least one of round computation logic and/or key generation logic is to implement data forwarding.

Example 62

This example includes the elements according to any one of examples 1 to 4, wherein the LCE includes an AES cryptographic engine and the LCE further includes an AES buffer.

Example 63

This example includes the elements of example 62, wherein the LCE includes a plurality of AES buffers, the plurality including at least one AES command buffer and at least one AES key buffer.

Example 64

This example includes the elements of example 63, wherein the plurality of AES buffers includes four AES command buffers and two AES key buffers.

Example 65

This example includes the elements of example 63, wherein the AES command buffer is to store an AES command and the AES key buffer is to store at least one of a cryptographic key and/or an initialization vector.

Example 66

This example includes the elements of example 63, wherein at least one of a number of AES command buffers and/or a number of AES key buffers is to at least one of reduce and/or minimize die area.

Example 67

This example includes the elements of example 63, wherein at least one of a number of AES command buffers and/or a number of AES key buffers is related to one or more of the target throughput, an allowable die area and/or an allowable power consumption.

Example 68

This example includes the elements of example 63, wherein each AES command buffer is selected for storing a new AES command using an AES command index, the AES command index to allow asynchronous receipt and consumption of a plurality of AES commands.

Example 69

This example includes the elements of example 63, wherein the LCE includes a number of AES key buffers, the number of AES key buffers related to the target throughput.

Example 70

This example includes the elements according to any one of examples 1 to 4, wherein the LCE includes an AES cryptographic engine and the LCE further includes an AES wrapper.

Example 71

This example includes the elements of example 70, wherein the AES wrapper is to support one or more AES modes, the AES modes including Electronic Code Book (ECB), Cipher Feedback (CFB), Counter (CTR) and CCM (Counter mode with CBC-MAC (Cipher Block Chaining—Message Authentication Code)).

Example 72

This example includes the elements of example 70, wherein the AES cryptographic engine at least one of complies and/or is compatible with a Federal Information Processing Standards (FIPS) Publication 197, titled: "Advanced Encryption Standard (AES) (FIPS PUB 197)", published by the National Institute of Standards and Technology (NIST) in November 2001.

Example 73

This example includes the elements of example 70, wherein the AES wrapper is to prepend leftover bytes from a prior message block to a current message block to avoid padding a plurality of message blocks of a message.

Example 74

This example includes the elements of example 70, wherein the AES wrapper includes one or more registers configured to store contents of an AES command.

Example 75

This example includes the elements of example 70, wherein the AES wrapper is to implement an enhanced mode related to packet processing.

Example 76

This example includes the elements of example 70, wherein the AES wrapper is to configure the AES engine to encrypt or decrypt received data.

Example 77

This example includes the elements according to any one of examples 1 to 4, wherein the LCE includes an SHS cryptographic engine.

Example 78

This example includes the elements of example 77, wherein the SHS cryptographic engine includes an initial hash register, a message schedule generator, control unit logic, a constant generator, an SHA2 compressor, an initialization vector, a hash output register and interconnect logic.

Example 79

This example includes the elements of example 78, wherein the SHS cryptographic engine is to generate each intermediate hash value in one clock cycle.

Example 80

This example includes the elements of example 78, wherein the SHS cryptographic engine is to determine a 256-bit message digest of a 512-bit SHA2 block in 64 clock cycles.

Example 81

This example includes the elements of example 78, wherein the SHS cryptographic engine is to utilize two sets of registers to store a temporary state and a message digest up to a last SHA2 block compression.

Example 82

This example includes the elements according to any one of examples 1 to 4, wherein the LCE includes an SHS cryptographic engine and further includes an SHS buffer.

Example 83

This example includes the elements of example 82, wherein the LCE includes a plurality of SHS buffers, the plurality of SHS buffers including at least one SHS command buffer.

Example 84

This example includes the elements of example 83, wherein the SHS buffers include two SHS command buffers.

Example 85

This example includes the elements of example 83, wherein a number of SHS command buffers is related to one or more of the target throughput, an allowable die area and/or an allowable power consumption.

Example 86

This example includes the elements of example 83, wherein each SHS command buffer is selected for storing a new SHA2 (Secure Hash Algorithm 2) command using an SHA2 command index, the SHA2 command index to allow asynchronous receipt and consumption of a plurality of SHA2 commands.

Example 87

This example includes the elements according to any one of examples 1 to 4, wherein the LCE includes an SHS cryptographic engine and the SHS cryptographic engine is to implement one or more Secure Hash Algorithms (SHAs).

Example 88

This example includes the elements of example 87, wherein the SHAs include SHA-224, SHA-256 and SHA-512.

Example 89

This example includes the elements of example 87, wherein the SHS cryptographic engine at least one of complies and/or is compatible with a Federal Information Processing Standards (FIPS) Publication 180-4, titled: "Secure Hash Standard (SHS)", published by the National Institute of Standards and Technology (NIST) in March 2012.

Example 90

This example includes the elements of example 87, wherein the LCE further includes an SHS wrapper.

Example 91

This example includes the elements of example 90, wherein the SHS wrapper is to configure the SHS cryptographic engine to generate a hash based message authentication code (HMAC).

Example 92

This example includes the elements of example 90, wherein the SHS wrapper is to determine a message length.

Example 93

This example includes the elements of example 90, wherein the SHS wrapper is to pad a last message block of a plurality of message blocks.

Example 94

This example includes the elements according to any one of examples 1 to 4, wherein the LCE includes a random number generator.

Example 95

This example includes the elements of example 94, wherein the random number generator includes built in self test (BIST) logic.

Example 96

This example includes the elements of example 94, wherein the random number generator is nondeterministic.

Example 97

This example includes the elements of example 96, wherein the LCE includes an entropy source.

Example 98

This example includes the elements of example 94, wherein the LCE further includes an RNG wrapper.

Example 99

This example includes the elements of example 94, wherein the LCE further includes an RNG buffer.

Example 100

This example includes the elements of example 99, wherein the LCE includes a plurality of RNG buffers.

Example 101

This example includes the elements of example 99, wherein the LCE includes a number of RNG buffers, the number selected to support on-the-fly random number generation.

Example 102

This example includes the elements of examples 100 or 101, wherein the number of RNG buffers is four.

Example 103

This example includes the elements of example 100, wherein a number of RNG buffers is related to one or more of the target throughput, an allowable die area and/or an allowable power consumption.

Example 104

This example includes the elements of example 100, wherein each RNG buffer is selected for storing a new random number using an RNG buffer index, the RNG buffer index to allow asynchronous receipt and consumption of a plurality of random numbers.

Example 105

This example includes the elements according to any one of examples 1 to 4, wherein the LCE includes a memory wiper.

Example 106

This example includes the elements of example 105, wherein the memory wiper is to erase a block of memory, the block having a length of one or more bytes.

Example 107

This example includes the elements of example 105, wherein the LCE further includes a wiper buffer.

Example 108

This example includes the elements of example 107, wherein the wiper buffer is to store a memory wiper command.

Example 109

This example includes the elements of example 107, wherein the wiper buffer is to store one memory wiper command.

Example 110

This example includes the elements of example 107, wherein a capacity of the wiper buffer is optimized for at least one of die area, power consumption and/or throughput.

Example 111

This example includes the elements of example 106, wherein the memory wiper is to erase the block of memory via direct memory access (DMA).

Example 112

This example includes the elements of example 105, wherein the LCE further includes a wiper wrapper.

Example 113

This example includes the elements according to any one of examples 1 to 4, wherein optimized corresponds to at least one of a reduced and/or minimized size and/or a reduced and/or minimized power consumption while maintaining or achieving the associated throughput greater than or equal to the target throughput.

Example 114

This example includes the elements according to any one of examples 1 to 4, wherein the target throughput is greater than or equal to a minimum throughput specified by one or more of a communication specification, standard and/or protocol and/or an interconnect specification, standard and/or protocol.

Example 115

This example includes the elements of example 7, wherein the message characteristics include one or more of a data type including one or more of streaming, static, message length known in advance, message length not known in advance, an associated cryptographic operation includes one or more of encryption, decryption and/or generating one or more of a hash, message digest, digital signature, and/or message authentication code.

Example 116

This example includes the elements of example 5, wherein the architectural optimization includes one or more of implementing fewer than all possible cryptographic primitive(s), providing selected cryptographic functionality, implementing a minimized cryptographic primitive.

Example 117

This example includes the elements according to any one of examples 1 to 4, wherein the LCE is to read one or more control and status register(s) (CSR(s)), generate a corresponding command, write the command to a command buffer, if the LCE and a selected cryptographic primitive is available or to initiate a wait for available if the LCE or selected cryptographic primitive is not available.

Example 118

This example includes the elements of example 117, wherein the LCE is to determine whether at least one of the LCE and/or a selected cryptographic primitive is available.

Example 119

This example includes the elements of example 117, wherein the LCE is to update a status CSR and generate an interrupt if the LCE and the selected cryptographic primitive become available.

Example 120

This example includes the elements according to any one of examples 1 to 4, wherein the LCE is to read a control and status register (CSR), generate a command, fetch the command and execute the command in response to a request for a cryptographic function.

Example 121

This example includes the elements of example 120, wherein executing the command includes one or more of, reading input data, performing one or more cryptographic operations and writing output data.

Example 122

This example includes the elements according to any one of examples 1 to 4, wherein the LCE includes a random number generator (RNG) and an RNG wrapper, the RNG to start a built in self test (BIST) and to assert a self test fail signal if the BIST fails and the RNG wrapper to provide a read random number signal to the RNG, to determine if a random number is available, to store the random number in an RNG buffer if the RNG buffer is not full, if the BIST passes.

Example 123

This example includes the elements of example 122, wherein the RNG wrapper is further to determine if the RNG buffer is full when the random number is available.

Example 124

According to this example there is provided a method. The method includes performing, by a lightweight cryptographic engine (LCE), a cryptographic operation. The LCE is optimized and a throughput associated with the cryptographic operation is greater than or equal to a target throughput.

Example 125

This example includes the elements of example 124, wherein at least one of the LCE occupies at least one of a reduced and/or minimized die area and/or a power consumption associated with performing the cryptographic operation is at least one of reduced and/or minimized.

Example 126

This example includes the elements of example 124, wherein the cryptographic operation includes at least one of an Advanced Encryption Standard (AES) cryptographic operation, a Secure Hash Standard (SHS) cryptographic operation, generating a random number and/or a memory wiper operation.

Example 127

This example includes the elements of example 124, wherein the target throughput is in the range of 100 kilobits per second (kbps) to 200 Megabits per second (Mbps).

Example 128

This example includes the elements of example 124, wherein the LCE includes at least one of an architectural optimization and/or an operational optimization.

Example 129

This example includes the elements of example 124, wherein the LCE is scalable.

Example 130

This example includes the elements of example 128, wherein the architectural optimization includes one or more of a reduced and/or minimized number of registers, a reduced and/or minimized associated combinatorial logic, a number of buffers related to anticipated message characteristics and/or a cryptographic primitive-specific optimization and the operational optimization includes one or more of a reduced and/or minimized number of register updates, data forwarding, adjusted order of operations, on-the-fly operation and/or functionality offloaded from a host.

Example 131

This example includes the elements of example 129, wherein the LCE includes a subset of possible cryptographic primitives.

Example 132

This example includes the elements of example 124, wherein the LCE includes a plurality of layers.

Example 133

This example includes the elements of example 132, wherein each layer corresponds to a functional grouping.

Example 134

This example includes the elements of example 132, wherein the plurality of layers includes a first layer, a second layer, a third layer and a fourth layer.

Example 135

This example includes the elements of example 134, wherein the first layer includes one or more of an Advanced Encryption Standard (AES) cryptographic engine, a Secure Hash Standard (SHS) cryptographic engine, a random number generator and/or a memory wiper.

Example 136

This example includes the elements of example 134, wherein the second layer includes one or more of an AES wrapper, a SHS wrapper, an RNG wrapper and/or a wiper wrapper.

Example 137

This example includes the elements of example 134, wherein the third layer includes one or more of an AES buffer, an SHS buffer, an RNG buffer and/or a memory wiper buffer.

Example 138

This example includes the elements of example 137, wherein a number of buffers is related to the target throughput.

Example 139

This example includes the elements of example 137, wherein a numbers of buffers is optimized to reduce and/or minimize die size and/or power consumption while maintaining the associated throughput at or above the target throughput.

Example 140

This example includes the elements of example 134, wherein the fourth layer includes one or more interface port(s) and a plurality of command and status registers (CSRs), and including storing, by the CSRs, at least one of control and/or status information related to the LCE.

Example 141

This example includes the elements of example 140, wherein the CSRs include one or more of a policy CSR, an LCE status CSR, an operational CSR and/or an interrupt CSR.

Example 142

This example includes the elements of example 141, where the operational CSR includes a command CSR.

Example 143

This example includes the elements of example 134, wherein the fourth layer includes a direct memory access (DMA) engine.

Example 144

This example includes the elements of example 143, including multiplexing, by the DMA engine, data from a plurality of cryptographic primitives included in the LCE.

Example 145

This example includes the elements of example 134, wherein the fourth layer includes a first interface port and a second interface port, the first interface port to be used by the LCE to access a host system and the second interface port to be used by the host system to access the LCE.

Example 146

This example includes the elements of example 124, including providing, by the LCE, at least one of confidentiality and/or integrity of data.

Example 147

This example includes the elements of example 124, including offloading, by the LCE, cryptographic functions from a host system.

Example 148

This example includes the elements of example 124, wherein at least one of the LCE occupies a constrained die area and/or a power consumption associated with the LCE is constrained.

Example 149

This example includes the elements of example 124, wherein the LCE includes an AES cryptographic engine.

Example 150

This example includes the elements of example 149, wherein the AES cryptographic engine includes round computation logic, a key generation engine and a controller.

Example 151

This example includes the elements of example 150, including performing, by the round computation logic, round computation operations including SubBytes( ), ShiftRows( ), MixColumns( ) and AddRoundKey( ); generating, by the key generation engine, each round key based, at least in part, on a cryptographic key; and synchronizing, by the controller, operations of the round computation logic and the key generation engine.

Example 152

This example includes the elements of example 150, including performing, by the round computation logic, round computation operations including InvSubBytes( ), InvShiftRows( ), InvMixColumns( ) and AddRoundKey( ); and generating, by the key generation engine, each reverse round key based, at least in part, on a cryptographic key.

Example 153

This example includes the elements of example 149, including performing, by the AES cryptographic engine, operations associated with one round in four clock cycles.

Example 154

This example includes the elements of example 149, including determining, by the AES cryptographic engine, at least one of a ciphertext from a plaintext and/or a plaintext from a ciphertext utilizing a user key.

Example 155

This example includes the elements of example 150, wherein the round computation logic includes a state register, bytesub logic, shiftrow logic, mixcolumn logic and addroundkey logic.

Example 156

This example includes the elements of example 155, including performing, by the addroundkey logic, a first exclusive-OR (XOR) operation on plaintext and the user key; and performing, by the addroundkey logic, another XOR operation on an intermediate state and a generated key.

Example 157

This example includes the elements of example 156, wherein the user key is a cryptographic key and a cryptographic key size is 128, 192 or 256 bits.

Example 158

This example includes the elements of example 155, wherein the round computation logic includes one state register configured to store an AES state variable.

Example 159

This example includes the elements of example 155, including performing, by the round computation logic, operations associated with each round in an order including ShiftRows( ) followed by SubBytes( ) followed by MixColumns( ) followed by AddRoundKey( ).

Example 160

This example includes the elements of example 155, wherein the state register is a 128-bit register and is configured as a 32-bit shift register.

Example 161

This example includes the elements of example 155, wherein the bytesub logic includes four S-boxes to implement Galois Field $GF((2^4)^2)$.

Example 162

This example includes the elements of example 155, including processing, by the round computation logic, one round in four clock cycles.

Example 163

This example includes the elements of example 150, wherein the key generation engine includes a round key register, a most significant bytes (MSB) register, an S-box and key generation logic.

Example 164

This example includes the elements of example 163, including receiving, by the key generation engine, a user key; generating, by the key generation engine, a first round key based, at least in part, on the received user key; and generating, by the key generation engine, one or more subsequent round keys based, at least in part, on a respective prior round key.

Example 165

This example includes the elements of example 163, including generating, by the key generation engine, each round key in a same number of clock cycles as a number of clock cycles consumed to process one round in the AES cryptographic engine.

Example 166

This example includes the elements of example 163, including processing, by the S-box logic, four bytes of a round key MSB in four clock cycles.

Example 167

This example includes the elements of example 163, wherein the key generation engine is synchronized with the round computation logic.

Example 168

This example includes the elements of example 150, wherein the round computation logic includes a state register, Invbytesub logic, Invshiftrow logic, Invmixcolumn logic and addroundkey logic.

Example 169

This example includes the elements of example 168, wherein the user key is a cryptographic key and a cryptographic key size is 128, 192 or 256 bits.

Example 170

This example includes the elements of example 168, wherein the round computation logic includes one state register configured to store an AES state variable.

Example 171

This example includes the elements of example 168, wherein the state register is a 128-bit register and is configured as a 32-bit shift register.

Example 172

This example includes the elements of example 150, wherein the key generation engine is a reverse key generation engine, the reverse key generation engine including a round key register, a most significant bytes (MSB) register, an S-box and key generation logic.

Example 173

This example includes the elements of example 172, including receiving, by the reverse key generation engine, a user key; and generating, by the reverse key generation engine, a plurality of round keys based, at least in part, on the received user key.

Example 174

This example includes the elements of example 150, wherein the round computation logic includes a state register, encryption mix column and byte-substitution (mc-bs) logic, decryption inverse byte-substitution and mix column (bs-mc) logic, shiftrow logic, Invshiftrow logic and addroundkey logic.

Example 175

This example includes the elements of example 174, including implementing, by the round computation logic, at least one of a cipher and/or an inverse cipher.

Example 176

This example includes the elements of example 174, wherein the state register and the addroundkey logic are used for both encryption and decryption.

Example 177

This example includes the elements of example 149, including receiving, by the AES cryptographic engine, input data and a user key; encrypting or decrypting, by the AES cryptographic engine, the input data; and providing, by the AES cryptographic engine, corresponding output data.

Example 178

This example includes the elements of example 177, wherein the input data and the output data are 128 bits and the user key is 128, 192 or 256 bits.

Example 179

This example includes the elements of example 177, wherein the AES cryptographic engine includes at least one architectural optimization.

Example 180

This example includes the elements of example 179, wherein the architectural optimizations include one or more of implementing one 128 bit register for round computations, implementing one 128 bit register and one 32-bit register for key generation, implementing four S-boxes in a round computation logic and one S-box in a key generation logic and/or implementing one mixcolumn block.

Example 181

This example includes the elements of example 180, including implementing, by the four S-boxes included in the round computation logic, Galois Field $GF((2^4)^2)$ using combinatorial logic.

Example 182

This example includes the elements of example 177, wherein the AES cryptographic engine includes at least one operational optimization.

Example 183

This example includes the elements of example 182, wherein the operational optimizations include one or more of performing row shifting operations prior to byte substitution operations, on-the-fly key generation, updating a round key register once per round and/or data forwarding.

Example 184

This example includes the elements of example 183, comprising: implementing, by at least one of round computation logic and/or key generation logic, data forwarding.

Example 185

This example includes the elements of example 124, wherein the LCE includes an AES cryptographic engine and the LCE further includes an AES buffer.

Example 186

This example includes the elements of example 185, wherein the LCE includes a plurality of AES buffers, the plurality including at least one AES command buffer and at least one AES key buffer.

Example 187

This example includes the elements of example 186, wherein the plurality of AES buffers includes four AES command buffers and two AES key buffers.

Example 188

This example includes the elements of example 186, wherein the AES command buffer is to store an AES command and the AES key buffer is to store at least one of a cryptographic key and/or an initialization vector.

Example 189

This example includes the elements of example 186, wherein at least one of a number of AES command buffers and/or a number of AES key buffers is to at least one of reduce and/or minimize die area.

Example 190

This example includes the elements of example 186, wherein at least one of a number of AES command buffers and/or a number of AES key buffers is related to one or more of the target throughput, an allowable die area and/or an allowable power consumption.

Example 191

This example includes the elements of example 186, including selecting, by command selection logic, each AES command buffer for storing a new AES command using an AES command index, the AES command index to allow asynchronous receipt and consumption of a plurality of AES commands.

Example 192

This example includes the elements of example 186, wherein the LCE includes a number of AES key buffers, the number of AES key buffers related to the target throughput.

Example 193

This example includes the elements of example 124, wherein the LCE includes the AES cryptographic engine and the LCE further includes an AES wrapper.

Example 194

This example includes the elements of example 193, including supporting, by the AES wrapper, one or more AES modes, the AES modes including Electronic Code Book (ECB), Cipher Feedback (CFB), Counter (CTR) and CCM (Counter mode with CBC-MAC (Cipher Block Chaining—Message Authentication Code)).

Example 195

This example includes the elements of example 193, wherein the AES cryptographic engine at least one of complies and/or is compatible with a Federal Information Processing Standards (FIPS) Publication 197, titled: "Advanced Encryption Standard (AES) (FIPS PUB 197)", published by the National Institute of Standards and Technology (NIST) in November 2001.

Example 196

This example includes the elements of example 193, including prepending, by the AES wrapper, leftover bytes from a prior message block to a current message block to avoid padding a plurality of message blocks of a message.

Example 197

This example includes the elements of example 193, wherein the AES wrapper includes one or more registers configured to store contents of an AES command.

Example 198

This example includes the elements of example 193, including implementing, by the AES wrapper, an enhanced mode related to packet processing.

Example 199

This example includes the elements of example 193, including configuring, by the AES wrapper, the AES engine to encrypt or decrypt received data.

Example 200

This example includes the elements of example 124, wherein the LCE includes the SHS cryptographic engine.

Example 201

This example includes the elements of example 200, wherein the SHS cryptographic engine includes an initial hash register, a message schedule generator, control unit logic, a constant generator, an SHA2 compressor, an initialization vector, a hash output register and interconnect logic.

Example 202

This example includes the elements of example 201, including generating, by the SHS cryptographic engine, each intermediate hash value in one clock cycle.

Example 203

This example includes the elements of example 201, including determining, by the SHS cryptographic engine, a 256-bit message digest of a 512-bit SHA2 block in 64 clock cycles.

Example 204

This example includes the elements of example 201, including utilizing, by the SHS cryptographic engine, two sets of registers to store a temporary state and a message digest up to a last SHA2 block compression.

Example 205

This example includes the elements of example 124, wherein the LCE includes the SHS cryptographic engine and further includes an SHS buffer.

Example 206

This example includes the elements of example 205, wherein the LCE includes a plurality of SHS buffers, the plurality of SHS buffers including at least one SHS command buffer.

Example 207

This example includes the elements of example 206, wherein the SHS buffers include two SHS command buffers.

Example 208

This example includes the elements of example 206, wherein a number of SHS command buffers is related to one or more of the target throughput, an allowable die area and/or an allowable power consumption.

Example 209

This example includes the elements of example 206, selecting, by selection logic, each SHS command buffer for storing a new SHA2 (Secure Hash Algorithm 2) command using an SHA2 command index, the SHA2 command index to allow asynchronous receipt and consumption of a plurality of SHA2 commands.

Example 210

This example includes the elements of example 124, wherein the LCE includes the SHS cryptographic engine and including implementing, by the SHS cryptographic engine, one or more Secure Hash Algorithms (SHAs).

Example 211

This example includes the elements of example 210, wherein the SHAs include SHA-224, SHA-256 and SHA-512.

Example 212

This example includes the elements of example 210, wherein the SHS cryptographic engine at least one of complies and/or is compatible with a Federal Information Processing Standards (FIPS) Publication 180-4, titled:

"Secure Hash Standard (SHS)", published by the National Institute of Standards and Technology (NIST) in March 2012.

Example 213

This example includes the elements of example 210, wherein the LCE further includes an SHS wrapper.

Example 214

This example includes the elements of example 213, including configuring, by the SHS wrapper, the SHS cryptographic engine to generate a hash based message authentication code (HMAC).

Example 215

This example includes the elements of example 213, including determining, by the SHS wrapper, a message length.

Example 216

This example includes the elements of example 213, including padding, by the SHS wrapper, a last message block of a plurality of message blocks.

Example 217

This example includes the elements of example 124, wherein the LCE includes the random number generator.

Example 218

This example includes the elements of example 217, wherein the random number generator includes built in self test (BIST) logic.

Example 219

This example includes the elements of example 217, wherein the random number generator is nondeterministic.

Example 220

This example includes the elements of example 219, wherein the LCE includes an entropy source.

Example 221

This example includes the elements of example 217, wherein the LCE further includes an RNG wrapper.

Example 222

This example includes the elements of example 217, wherein the LCE further includes an RNG buffer.

Example 223

This example includes the elements of example 222, wherein the LCE includes a plurality of RNG buffers.

Example 224

This example includes the elements of example 222, wherein the LCE includes a number of RNG buffers, the number selected to support on-the-fly random number generation.

Example 225

This example includes the elements of example 223, wherein the number of RNG buffers is four.

Example 226

This example includes the elements of example 223, wherein a number of RNG buffers is related to one or more of the target throughput, an allowable die area and/or an allowable power consumption.

Example 227

This example includes the elements of example 223, including selecting, by selection logic, each RNG buffer for storing a new random number using an RNG buffer index, the RNG buffer index to allow asynchronous receipt and consumption of a plurality of random numbers.

Example 228

This example includes the elements of example 124, wherein the LCE includes the memory wiper.

Example 229

This example includes the elements of example 228, includes erasing, by the memory wiper, a block of memory, the block having a length of one or more bytes.

Example 230

This example includes the elements of example 228, wherein the LCE further includes a wiper buffer.

Example 231

This example includes the elements of example 230, wherein the wiper buffer is to store a memory wiper command.

Example 232

This example includes the elements of example 230, wherein the wiper buffer is to store one memory wiper command.

Example 233

This example includes the elements of example 230, wherein a capacity of the wiper buffer is optimized for at least one of die area, power consumption and/or throughput.

Example 234

This example includes the elements of example 229, further including erasing, by the memory wiper, the block of memory via direct memory access (DMA).

Example 235

This example includes the elements of example 228, wherein the LCE further includes a wiper wrapper.

Example 236

This example includes the elements of example 124, wherein optimized corresponds to at least one of a reduced and/or minimized size and/or a reduced and/or minimized power consumption while maintaining or achieving the associated throughput greater than or equal to the target throughput.

Example 237

This example includes the elements of example 124, wherein the target throughput is greater than or equal to a minimum throughput specified by one or more of a communication specification, standard and/or protocol and/or an interconnect specification, standard and/or protocol.

Example 238

This example includes the elements of example 130, wherein the message characteristics include one or more of a data type including one or more of streaming, static, message length known in advance, message length not known in advance, an associated cryptographic operation including one or more of encryption, decryption and/or generating one or more of a hash, message digest, digital signature, and/or message authentication code.

Example 239

This example includes the elements of example 128, wherein the architectural optimization includes one or more of implementing fewer than all possible cryptographic primitive(s), providing selected cryptographic functionality, implementing a minimized cryptographic primitive.

Example 240

This example includes the elements of example 124, including reading, by the LCE, one or more control and status register(s) (CSR(s)); generating, by the LCE, a corresponding command; and writing, by the LCE, the command to a command buffer, if the LCE and a selected cryptographic primitive is available or initiating, by the LCE, a wait for available if the LCE or selected cryptographic primitive is not available.

Example 241

This example includes the elements of example 240, further including determining, by the LCE, whether at least one of the LCE and/or a selected cryptographic primitive is available.

Example 242

This example includes the elements of example 240, further including updating, by the LCE, a status CSR; and generating, by the LCE, an interrupt, if the LCE and the selected cryptographic primitive become available.

Example 243

This example includes the elements of example 124, including reading, by the LCE, a control and status register (CSR); generating, by the LCE, a command; fetching, by the LCE, the command; and executing, by the LCE, the command, in response to a request for a cryptographic function.

Example 244

This example includes the elements of example 243, wherein executing the command includes one or more of, reading input data, performing one or more cryptographic operations and writing output data.

Example 245

This example includes the elements of example 124, including starting, by a random number generator (RNG), a built in self test (BIST); and if the BIST passes: asserting, by the random number generator (RNG), a self test fail signal if the BIST fails; providing, by an RNG wrapper, a read random number signal to the RNG; determining, by the RNG wrapper, whether a random number is available; storing, by the RNG wrapper, the random number in an RNG buffer if the RNG buffer is not full.

Example 246

This example includes the elements of example 245, further including determining, by the RNG wrapper, whether the RNG buffer is full when the random number is available.

Example 247

According to this example, there is provided a method. The method includes determining, by at least one of a host logic and/or a processor, whether a lightweight cryptographic engine (LCE) is available; and writing, by the host logic and/or the processor, to a selected control and status register (CSR), if the LCE is available; or setting, by the host logic and/or the processor, a flag in a mask CSR and waiting, by the host logic, for an interrupt, if the LCE is not available.

Example 248

According to this example, there is provided a method. The method includes reading, by at least one of a host logic and/or a processor, a lightweight cryptographic engine (LCE) status control and status register (CSR); determining, by the host logic and/or the processor, whether a random number generator (RNG) is available; determining, by the host logic and/or the processor, whether RNG data is ready, if the RNG is available. The method further includes reading, by the host logic and/or the processor, an RNG data CSR, if the RNG data is ready, or waiting, by the host logic, if the RNG data is not ready.

Example 249

According to this example, there is provided a system. The system includes a host logic; a memory; a communication interface; and a lightweight cryptographic engine (LCE). The LCE is optimized and has an associated throughput greater than or equal to a target throughput.

Example 250

This example includes the elements of example 249, wherein at least one of the LCE occupies at least one of a reduced and/or minimized die area and/or a power consumption of the system is at least one of reduced and/or minimized.

Example 251

This example includes the elements of example 249, wherein the LCE includes at least one of an Advanced Encryption Standard (AES) cryptographic engine, a Secure Hash Standard (SHS) cryptographic engine, a random number generator and/or a memory wiper.

Example 252

This example includes the elements of example 249, wherein the target throughput is in the range of 100 kilobits per second (kbps) to 200 Megabits per second (Mbps).

Example 253

This example includes the elements according to any one of examples 249 to 252, wherein the LCE includes at least one of an architectural optimization and/or an operational optimization.

Example 254

This example includes the elements according to any one of examples 249 to 252, wherein the LCE is scalable.

Example 255

This example includes the elements of example 253, wherein the architectural optimization includes one or more of a reduced and/or minimized number of registers, a reduced and/or minimized associated combinatorial logic, a number of buffers related to anticipated message characteristics and/or a cryptographic primitive-specific optimization and the operational optimization includes one or more of a reduced and/or minimized number of register updates, data forwarding, adjusted order of operations, on-the-fly operation and/or functionality offloaded from the system.

Example 256

This example includes the elements of example 254, wherein the LCE includes a subset of possible cryptographic primitives.

Example 257

This example includes the elements according to any one of examples 249 to 252, wherein the LCE includes a plurality of layers.

Example 258

This example includes the elements of example 257, wherein each layer corresponds to a functional grouping.

Example 259

This example includes the elements of example 257, wherein the plurality of layers includes a first layer, a second layer, a third layer and a fourth layer.

Example 260

This example includes the elements of example 259, wherein the first layer includes one or more of an Advanced Encryption Standard (AES) cryptographic engine, a Secure Hash Standard (SHS) cryptographic engine, a random number generator and/or a memory wiper.

Example 261

This example includes the elements of example 259, wherein the second layer includes one or more of an AES wrapper, a SHS wrapper, an RNG wrapper and/or a wiper wrapper.

Example 262

This example includes the elements of example 259, wherein the third layer includes one or more of an AES buffer, an SHS buffer, an RNG buffer and/or a memory wiper buffer.

Example 263

This example includes the elements of example 262, wherein a number of buffers is related to the target throughput.

Example 264

This example includes the elements of example 262, wherein a numbers of buffers is optimized to reduce and/or minimize die size and/or power consumption while maintaining the associated throughput at or above the target throughput.

Example 265

This example includes the elements of example 259, wherein the fourth layer includes one or more interface port(s) and a plurality of command and status registers (CSRs), the CSRs to store at least one of control and/or status information related to the LCE.

Example 266

This example includes the elements of example 265, wherein the CSRs include one or more of a policy CSR, an LCE status CSR, an operational CSR and/or an interrupt CSR.

Example 267

This example includes the elements of example 266, where the operational CSR includes a command CS R.

Example 268

This example includes the elements of example 259, wherein the fourth layer includes a direct memory access (DMA) engine.

Example 269

This example includes the elements of example 268, wherein the DMA engine is to multiplex data from a plurality of cryptographic primitives included in the LCE.

Example 270

This example includes the elements of example 259, wherein the fourth layer includes a first interface port and a second interface port, the first interface port to be used by the LCE to access a host system and the second interface port to be used by the host system to access the LCE.

Example 271

This example includes the elements according to any one of examples 249 to 252, wherein the LCE is to provide at least one of confidentiality and/or integrity of data.

Example 272

This example includes the elements according to any one of examples 249 to 252, wherein the LCE is to offload cryptographic functions from a host system.

Example 273

This example includes the elements according to any one of examples 249 to 252, wherein at least one of the LCE occupies a constrained die area and/or a power consumption associated with the LCE is constrained.

Example 274

This example includes the elements according to any one of examples 249 to 252, wherein the LCE includes an AES cryptographic engine.

Example 275

This example includes the elements of example 274, wherein the AES cryptographic engine includes round computation logic, a key generation engine and a controller.

Example 276

This example includes the elements of example 275, wherein the round computation logic is to perform round computation operations including SubBytes( ), ShiftRows( ), MixColumns( ) and AddRoundKey( ); key generation engine is to generate each round key based, at least in part, on a cryptographic key; and the controller is to synchronize operations of the round computation logic and the key generation engine.

Example 277

This example includes the elements of example 275 or 276, wherein the round computation logic is to perform round computation operations including InvSubBytes( ), InvShiftRows( ), InvMixColumns( ) and AddRoundKey( ) and the key generation engine is to generate each reverse round key based, at least in part, on a cryptographic key.

Example 278

This example includes the elements of example 274, wherein the AES cryptographic engine is to perform operations associated with one round in four clock cycles.

Example 279

This example includes the elements of example 274, wherein the AES cryptographic engine is to determine at least one of a ciphertext from a plaintext and/or a plaintext from a ciphertext utilizing a user key.

Example 280

This example includes the elements of example 275, wherein the round computation logic includes a state register, bytesub logic, shiftrow logic, mixcolumn logic and addroundkey logic.

Example 281

This example includes the elements of example 280, wherein the addroundkey logic is to perform a first exclusive-OR (XOR) operation on plaintext and the user key and to perform another XOR operation on an intermediate state and a generated key.

Example 282

This example includes the elements of example 281, wherein the user key is a cryptographic key and a cryptographic key size is 128, 192 or 256 bits.

Example 283

This example includes the elements of example 280, wherein the round computation logic includes one state register configured to store an AES state variable.

Example 284

This example includes the elements of example 280, wherein the round computation logic is to perform operations associated with each round in an order including ShiftRows( ) followed by SubBytes( ) followed by MixColumns( ) followed by AddRoundKey( ).

Example 285

This example includes the elements of example 280, wherein the state register is a 128-bit register and is configured as a 32-bit shift register.

Example 286

This example includes the elements of example 280, wherein the bytesub logic includes four S-boxes to implement Galois Field $GF((2^4)2)$.

Example 287

This example includes the elements of example 280, wherein the round computation logic is to process one round in four clock cycles.

Example 288

This example includes the elements of example 275, wherein the key generation engine includes a round key register, a most significant bytes (MSB) register, an S-box and key generation logic.

Example 289

This example includes the elements of example 288, wherein the key generation engine is to receive a user key; to generate a first round key based, at least in part, on the received user key; and to generate one or more subsequent round keys based, at least in part, on a respective prior round key.

Example 290

This example includes the elements of example 288, wherein the key generation engine is to generate each round key in a same number of clock cycles as a number of clock cycles consumed to process one round in the AES cryptographic engine.

Example 291

This example includes the elements of example 288, wherein the S-box logic is to process four bytes of a round key MSB in four clock cycles.

Example 292

This example includes the elements of example 288, wherein the key generation engine is synchronized with the round computation logic.

Example 293

This example includes the elements of example 275, wherein the round computation logic includes a state register, Invbytesub logic, Invshiftrow logic, Invmixcolumn logic and addroundkey logic.

Example 294

This example includes the elements of example 293, wherein the user key is a cryptographic key and a cryptographic key size is 128, 192 or 256 bits.

Example 295

This example includes the elements of example 293, wherein the round computation logic includes one state register configured to store an AES state variable.

Example 296

This example includes the elements of example 293, wherein the state register is a 128-bit register and is configured as a 32-bit shift register.

Example 297

This example includes the elements of example 275, wherein the key generation engine is a reverse key generation engine, the reverse key generation engine including a round key register, a most significant bytes (MSB) register, an S-box and key generation logic.

Example 298

This example includes the elements of example 297, wherein the reverse key generation engine is to receive a user key; and to generate a plurality of round keys based, at least in part, on the received user key.

Example 299

This example includes the elements of example 275, wherein the round computation logic includes a state register, encryption mix column and byte-substitution (mc-bs) logic, decryption inverse byte-substitution and mix column (bs-mc) logic, shiftrow logic, Invshiftrow logic and addroundkey logic.

Example 300

This example includes the elements of example 299, wherein the round computation logic is to implement at least one of a cipher and/or an inverse cipher.

Example 301

This example includes the elements of example 299, wherein the state register and the addroundkey logic are used for both encryption and decryption.

Example 302

This example includes the elements of example 274, wherein the AES cryptographic engine is to receive input data and a user key, to encrypt or decrypt the input data and to provide corresponding output data.

Example 303

This example includes the elements of example 302, wherein the input data and the output data are 128 bits and the user key is 128, 192 or 256 bits.

Example 304

This example includes the elements of example 302, wherein the AES cryptographic engine includes at least one architectural optimization.

Example 305

This example includes the elements of example 304, wherein the architectural optimizations include one or more of implementing one 128 bit register for round computations, implementing one 128 bit register and one 32-bit register for key generation, implementing four S-boxes in a round computation logic and one S-box in a key generation logic and/or implementing one mixcolumn block.

Example 306

This example includes the elements of example 305, wherein the four S-boxes included in the round computation logic are to implement Galois Field $GF((2^4)2)$ using combinatorial logic.

Example 307

This example includes the elements of example 302, wherein the AES cryptographic engine includes at least one operational optimization.

Example 308

This example includes the elements of example 307, wherein the operational optimizations include one or more of performing row shifting operations prior to byte substitution operations, on-the-fly key generation, updating a round key register once per round and/or data forwarding.

Example 309

This example includes the elements of example 308, wherein at least one of round computation logic and/or key generation logic is to implement data forwarding.

Example 310

This example includes the elements according to any one of examples 249 to 252, wherein the LCE includes an AES cryptographic engine and the LCE further includes an AES buffer.

Example 311

This example includes the elements of example 310, wherein the LCE includes a plurality of AES buffers, the plurality including at least one AES command buffer and at least one AES key buffer.

Example 312

This example includes the elements of example 311, wherein the plurality of AES buffers includes four AES command buffers and two AES key buffers.

Example 313

This example includes the elements of example 311, wherein the AES command buffer is to store an AES command and the AES key buffer is to store at least one of a cryptographic key and/or an initialization vector.

Example 314

This example includes the elements of example 311, wherein at least one of a number of AES command buffers and/or a number of AES key buffers is to at least one of reduce and/or minimize die area.

Example 315

This example includes the elements of example 311, wherein at least one of a number of AES command buffers and/or a number of AES key buffers is related to one or more of the target throughput, an allowable die area and/or an allowable power consumption.

Example 316

This example includes the elements of example 311, wherein each AES command buffer is selected for storing a new AES command using an AES command index, the AES command index to allow asynchronous receipt and consumption of a plurality of AES commands.

Example 317

This example includes the elements of example 311, wherein the LCE includes a number of AES key buffers, the number of AES key buffers related to the target throughput.

Example 318

This example includes the elements according to any one of examples 249 to 252, wherein the system corresponds to an Internet of Things (IoT) device.

Example 319

This example includes the elements according to any one of examples 249 to 252, wherein the LCE includes an AES cryptographic engine and the LCE further includes an AES wrapper.

Example 320

This example includes the elements of example 319, wherein the AES wrapper is to support one or more AES modes, the AES modes including Electronic Code Book (ECB), Cipher Feedback (CFB), Counter (CTR) and CCM (Counter mode with CBC-MAC (Cipher Block Chaining—Message Authentication Code)).

Example 321

This example includes the elements of example 319, wherein the AES cryptographic engine at least one of complies and/or is compatible with a Federal Information Processing Standards (FIPS) Publication 197, titled: "Advanced Encryption Standard (AES) (FIPS PUB 197)", published by the National Institute of Standards and Technology (NIST) in November 2001.

Example 322

This example includes the elements of example 319, wherein the AES wrapper is to prepend leftover bytes from a prior message block to a current message block to avoid padding a plurality of message blocks of a message.

Example 323

This example includes the elements of example 319, wherein the AES wrapper includes one or more registers configured to store contents of an AES command.

Example 324

This example includes the elements of example 319, wherein the AES wrapper is to implement an enhanced mode related to packet processing.

Example 325

This example includes the elements of example 319, wherein the AES wrapper is to configure the AES engine to encrypt or decrypt received data.

Example 326

This example includes the elements according to any one of examples 249 to 252, wherein the LCE includes an SHS cryptographic engine.

Example 327

This example includes the elements of example 326, wherein the SHS cryptographic engine includes an initial hash register, a message schedule generator, control unit logic, a constant generator, an SHA2 compressor, an initialization vector, a hash output register and interconnect logic.

Example 328

This example includes the elements of example 327, wherein the SHS cryptographic engine is to generate each intermediate hash value in one clock cycle.

Example 329

This example includes the elements of example 327, wherein the SHS cryptographic engine is to determine a 256-bit message digest of a 512-bit SHA2 block in 64 clock cycles.

Example 330

This example includes the elements of example 327, wherein the SHS cryptographic engine is to utilize two sets of registers to store a temporary state and a message digest up to a last SHA2 block compression.

Example 331

This example includes the elements according to any one of examples 249 to 252, wherein the LCE includes an SHS cryptographic engine and further includes an SHS buffer.

Example 332

This example includes the elements of example 331, wherein the LCE includes a plurality of SHS buffers, the plurality of SHS buffers including at least one SHS command buffer.

Example 333

This example includes the elements of example 332, wherein the SHS buffers include two SHS command buffers.

Example 334

This example includes the elements of example 332, wherein a number of SHS command buffers is related to one or more of the target throughput, an allowable die area and/or an allowable power consumption.

Example 335

This example includes the elements of example 332, wherein each SHS command buffer is selected for storing a new SHA2 (Secure Hash Algorithm 2) command using an SHA2 command index, the SHA2 command index to allow asynchronous receipt and consumption of a plurality of SHA2 commands.

Example 336

This example includes the elements according to any one of examples 249 to 252, wherein the LCE includes an SHS cryptographic engine and the SHS cryptographic engine is to implement one or more Secure Hash Algorithms (SHAs).

Example 337

This example includes the elements of example 336, wherein the SHAs include SHA-224, SHA-256 and SHA-512.

Example 338

This example includes the elements of example 336, wherein the SHS cryptographic engine at least one of complies and/or is compatible with a Federal Information Processing Standards (FIPS) Publication 180-4, titled: "Secure Hash Standard (SHS)", published by the National Institute of Standards and Technology (NIST) in March 2012.

Example 339

This example includes the elements of example 336, wherein the LCE further includes an SHS wrapper.

Example 340

This example includes the elements of example 339, wherein the SHS wrapper is to configure the SHS cryptographic engine to generate a hash based message authentication code (HMAC).

Example 341

This example includes the elements of example 340, wherein the SHS wrapper is to determine a message length.

Example 342

This example includes the elements of example 340, wherein the SHS wrapper is to pad a last message block of a plurality of message blocks.

Example 343

This example includes the elements according to any one of examples 249 to 252, wherein the LCE includes a random number generator.

Example 344

This example includes the elements of example 343, wherein the random number generator includes built in self test (BIST) logic.

Example 345

This example includes the elements of example 343, wherein the random number generator is nondeterministic.

Example 346

This example includes the elements of example 345, wherein the LCE includes an entropy source.

Example 347

This example includes the elements of example 343, wherein the LCE further includes an RNG wrapper.

Example 348

This example includes the elements of example 343, wherein the LCE further includes an RNG buffer.

Example 349

This example includes the elements of example 348, wherein the LCE includes a plurality of RNG buffers.

Example 350

This example includes the elements of example 348, wherein the LCE includes a number of RNG buffers, the number selected to support on-the-fly random number generation.

Example 351

This example includes the elements of example 349 or 350, wherein the number of RNG buffers is four.

Example 352

This example includes the elements of example 349, wherein a number of RNG buffers is related to one or more of the target throughput, an allowable die area and/or an allowable power consumption.

Example 353

This example includes the elements of example 349, wherein each RNG buffer is selected for storing a new random number using an RNG buffer index, the RNG buffer index to allow asynchronous receipt and consumption of a plurality of random numbers.

Example 354

This example includes the elements according to any one of examples 249 to 252, wherein the LCE includes a memory wiper.

Example 355

This example includes the elements of example 354, wherein the memory wiper is to erase a block of memory, the block having a length of one or more bytes.

Example 356

This example includes the elements of example 354, wherein the LCE further includes a wiper buffer.

Example 357

This example includes the elements of example 356, wherein the wiper buffer is to store a memory wiper command.

Example 358

This example includes the elements of example 356, wherein the wiper buffer is to store one memory wiper command.

Example 359

This example includes the elements of example 356, wherein a capacity of the wiper buffer is optimized for at least one of die area, power consumption and/or throughput.

Example 360

This example includes the elements of example 355, wherein the memory wiper is to erase the block of memory via direct memory access (DMA).

Example 361

This example includes the elements of example 354, wherein the LCE further includes a wiper wrapper.

Example 362

This example includes the elements according to any one of examples 249 to 252, wherein optimized corresponds to at least one of a reduced and/or minimized size and/or a reduced and/or minimized power consumption while maintaining or achieving the associated throughput greater than or equal to the target throughput.

Example 363

This example includes the elements according to any one of examples 249 to 252, wherein the target throughput is greater than or equal to a minimum throughput specified by one or more of a communication specification, standard and/or protocol and/or an interconnect specification, standard and/or protocol.

Example 364

This example includes the elements of example 255, wherein the message characteristics include one or more of a data type including one or more of streaming, static, message length known in advance, message length not known in advance, an associated cryptographic operation including one or more of encryption, decryption and/or generating one or more of a hash, message digest, digital signature, and/or message authentication code.

Example 365

This example includes the elements of example 253, wherein the architectural optimization includes one or more of implementing fewer than all possible cryptographic primitive(s), providing selected cryptographic functionality, implementing a minimized cryptographic primitive.

Example 366

This example includes the elements according to any one of examples 249 to 252, wherein the LCE is to read one or more control and status register(s) (CSR(s)), generate a corresponding command, write the command to a command buffer, if the LCE and a selected cryptographic primitive is available or to initiate a wait for available if the LCE or selected cryptographic primitive is not available.

Example 367

This example includes the elements of example 366, wherein the LCE is to determine whether at least one of the LCE and/or a selected cryptographic primitive is available.

Example 368

This example includes the elements of example 366, wherein the LCE is to update a status CSR and generate an interrupt if the LCE and the selected cryptographic primitive become available.

Example 369

This example includes the elements according to any one of examples 249 to 252, wherein the LCE is to read a control and status register (CSR), generate a command, fetch the command and execute the command in response to a request for a cryptographic function.

Example 370

This example includes the elements of example 369, wherein executing the command includes one or more of, reading input data, performing one or more cryptographic operations and writing output data.

Example 371

This example includes the elements according to any one of examples 249 to 252, wherein the LCE includes a random number generator (RNG) and an RNG wrapper, the RNG to start a built in self test (BIST) and to assert a self test fail signal if the BIST fails and the RNG wrapper to provide a read random number signal to the RNG, to determine if a random number is available, to store the random number in an RNG buffer if the RNG buffer is not full, if the BIST passes.

Example 372

This example includes the elements of example 371, wherein the RNG wrapper is further to determine if the RNG buffer is full when the random number is available.

Example 373

This example includes the elements according to any one of examples 249 to 252, wherein the LCE is to offload one or more operations related to cryptographic operations from the host logic.

Example 374

This example includes the elements of example 373, wherein the operations related to cryptographic operations include one or more of preprocessing, padding and/or determining a message length.

Example 375

This example includes the elements of example 373, wherein the offloading is to reduce an overall power consumption of the system.

Example 376

This example includes the elements according to any one of examples 249 to 252, wherein the system corresponds to one or more of a mobile telephone, a wearable device, an Internet of Things (IoT) networked device and/or a system on a chip (SoC).

Example 377

This example includes the elements according to any one of examples 249 to 252, further including a processor.

Example 378

This example includes the elements according to any one of examples 249 to 252, further including a memory controller.

Example 379

This example includes the elements of example 378, wherein the memory controller is to facilitate direct memory access operations between the memory and the LCE.

Example 380

This example includes the elements according to any one of examples 249 to 252, wherein the host logic is to determine whether a selected cryptographic primitive is available for performing cryptographic operations.

Example 381

This example includes the elements according to any one of examples 249 to 252, wherein the host logic is to at least one of set and/or determine a policy for access to the LCE.

Example 382

This example includes the elements according to any one of examples 249 to 252, wherein the host logic is to determine whether the LCE is available, to write to a selected control and status register (CSR), if the LCE is available or to set a flag in a mask CSR and to wait, if the LCE is not available.

Example 383

This example includes the elements according to any one of examples 249 to 252, wherein the host logic is to read an LCE status control and status register (CSR), to determine whether a random number generator (RNG) is available, to determine whether RNG data is ready if the RNG is available and to read an RNG data CSR if the RNG data is ready or to wait if the RNG data is not ready.

Example 384

This example includes the elements according to any one of examples 1 to 4, wherein the LCE includes an AES engine that has an associated throughput of about 345 Mbps.

Example 385

This example includes the elements according to any one of examples 1 to 4, wherein the LCE includes an SHS engine that has an associated throughput of about 864 Mbps.

Example 386

This example includes the elements of example 124, wherein the LCE includes an AES engine that has an associated throughput of about 345 Mbps.

Example 387

This example includes the elements of example 124, wherein the LCE includes an SHS engine that has an associated throughput of about 864 Mbps.

Example 388

This example includes the elements according to any one of examples 249 to 252, wherein the LCE includes an AES engine that has an associated throughput of about 345 Mbps.

Example 389

This example includes the elements according to any one of examples 249 to 252, wherein the LCE includes an SHS engine that has an associated throughput of about 864 Mbps
Example 390 According to this example, there is provided a system. The system includes at least one device arranged to perform the method of any one of examples 124 to 248, 386 and 387.

Example 391

According to this example, there is provided a device. The device includes means to perform the method of any one of examples 124 to 248, 386 and 387.

Example 392

A computer readable storage device having stored thereon instructions that when executed by one or more processors result in the following operations including: the method according to any one of examples 247 or 248.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. An apparatus comprising:
   a lightweight cryptographic engine (LCE) embodied in one or more integrated circuits, wherein the LCE is optimized by implementing functional layers to encrypt or decrypt data from other elements in the apparatus, the functional layers in the LCE including:
   a crypto primitive layer including at least one cryptographic primitive, a random number generator and a memory wiper;
   a wrapper layer to support operation of the crypto primitive layer by at least formatting the data, tracking characteristics of the data and locations where the data is stored based on the cryptographic primitive being used to encrypt or decrypt the data;
   a buffer layer to store at least one of commands, data and cryptographic keys utilized in encrypting or decrypting the data; and
   an interface layer including control and status registers to control operation of the LCE at least when communicating with the other elements in the apparatus.

2. The apparatus of claim 1, wherein at least one of the LCE occupies at least one of a reduced and/or minimized die area in the one or more integrated circuits, or a power consumption of the one or more integrated circuits are at least one of reduced and/or minimized.

3. The apparatus of claim 1, wherein the at least one cryptographic primitive comprises at least one of an Advanced Encryption Standard (AES) cryptographic engine or a Secure Hash Standard (SHS) cryptographic engine.

4. The apparatus of claim 3, wherein the AES cryptographic engine is architecturally optimized by implementing one 128-bit register for round computation, and one 128-bit register and one 32-bit register for key generation to reduce power consumption in the apparatus.

5. The apparatus of claim 3, wherein the AES cryptographic engine is operationally optimized by implementing on-the-fly key generation in parallel and synchronous with round computation to improve throughput for the AES cryptographic engine.

6. The apparatus of claim 1, wherein the target throughput is in the range of 100 kilobits per second (kbps) to 200 Megabits per second (Mbps).

7. The apparatus of claim 1, wherein the LCE comprises at least one of an architectural optimization and/or an operational optimization.

8. The apparatus of claim 7, wherein the architectural optimization comprises one or more of a reduced and/or minimized number of registers, a reduced and/or minimized associated combinatorial logic, a number of buffers related to anticipated message characteristics and/or a cryptographic primitive-specific optimization and the operational optimization comprises one or more of a reduced and/or minimized number of register updates, data forwarding, adjusted order of operations, on-the-fly operation and/or functionality offloaded from a host.

9. A method comprising:
   determining if an optimized lightweight cryptographic engine (LCE) embodied in one or more integrated circuits is available;
   if determined to be available, interacting with a control and status register in a communication layer of the LCE to request encryption or decryption of data by the LCE;
   reading the control and status register;
   generating at least one command based on data read from the control and status register;
   storing the at least one command within a buffer in a buffer layer of the LCE;
   fetching the at least one command from the buffer using a wrapper from a wrapper layer of the LCE; and
   performing, using a crypto primitive layer in the LCE, a cryptographic operation based on the command the crypto primitive layer including at least one cryptographic primitive corresponding to the wrapper, a random number generator and a memory wiper.

10. The method of claim 9, wherein at least one of the LCE occupies at least one of a reduced and/or minimized die area in the one or more integrated circuits, or a power consumption associated with performing the cryptographic operation is at least one of reduced and/or minimized.

11. The method of claim 9, wherein the cryptographic operation comprises at least one of an Advanced Encryption Standard (AES) cryptographic operation or a Secure Hash Standard (SHS) cryptographic operation.

12. The method of claim 11, wherein the AES cryptographic operation is performed by an AES cryptographic engine that is architecturally optimized by implementing one 128-bit register for round computation, and one 128-bit register and one 32-bit register for key generation to reduce power consumption in the apparatus.

13. The method of claim 11, wherein the AES cryptographic operation is performed by an AES cryptographic engine is operationally optimized by implementing on-the-fly key generation in parallel and synchronous with round computation to improve throughput for the AES cryptographic engine.

14. The method of claim 9, wherein the target throughput is in the range of 100 kilobits per second (kbps) to 200 Megabits per second (Mbps).

15. The method of claim 9, wherein the LCE comprises at least one of an architectural optimization and/or an operational optimization.

16. The method of claim 15, wherein the architectural optimization comprises one or more of a reduced and/or minimized number of registers, a reduced and/or minimized associated combinatorial logic, a number of buffers related to anticipated message characteristics and/or a cryptographic primitive-specific optimization and the operational optimization comprises one or more of a reduced and/or minimized number of register updates, data forwarding, adjusted order of operations, on-the-fly operation and/or functionality offloaded from a host.

17. A system comprising:
a host logic;
a memory;
a communication interface; and
a lightweight cryptographic engine (LCE) embodied in one or more integrated circuits, wherein the LCE is optimized by implementing functional layers to encrypt or decrypt data from other elements in the apparatus, the functional layers in the LCE including:
a crypto primitive layer including at least one cryptographic primitive, a random number generator and a memory wiper;
a wrapper layer to support operation of the crypto primitive layer by at least formatting the data, tracking characteristics of the data and locations where the data is stored based on the cryptographic primitive being used to encrypt or decrypt the data;
a buffer layer to store at least one of commands, data; and cryptographic keys utilized in encrypting or decrypting the data; and
an interface layer including control and status registers to control operation of the LCE at least when communicating with the other elements in the apparatus.

18. The system of claim 17, wherein at least one of the LCE occupies at least one of a reduced and/or minimized die area in the one or more integrated circuits, or a power consumption of the system is at least one of reduced and/or minimized.

19. The system of claim 17, wherein the at least one cryptographic primitive comprises at least one of an Advanced Encryption Standard (AES) cryptographic engine or a Secure Hash Standard (SHS) cryptographic engine.

20. The system of claim 19, wherein the AES cryptographic engine is architecturally optimized by implementing one 128-bit register for round computation, and one 128-bit register and one 32-bit register for key generation to reduce power consumption in the apparatus.

21. The system of claim 19, wherein the AES cryptographic engine is operationally optimized by implementing on-the-fly key generation in parallel and synchronous with round computation to improve throughput for the AES cryptographic engine.

22. The system of claim 17, wherein the target throughput is in the range of 100 kilobits per second (kbps) to 200 Megabits per second (Mbps).

23. The system of claim 17, wherein the LCE comprises at least one of an architectural optimization and/or an operational optimization.

24. The system of claim 23, wherein the architectural optimization comprises one or more of a reduced and/or minimized number of registers, a reduced and/or minimized associated combinatorial logic, a number of buffers related to anticipated message characteristics and/or a cryptographic primitive-specific optimization and the operational optimization comprises one or more of a reduced and/or minimized number of register updates, data forwarding, adjusted order of operations, on-the-fly operation and/or functionality offloaded from the system.

* * * * *